United States Patent
Shin et al.

(10) Patent No.: US 12,021,772 B2
(45) Date of Patent: Jun. 25, 2024

(54) METHOD WHEREBY TERMINAL RECEIVES PRECONFIGURED UPLINK RESOURCE FROM BASE STATION IN WIRELESS COMMUNICATION SYSTEM, AND DEVICE FOR SAME

(71) Applicant: LG ELECTRONICS INC., Seoul (KR)

(72) Inventors: Seokmin Shin, Seoul (KR); Seonwook Kim, Seoul (KR); Changhwan Park, Seoul (KR); Joonkui Ahn, Seoul (KR); Suckchel Yang, Seoul (KR); Seunggye Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 355 days.

(21) Appl. No.: 17/290,971

(22) PCT Filed: Nov. 4, 2019

(86) PCT No.: PCT/KR2019/014859
§ 371 (c)(1),
(2) Date: May 3, 2021

(87) PCT Pub. No.: WO2020/091570
PCT Pub. Date: May 7, 2020

(65) Prior Publication Data
US 2022/0123885 A1 Apr. 21, 2022

Related U.S. Application Data

(60) Provisional application No. 62/755,342, filed on Nov. 2, 2018.

(30) Foreign Application Priority Data

Jan. 11, 2019 (KR) .......................... 10-2019-0004068

(51) Int. Cl.
*H04W 4/00* (2018.01)
*H04L 5/00* (2006.01)
*H04W 72/0446* (2023.01)

(52) U.S. Cl.
CPC ....... *H04L 5/0048* (2013.01); *H04W 72/0446* (2013.01)

(58) Field of Classification Search
CPC ......................... H04L 5/0048; H04W 72/0446
See application file for complete search history.

(56) References Cited

U.S. PATENT DOCUMENTS

2013/0010716 A1 * 1/2013 Dinan ................... H04W 76/15
370/329
2014/0314018 A1 * 10/2014 Gao ...................... H04L 5/0051
370/329

(Continued)

FOREIGN PATENT DOCUMENTS

WO      2017034105          3/2017
WO      WO-2018137200 A1 *  8/2018   ......... H04L 27/2613

OTHER PUBLICATIONS

International Searching Authority, English Translation of the Written Opinion of the International Searching Authority PCT/KR2019/014859, dated Feb. 27, 2020, pp. 1-4. (Year: 2020).*

(Continued)

*Primary Examiner* — Elisabeth Benoit Magloire
(74) *Attorney, Agent, or Firm* — LEE, HONG, DEGERMAN, KANG & WAIMEY

(57) ABSTRACT

The present specification provides a method whereby a terminal receives a preconfigured uplink resource from a base station, and a device for same. In particular, the method whereby a terminal receives a preconfigured uplink resource from a base station comprises: receiving a preconfigured uplink (UL) resource (PUR) configuration through RRC signaling from the base station; and if the terminal is in idle (Continued)

mode, transmitting uplink data to the base station by using a preconfigured uplink resource, wherein the preconfigured uplink resource comprises 12 subcarriers, the uplink data comprises a de-modulated reference signal (DMRS) sequence having a first length and including six subcarriers, and the de-modulated reference signal sequence may be transmitted using six of the 12 subcarriers.

6 Claims, 52 Drawing Sheets

(56) References Cited

U.S. PATENT DOCUMENTS

| | | | |
|---|---|---|---|
| 2018/0206224 A1* | 7/2018 | Hwang | H04L 5/0012 |
| 2018/0206246 A1* | 7/2018 | Zhang | H04L 1/1896 |
| 2018/0270895 A1* | 9/2018 | Park | H04W 24/04 |

OTHER PUBLICATIONS

PCT International Application No. PCT/KR2019/014859, International Search Report dated Feb. 27, 2020, 5 pages.

Huawei, et al., "Feature lead summary of Support for transmission in preconfigured UL resources," 3GPP TSG RAN WG1 Meeting #94b, R1-1811697, Oct. 2018, 13 pages.

Nokia, et al., "On uplink signal and channel structure for NR-U," 3GPP TSG RAN WG1 Meeting #94bis, R1-1810614, Oct. 2018, 17 pages.

Intel Corporation, "Enhancements to NR UL signals and channels for unlicensed operation," 3GPP TSG RAN WG1 Meeting #94bis, R1-1810765, Oct. 2018, 12 pages.

Vivo, "Discussion on sub-PRB interlace structure," 3GPP TSG RAN WG1 Meeting #94bis, R1-1810386, Oct. 2018, 5 pages.

* cited by examiner (a) In-band system (b) Guard-band system (c) Stand-alone system (A)

(B)

Non-interleaved CCE-to-REG mapping (A)

(B)

(a) UL TRANSMISSION OF TERMINAL (b) DL RECEPTION OF TERMINAL (a) UL RECEPTION OF BASE STATION (b) DL TRANSMISSION OF BASE STATION (a)

(b)

METHOD WHEREBY TERMINAL RECEIVES PRECONFIGURED UPLINK RESOURCE FROM BASE STATION IN WIRELESS COMMUNICATION SYSTEM, AND DEVICE FOR SAME

CROSS-REFERENCE TO RELATED APPLICATIONS

This application is the National Stage filing under 35 U.S.C. 371 of International Application No. PCT/KR2019/014859, filed on Nov. 4, 2019, which claims the benefit of earlier filing date and right of priority to Korean Application No. 10-2019-0004068, filed on Jan. 11, 2019, and also claims the benefit of U.S. Provisional Application No. 62/755,342, filed on Nov. 2, 2018, the contents of which are all hereby incorporated by reference herein in their entirety.

TECHNICAL FIELD

The present specification relates to a method and apparatus for receiving a preset uplink resource from a base station by a terminal in a wireless communication system.

BACKGROUND ART

The mobile communication system was developed to provide voice service while ensuring user activity. However, the mobile communication system has expanded to not only voice but also data services, and nowadays, due to the explosive increase in traffic, a shortage of resources is caused and users demand for higher speed services, so a more advanced mobile communication system is required. have.

The requirements of the next-generation mobile communication system are largely explosive data traffic acceptance, dramatic increase in transmission rate per user, largely increased number of connected devices, very low end-to-end latency, and support for high energy efficiency. You should be able to. To this end, Dual Connectivity, Massive Multiple Input Multiple Output (MIMO), In-band Full Duplex, Non-Orthogonal Multiple Access (NOMA), and Super Wideband Various technologies such as wideband) support and device networking are being studied.

DISCLOSURE

Technical Problem

An object of the present specification is to provide a method for a terminal to receive a preset uplink resource from a base station in a wireless communication system.

Specifically, an object of the present invention is to provide a method for a terminal to efficiently transmit uplink data in coexistence with other terminals to a base station.

The technical problems to be achieved in the present specification are not limited to the technical problems mentioned above, and other technical problems that are not mentioned will be clearly understood by those of ordinary skill in the technical field to which the present specification belongs from the following description. I will be able to.

Technical Solution

In a method for a terminal to receive a preset uplink resource from a base station in a wireless communication system according to an embodiment of the present specification, a preconfigured uplink (UL) resource (PUR) configuration through RRC signaling from the base station Receiving; And when the terminal is in an idle mode, transmitting uplink data to the base station on the preset uplink resource; including, wherein the preset uplink resource includes 12 subcarriers And, the uplink data includes a demodulated reference signal (De-Modulated Reference Signal, DMRS) sequence of a first length including 6 subcarriers, and transmitting the uplink data to the base station comprises: The demodulation reference signal sequence may be transmitted using six subcarriers among subcarriers.

In addition, in the method according to the embodiment of the present specification, the preset uplink resource includes a plurality of slots, and the step of transmitting the uplink data to the base station comprises: on a first slot among the plurality of slots. Transmitting a first DMRS sequence of the first length using first six first subcarriers, and a second DMRS of the second length using second six second subcarriers on a second slot among the plurality of slots It may be characterized in that it comprises the step of transmitting the sequence.

In addition, in the method according to the embodiment of the present specification, the transmitting of the uplink data to the base station includes frequency hopping between the first subcarrier and the second subcarrier of the first slot and the second slot. It may be characterized by performing.

In addition, in the method according to an embodiment of the present specification, the uplink data may be a DMRS sequence of a second length including three subcarriers.

A terminal for receiving data from a base station in a wireless communication system according to an embodiment of the present specification, comprising: a communication unit for transmitting and receiving a wireless signal; Processor; And at least one computer memory operably accessible to the processor and storing instructions for performing operations when executed by the at least one processor, wherein the operations are RRC signaling from the base station Receiving a preconfigured uplink (UL) resource (PUR) configuration through the configuration; And when the terminal is in an idle mode, transmitting uplink data to the base station on the preset uplink resource; including, wherein the preset uplink resource includes 12 subcarriers And, the uplink data includes a demodulated reference signal (De-Modulated Reference Signal, DMRS) sequence of a first length including 6 subcarriers, and transmitting the uplink data to the base station comprises: The demodulation reference signal sequence may be transmitted using six subcarriers among subcarriers.

In addition, in the method according to the embodiment of the present specification, the preset uplink resource includes a plurality of slots, and the step of transmitting the uplink data to the base station comprises: on a first slot among the plurality of slots. Transmitting a first DMRS sequence of the first length using first six first subcarriers, and a second DMRS of the second length using second six second subcarriers on a second slot among the plurality of slots It may be characterized in that it comprises the step of transmitting the sequence.

In addition, in the method according to the embodiment of the present specification, the transmitting of the uplink data to the base station includes frequency hopping between the first subcarrier and the second subcarrier of the first slot and the second slot. It may be characterized by performing.

In addition, in the method according to an embodiment of the present specification, the uplink data may be a DMRS sequence of a second length including three subcarriers.

Advantageous Effects

In the NB-IoT system supporting cellular IoT, the method proposed in this specification allows the terminal to efficiently select a DMRS sequence and report it to the base station. In addition, the terminal can efficiently transmit uplink data to the base station between a plurality of different terminals. Can be transmitted.

The effects obtainable in the present specification are not limited to the above-mentioned effects, and other effects not mentioned will be clearly understood by those of ordinary skill in the art from the following description.

DESCRIPTION OF DRAWINGS

The accompany drawings, which are included to provide a further understanding of the present disclosure and are incorporated on and constitute a part of this specification illustrate embodiments of the present disclosure and together with the description serve to explain the principles of the present disclosure.

MODE FOR DISCLOSURE

Figure 1:
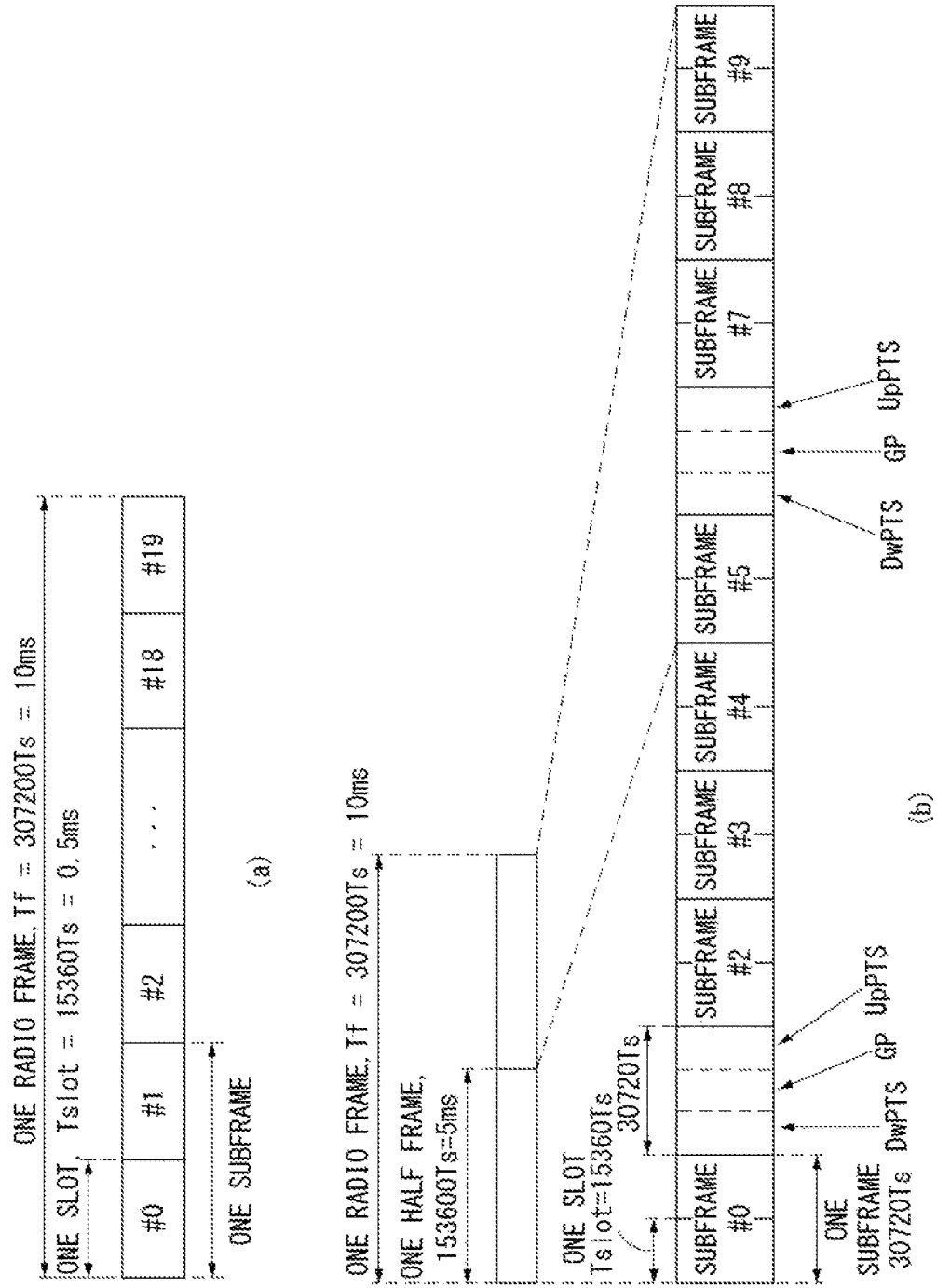
FIG. 1 is a diagram illustrating a structure of a radio frame in a wireless communication system to which the present disclosure may be applied.

Hereinafter, preferred embodiments according to the present specification will be described in detail with reference to the accompanying drawings. The detailed description to be disclosed below with the accompanying drawings is intended to describe exemplary embodiments of the present specification, and is not intended to represent the only embodiments in which the present specification may be practiced. The detailed description below includes specific details to provide a thorough understanding of the present specification. However, one of ordinary skill in the art appreciates that the present specification may be practiced without these specific details.

In some cases, in order to avoid obscuring the concept of the present specification, well-known structures and devices may be omitted, or may be illustrated in a block diagram form centering on core functions of each structure and device.

In this specification, a base station has a meaning as a terminal node of a network that directly communicates with a terminal. A specific operation described as being performed by the base station in this document may be performed by an upper node of the base station in some cases. That is, it is apparent that various operations performed for communication with a terminal in a network comprising a plurality of network nodes including a base station may be performed by the base station or other network nodes other than the base station. 'Base Station (BS)' is a fixed station, Node B, evolved-NodeB (eNB), generation-NodeB (gNB), base transceiver system (BTS), and access point (AP). Can be replaced by terms. In addition, 'Terminal' may be fixed or mobile, and UE (User Equipment), MS (Mobile Station), UT (user terminal), MSS (Mobile Subscriber Station), SS (Subscriber Station), AMS (Advanced Mobile Station), Wireless terminal (WT), Machine-Type Communication (MTC) device, Machine-to-Machine (M2M) device, Device-to-Device (D2D) device.

Hereinafter, downlink (DL) means communication from a base station to a terminal, and uplink (UL) means communication from a terminal to a base station. In downlink, the transmitter may be part of the base station, and the receiver may be part of the terminal. In the uplink, the transmitter may be a part of the terminal, and the receiver may be a part of the base station.

Specific terms used in the following description are provided to aid understanding of the present specification, and the use of these specific terms may be changed in other forms without departing from the technical spirit of the present specification.

The following technologies include code division multiple access (CDMA), frequency division multiple access (FDMA), time division multiple access (TDMA), orthogonal frequency division multiple access (OFDMA), single carrier frequency division multiple access (SC-FDMA), and NOMA. It can be used in various wireless access systems such as (non-orthogonal multiple access). CDMA may be implemented with universal terrestrial radio access (UTRA) or radio technology such as CDMA2000. TDMA may be implemented with a radio technology such as global system for mobile communications (GSM)/general packet radio service (GPRS)/enhanced data rates for GSM evolution (EDGE). OFDMA may be implemented with a wireless technology such as IEEE 802.11 (Wi-Fi), IEEE 802.16 (WiMAX), IEEE 802-20, and E-UTRA (evolved UTRA). UTRA is part of a universal mobile telecommunications system (UMTS). 3rd generation partnership project (3GPP) long term evolution (LTE) is a part of evolved UMTS (E-UMTS) using E-UTRA, and employs OFDMA in downlink and SC-FDMA in uplink. LTE-A (advanced) is an evolution of 3GPP LTE.

Embodiments of the present specification may be supported by standard documents disclosed in at least one of IEEE 802, 3GPP, and 3GPP2, which are wireless access systems. That is, among the embodiments of the present specification, steps or parts not described to clearly reveal the technical idea of the present specification may be supported by the documents. In addition, all terms disclosed in this document can be described by the standard document.

For clarity, 3GPP LTE/LTE-A/NR (New RAT) is mainly described, but the technical features of the present specification are not limited thereto.

General LTE System to which the Present Disclosure May be Applied

FIG. 1 illustrates a structure of a radio frame in a wireless communication system to which the present disclosure may be applied.

3GPP LTE/LTE-A supports a type 1 radio frame structure applicable to frequency division duplex (FDD) and a type 2 radio frame structure applicable to time division duplex (TDD).

In FIG. 1, a size of a radio frame in a time domain is expressed as a multiple of a time unit of $T\_s=1/(15000*2048)$. Downlink and uplink transmission is composed of a radio frame having a period of $T\_f=307200*T\_s=10$ ms.

FIG. 1(a) illustrates a structure of a type 1 radio frame. The type 1 radio frame may be applied to both full duplex and half duplex FDD.

The radio frame is composed of 10 subframes. One radio frame is composed of 20 slots with a length of $T\_slot=15360*T\_s=0.5$ ms, and each slot is assigned an index from 0 to 19. One subframe is composed of two contiguous slots in a time domain, and subframe i is composed of slot 2i and slot 2i+1. The time taken to transmit one subframe is referred to as a transmission time interval (TTI). For example, one subframe may have a length of 1 ms and one slot may have a length of 0.5 ms.

In FDD, uplink transmission and downlink transmission are classified in the frequency domain. There is no limitation on the full-duplex FDD, but the terminal cannot simultaneously perform transmission and reception in half-duplex FDD operation.

One slot includes a plurality of orthogonal frequency division multiplexing (OFDM) symbols in the time domain, and includes a plurality of resource blocks (RBs) in the frequency domain. Since 3GPP LTE uses OFDMA in downlink, an OFDM symbol is for expressing one symbol period. The OFDM symbol may be referred to as one SC-FDMA symbol or symbol period. A resource block is a resource allocation unit and includes a plurality of contiguous subcarriers in one slot.

FIG. 1(b) illustrates a frame structure type 2.

The type 2 radio frame is composed of two half frames each having a length of $153600*T\_s=5$ ms. Each half frame is composed of 5 subframes with a length of $30720*T\_s=1$ ms.

In the type 2 frame structure of the TDD system, the uplink-downlink configuration is a rule indicating whether uplink and downlink are allocated (or reserved) for all subframes.

Table 1 shows the uplink-downlink configuration

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, for each subframe of a radio frame, 'D' represents a subframe for downlink transmission, 'U' represents a subframe for uplink transmission, and 'S' represents a special subframe composed of three fields: a downlink pilot time slot (DwPTS), a guard period (GP), and an uplink pilot time slot (UpPTS).

The DwPTS is used for initial cell search, synchronization, or channel estimation in the terminal. The UpPTS is used for channel estimation and synchronization for uplink transmission of the terminal at the base station. The GP is a period for removing interference occurring in the uplink due to the multipath delay of the downlink signal between the uplink and the downlink.

Each subframe i is composed of slot 2i and slot 2i+1 of each $T\_slot=15360*T\_s=0.5$ ms length.

The uplink-downlink configuration may be classified into 7 types, and the positions and/or number of downlink subframes, special subframes, and uplink subframes are different for each configuration.

The point at which the downlink is switched to the uplink or the point at which the uplink is switched to the downlink is called a switching point. Switch-point periodicity refers to a period in which an uplink subframe and a downlink subframe are repeated in the same manner, and both 5 ms and 10 ms are supported. In the case of a period of 5 ms downlink-uplink switching point, the special subframe (S) exists at each half-frame, and in the case of a period of 5 ms downlink-uplink switching point, the special subframe (S) exists only at the first half-frame.

In all configurations, subframes 0 and 5 and DwPTS are periods for downlink transmission only. The UpPTS and the subframe immediately following the subframe is always a period for uplink transmission.

The uplink-downlink configuration is system information and may be known to both the base station and the terminal. The base station may notify the terminal of the change in the uplink-downlink allocation state of the radio frame by transmitting only the index of the configuration information whenever the uplink-downlink configuration information is changed. In addition, the configuration information is a kind of downlink control information, and may be transmitted through a PDCCH (Physical Downlink Control Channel) like other scheduling information, and may be commonly transmitted to all terminals in a cell through a broadcast channel, as broadcast information.

Table 2 shows a configuration (length of DwPTS/GP/UpPTS) of a special subframe.

The structure of the uplink slot may be the same as the structure of the downlink slot.

Figure 3:
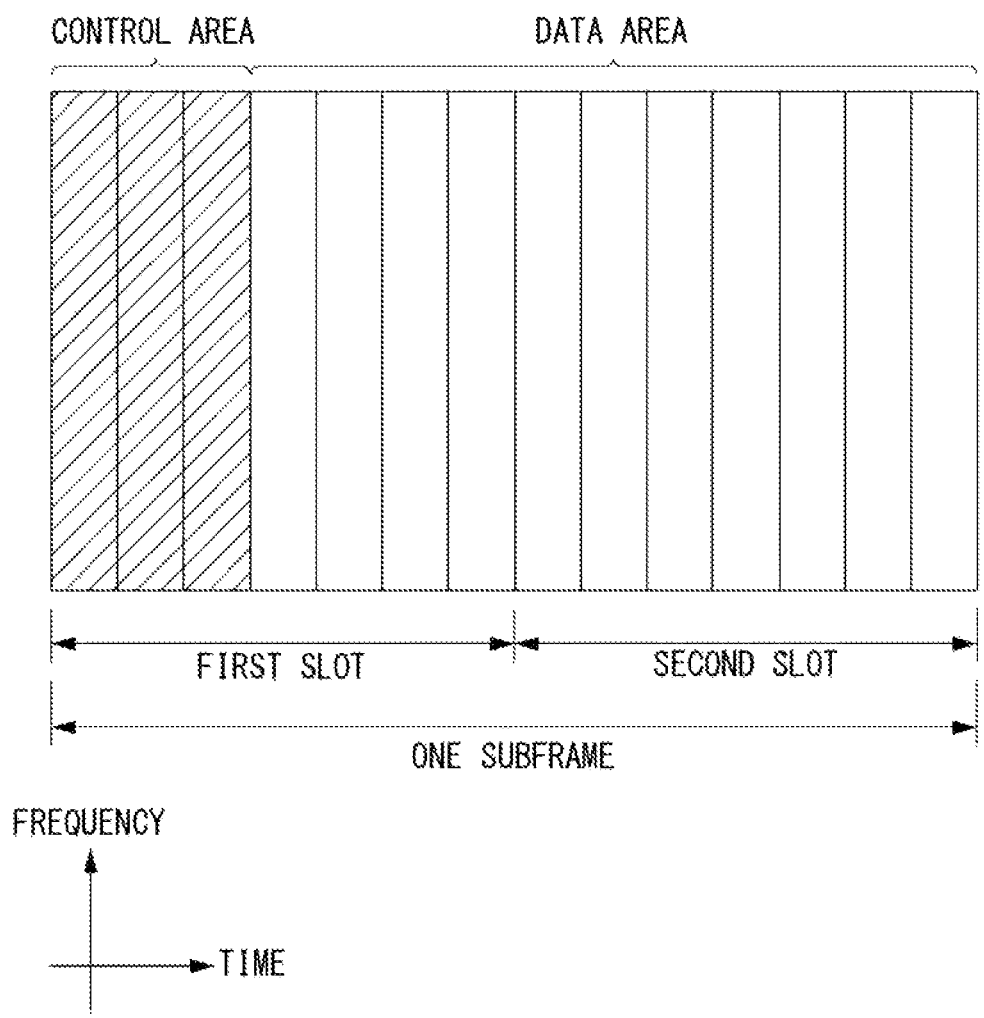
FIG. 3 is a diagram illustrating a structure of a downlink subframe in a wireless communication system to which the present invention may be applied.

FIG. 3 illustrates a structure of a downlink subframe in a wireless communication system to which the present disclosure may be applied.

Referring to FIG. 3, in a first slot within a subframe, up to three OFDM symbols are a control region to which control channels are allocated, and the remaining OFDM symbols are a data region to which a physical downlink shared channel (PDSCH) is allocated. Examples of downlink control channels used in 3GPP LTE include Physical Control Format Indicator Channel (PCFICH), Physical Downlink Control Channel (PDCCH), Physical Hybrid-ARQ Indicator Channel (PHICH), and the like.

The PCFICH is transmitted in a first OFDM symbol of a subframe, and carries information on the number of OFDM symbols (i.e. the size of the control region) used for transmission of control channels in the subframe. The PHICH is a response channel for the uplink and carries an acknowledgment (ACK)/not-acknowledgement (NACK) signal for a Hybrid Automatic Repeat Request (HARD). The control information transmitted through the PDCCH is called downlink control information (DCI). The downlink control information includes uplink resource allocation information, downlink resource allocation information, or an uplink transmission (Tx) power control command for an arbitrary terminal group.

PDCCH may carry the resource allocation and transmission format of Downlink Shared Channel (DL-SCH) (this is also referred to as a downlink grant), resource allocation

TABLE 2

| | Normal cyclic prefix in downlink | | | Extended cyclic prefix in downlink | | |
| --- | --- | --- | --- | --- | --- | --- |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | | | 7680 · $T_s$ | | |
| 1 | 19760 · $T_s$ | | | 20480 · $T_s$ | 2192 · $T_s$ | 2560 · $T_s$ |
| 2 | 21952 · $T_s$ | 2192 · $T_s$ | 2560 · $T_s$ | 23040 · $T_s$ | | |
| 3 | 24144 · $T_s$ | | | 25600 · $T_s$ | | |
| 4 | 26336 · $T_s$ | | | 7680 · $T_s$ | | |
| 5 | 6592 · $T_s$ | | | 20480 · $T_s$ | 4384 · $T_s$ | 5120 · $T_s$ |
| 6 | 19760 · $T_s$ | 4384 · $T_s$ | 5120 · $T_s$ | 23040 · $T_s$ | | |
| 7 | 21952 · $T_s$ | | | — | — | — |
| 8 | 24144 · $T_s$ | | | — | — | — |

The structure of the radio frame according to the example of FIG. 1 is only one example, and the number of subcarriers included in the radio frame, the number of slots included in the subframe, and the number of OFDM symbols included in the slot may be variously changed.

Figure 2:
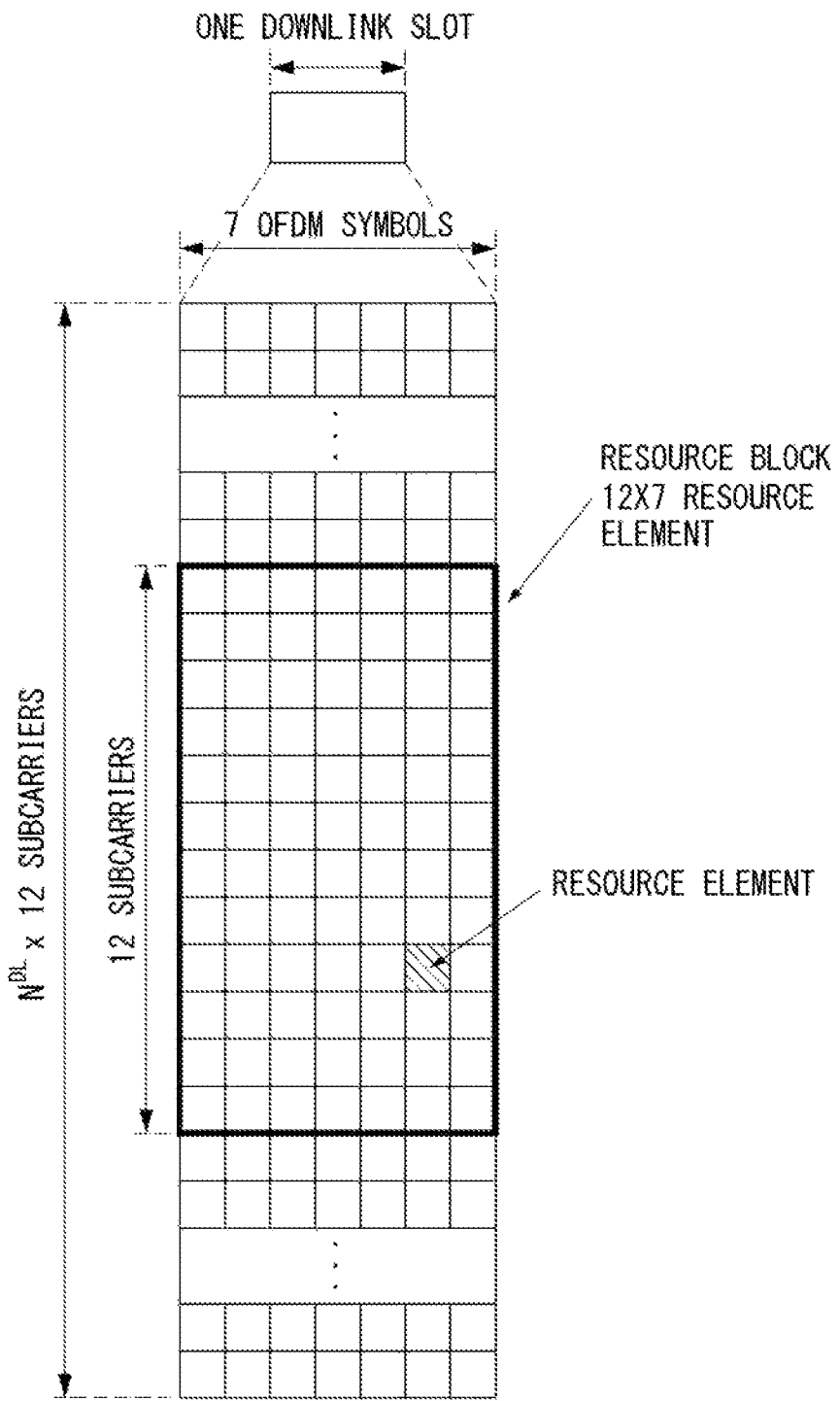
FIG. 2 is a diagram illustrating a resource grid for one downlink slot in a wireless communication system to which the present invention may be applied.

FIG. 2 is a diagram illustrating a resource grid for one downlink slot in a wireless communication system to which the present invention may be applied.

Referring to FIG. 2, one downlink slot includes a plurality of OFDM symbols in the time domain. Here, the case in which one downlink slot includes 7 OFDM symbols, and one resource block includes 12 subcarriers in the frequency domain is described as an example, but is not limited thereto.

Each element on the resource grid is a resource element, and one resource block (RB) includes 12×7 resource elements. The number N^DL of resource blocks included in the downlink slot depends on the downlink transmission bandwidth.

information of Uplink Shared Channel (UL-SCH) (this is also referred to as an uplink grant), paging information in the paging channel (PCH), system information in the DL-SCH, resource allocation for an upper-layer control message like a random access response transmitted in the PDSCH, a set of transmission power control commands for individual terminals in an arbitrary terminal group, activation of Voice over IP (VoIP), and the like. A plurality of PDCCHs may be transmitted in the control region, and the terminal may monitor the plurality of PDCCHs. The PDCCH is composed of a set of one or a plurality of contiguous control channel elements (CCEs). The CCE is a logical allocation unit used to provide a PDCCH with a coding rate according to a state of a radio channel. The CCE corresponds to a plurality of resource element groups. The format of the PDCCH and the number of bits of the usable PDCCH are determined according to the association between the number of CCEs and the coding rate provided by the CCEs.

The base station determines the PDCCH format according to the DCI to be transmitted to the terminal, and attaches a cyclic redundancy check (CRC) to the control information. In the CRC, a unique identifier (this is referred to as a radio network temporary identifier (RNTI)) is masked according to an owner or applications of the PDCCH. If the PDCCH is for a specific terminal, the unique identifier of the terminal may be masked to the CRC by, for example, the cell-RNTI. Alternatively, if the PDCCH is for a paging message, a paging indication identifier, for example, paging-RNTI (P-RNTI) may be masked to the CRC. If the PDCCH is for system information, more specifically, a system information block (SIB), a system information identifier, a system information RNTI (SI-RNTI) may be masked on the CRC. In order to indicate a random access response, which is a response to the transmission of the random access preamble of the terminal, a random access-RNTI (RA-RNTI) may be masked on the CRC.

Figure 4:
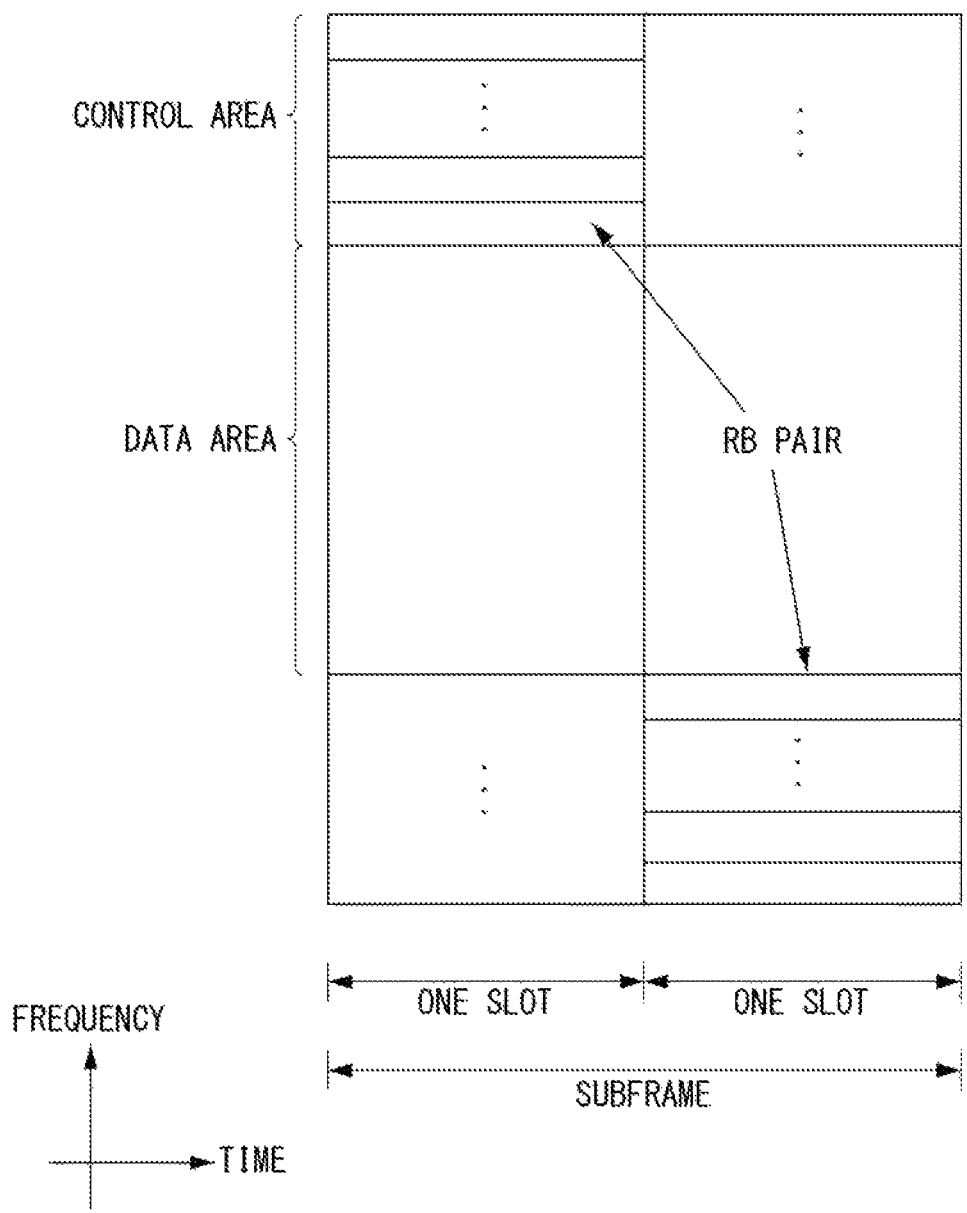
FIG. 4 is a diagram illustrating a structure of an uplink subframe in a wireless communication system to which the present invention may be applied.

FIG. 4 illustrates a structure of an uplink subframe in a wireless communication system to which the present disclosure may be applied.

Referring to FIG. 4, an uplink subframe may be divided into a control region and a data region in the frequency domain. A PUCCH (Physical Uplink Control Channel) carrying uplink control information is allocated to the control region. The data region is allocated a PUSCH (Physical Uplink Shared Channel) carrying user data. In order to maintain the single carrier characteristic, one terminal does not simultaneously transmit PUCCH and PUSCH.

The PUCCH for one terminal is allocated a resource block (RB Resource Block) pair in a subframe. RBs belonging to the RB pair occupy different subcarriers in each of the two slots. The RB pair allocated to the PUCCH is frequency hopping at the slot boundary.

General LTE System to which the Present Disclosure May be Applied

As more communication devices require larger communication capacities, there is a need for improved mobile broadband communication compared to the existing radio access technology (RAT). In addition, massive machine type communications (MTC), which connects between multiple devices and objects to provide various services anytime and anywhere, is also one of the major issues to be considered in next-generation communication. In addition, communication system designs considering services/terminals that are sensitive to reliability and latency have been discussed. As described above, introduction of next-generation radio access technology in consideration of enhanced mobile broadband communication, massive MTC, and ultra-reliable and low latency communication (URLLC) is being discussed, and in the present disclosure, the technology is called NR for convenience. NR is an expression showing an example of a 5G radio access technology (RAT).

Three main requirements areas of 5G include (1) Enhanced Mobile Broadband (eMBB) area, (2) Massive Machine Type Communication (mMTC) area, and (3) ultra-reliable and Low Latency Communications (URLLC) area.

Some use cases may require multiple areas for optimization, and other use cases may focus only on one key performance indicator (KPI). The 5G supports these various use cases in a flexible and reliable way.

The eMBB goes far beyond basic mobile Internet access, and covers rich interactive work, media and entertainment applications in the cloud or augmented reality. Data is one of the key drivers of the 5G, and it may not be able to see dedicated voice services for the first time in the 5G era. In the 5G, it is expected that voice will be processed as an application program simply using the data connection provided by the communication system. The main reasons for the increased traffic volume are an increase in content size and an increase in the number of applications requiring high data rates. Streaming services (audio and video), interactive video, and mobile Internet connections will become more widely used as more devices connect to the Internet. Many of these applications require always-on connectivity to push real-time information and notifications to the user. Cloud storage and applications are increasing rapidly on mobile communication platforms, which may be applied to both work and entertainment. The cloud storage is a special use case that drives the growth of the uplink data rate. The 5G is also used for remote work in the cloud and requires much lower end-to-end latency to maintain a good user experience when tactile interfaces are used. Entertainment, for example, cloud gaming and video streaming is another key factor that is increasing the demand for mobile broadband capabilities. Entertainment is essential on smartphones and tablets anywhere, including high mobility environments such as trains, cars and airplanes. Another use case is augmented reality and information retrieval for entertainment. Here, augmented reality requires very low latency and an instantaneous amount of data.

In addition, one of the most anticipated 5G use cases relates to the function to seamlessly connect embedded sensors in all fields, i.e. mMTC. By 2020, potential IoT devices are expected to reach 20.4 billion. Industrial IoT is one of the areas where 5G plays a major role in enabling smart cities, asset tracking, smart utilities, agriculture and security infrastructure.

URLLC includes new services that will transform the industry with ultra-reliable/low-latency links such as self-driving vehicles and remote control of critical infrastructure. The level of reliability and delay is essential for smart grid control, industrial automation, robotics, and drone control and coordination.

Next, a number of examples will be described in more detail.

The 5G may complement fiber-to-the-home (FTTH) and cable-based broadband (or DOC SIS) as a means of providing streams rated at hundreds of megabits per second to gigabits per second. This high speed is required to deliver TVs in 4K or higher (6K, 8K and higher) resolutions, as well as virtual reality and augmented reality. Virtual Reality (VR) and Augmented Reality (AR) applications involve almost immersive sports events. Certain application programs may require special network settings. For example, for VR games, game companies may need to integrate the core server with the network operator's edge network server to minimize latency.

Automotive is expected to be an important new driving force in 5G, with many use cases for mobile communication to vehicles. For example, entertainment for passengers requires simultaneous high capacity and high mobility mobile broadband. The reason is that future users will continue to expect high-quality connections, regardless of their location and speed. Another application example in the automotive field is an augmented reality dashboard. It identifies an object in the dark on top of what the driver sees through the front window, and displays information that tells the driver about the distance and movement of the object overlaid. In the future, the wireless module enables communication between vehicles, exchange of information between the vehicle and the supporting infrastructure, and exchange of information between the vehicle and other connected devices (for example, devices carried by pedestrians). The safety system can lower the risk of an accident by guiding the driver through alternate courses of action to make driving safer. The next step will be a remote controlled or self-driven vehicle. This requires very reliable and very fast communication between different self-driving vehicles and between the vehicle and the infrastructure. In the future, self-driving vehicles will perform all driving activities, and drivers will be forced to focus only on traffic anomalies that the vehicle itself cannot identify. The technical requirements of self-driving vehicles require ultra-low latency and ultra-fast reliability to increase traffic safety to levels unachievable by humans.

Smart cities and smart homes, referred to as smart society, will be embedded with high-density wireless sensor networks. A distributed network of intelligent sensors will identify the conditions for cost and energy-efficient maintenance of a city or home. A similar configuration may be done for each household. Temperature sensors, window and heating controllers, burglar alarms and appliances are all wirelessly connected. Many of these sensors are typically low data rates, low power and low cost. However, for example, real-time HD video may be required in certain types of devices for surveillance.

The consumption and distribution of energy including heat or gas are highly decentralized, and requires automated control of distributed sensor networks. The smart grid interconnects these sensors using digital information and communication technologies to collect information and act accordingly. This information can include the behavior of suppliers and consumers, allowing smart grids to improve efficiency, reliability, economics, sustainability of production and the distribution of fuels such as electricity in an automated way. The smart grid can also be viewed as another low-latency sensor network.

The health sector has many applications that can benefit from mobile communications. The communication system can support telemedicine providing clinical care from remote locations. This can help reduce barriers to distance and improve access to medical services that are not consistently available in remote rural areas. It is also used to save lives in critical care and emergencies. A wireless sensor network based on mobile communication may provide remote monitoring and sensors for parameters such as heart rate and blood pressure.

Wireless and mobile communications are becoming increasingly important in industrial applications. Wiring is expensive to install and maintain. Thus, the possibility of replacing cables with reconfigurable wireless links is an attractive opportunity for many industries. However, achieving this requires that the wireless connection operates with a delay, reliability and capacity similar to that of the cable, and its management needs to be simplified. Low latency and very low error probability are new requirements that need to be connected to 5G.

Logistics and freight tracking are important use cases for mobile communications that enable tracking of inventory and packages anywhere using location-based information systems. Logistics and freight tracking use cases typically require low data rates, but require a wide range and reliable location information.

Artificial Intelligence (AI)

Artificial intelligence refers to the field of researching artificial intelligence or the methodology to create it, and machine learning (Machine Learning) refers to the field of researching methodologies to define and solve various problems dealt with in the field of artificial intelligence. Machine learning is also defined as an algorithm that improves the performance of a task through continuous experience.

An artificial neural network (ANN) is a model used in machine learning, and may refer to an overall model with problem-solving capabilities, which is composed of artificial neurons (nodes) that form a network by combining synapses. The artificial neural network may be defined by a connection pattern between neurons of different layers, a learning process for updating model parameters, and an activation function for generating an output value.

The artificial neural network may include an input layer, an output layer, and optionally one or more hidden layers. Each layer includes one or more neurons, and the artificial neural network may include neurons and synapses connecting neurons. In an artificial neural network, each neuron can output a function of an activation function for input signals, weights, and biases input through synapses.

Model parameters refer to parameters determined through learning, and include weights of synaptic connections and biases of neurons. In addition, the hyperparameter refers to a parameter that should be set before learning in a machine learning algorithm, and includes a learning rate, an iteration count, a mini-batch size, and an initialization function.

The purpose of learning the artificial neural network may be seen as determining the model parameters that minimize the loss function. The loss function may be used as an index to determine an optimal model parameter in the learning process of the artificial neural network.

Machine learning may be classified into supervised learning, unsupervised learning, and reinforcement learning according to the learning method.

Supervised learning may refer to a method of training an artificial neural network when a label for training data is given, and a label may refer to the correct answer (or result value) that the artificial neural network should infer when training data is input to the artificial neural network. Unsupervised learning may refer to a method of training an artificial neural network in a state in which a label for training data is not given. Reinforcement learning may mean a learning method in which an agent defined in a certain environment learns to select an action or sequence of actions that maximizes the cumulative reward in each state.

Among artificial neural networks, machine learning implemented as a deep neural network (DNN) including a plurality of hidden layers is sometimes referred to as deep learning (deep learning), and deep learning is a part of machine learning. Hereinafter, the machine learning is used as meaning including deep learning Robot A robot may refer to a machine that automatically processes or operates a task given by its own capabilities. In particular, a robot having a function of recognizing the environment and performing an operation by self-determining may be referred to as an intelligent robot.

Robots may be classified into industrial, medical, household, military, etc. depending on the purpose or field of use.

The robot may be provided with a driving unit including an actuator or a motor to perform various physical operations such as moving a robot joint. In addition, the movable robot includes a wheel, a brake, a propeller, and the like in a driving unit, and can travel on the ground or fly in the air through the driving unit.

Self-Driving, Autonomous-Driving

Autonomous driving means self-driving technology, and autonomous driving vehicle means a vehicle that is driven without a user's manipulation or with a user's minimal manipulation.

For example, autonomous driving may include a technology that maintains a driving lane, a technology that automatically adjusts the speed such as adaptive cruise control, a technology that automatically travels along a specified route, a technology that automatically sets a route when a destination is set, etc.

The vehicle includes all of a vehicle including only an internal combustion engine, a hybrid vehicle including an internal combustion engine and an electric motor, and an electric vehicle including only an electric motor, and may include not only automobiles, but also trains and motorcycles, and the like.

In this case, the autonomous vehicle may be viewed as a robot having an autonomous driving function.

eXtended Reality (XR)

The extended reality collectively refers to virtual reality (VR), augmented reality (AR), and mixed reality (MR). VR technology provides only CG images of real world objects or backgrounds, AR technology provides virtually created CG images on top of real object images, and MR technology is computer graphics technology that mix and combine virtual objects in the real world.

The MR technology is similar to AR technology in that it shows real and virtual objects together. However, in AR technology, a virtual object is used in a form that complements a real object, whereas in MR technology, a virtual object and a real object are used with equal characteristics.

The XR technology may be applied to a head-mount display (HMD), a head-up display (HMD), a mobile phone, a tablet PC, a laptop, a desktop, TV, a digital signage, and the like, and the apparatus to which the XR technology is applied may be referred to as the XR device.

A new RAT system including NR uses an OFDM transmission scheme or a transmission scheme similar thereto. The new RAT system may follow OFDM parameters different from those of LTE. Alternatively, the new RAT system follows the numerology of the existing LTE/LTE-A as it is, but may have a larger system bandwidth (e.g. 100 MHz). Alternatively, one cell may support a plurality of numerology. That is, terminals operating in different numerology can coexist in one cell.

Numerology corresponds to one subcarrier spacing in the frequency domain. By scaling the reference subcarrier spacing to an integer N, different numerology may be defined.

Definition of Terms eLTE eNB: eLTE eNB is an evolution of eNB that supports connectivity to EPC and NGC.

gNB: A node that supports NR as well as connection with NGC.

New RAN: A radio access network that supports NR or E-UTRA or interacts with NGC.

Network slice: A network slice is a network defined by an operator to provide an optimized solution for specific market scenarios that require specific requirements with end-to-end coverage.

Network function: A network function is a logical node within a network infrastructure with well-defined external interfaces and well-defined functional behaviors.

NG-C: Control plane interface used for the NG2 reference point between the new RAN and NGC.

NG-U: User plane interface used for the NG3 reference point between the new RAN and NGC.

Non-stand-alone NR: A deployment configuration in which the gNB requests an LTE eNB as an anchor for control plane connection to EPC or an eLTE eNB as an anchor for control plane connection to NGC.

Non-stand-alone E-UTRA: Deployment configuration in which eLTE eNB requires gNB as anchor for control plane connection to NGC.

User plane gateway: Endpoint of the NG-U interface.

General System

Figure 5:
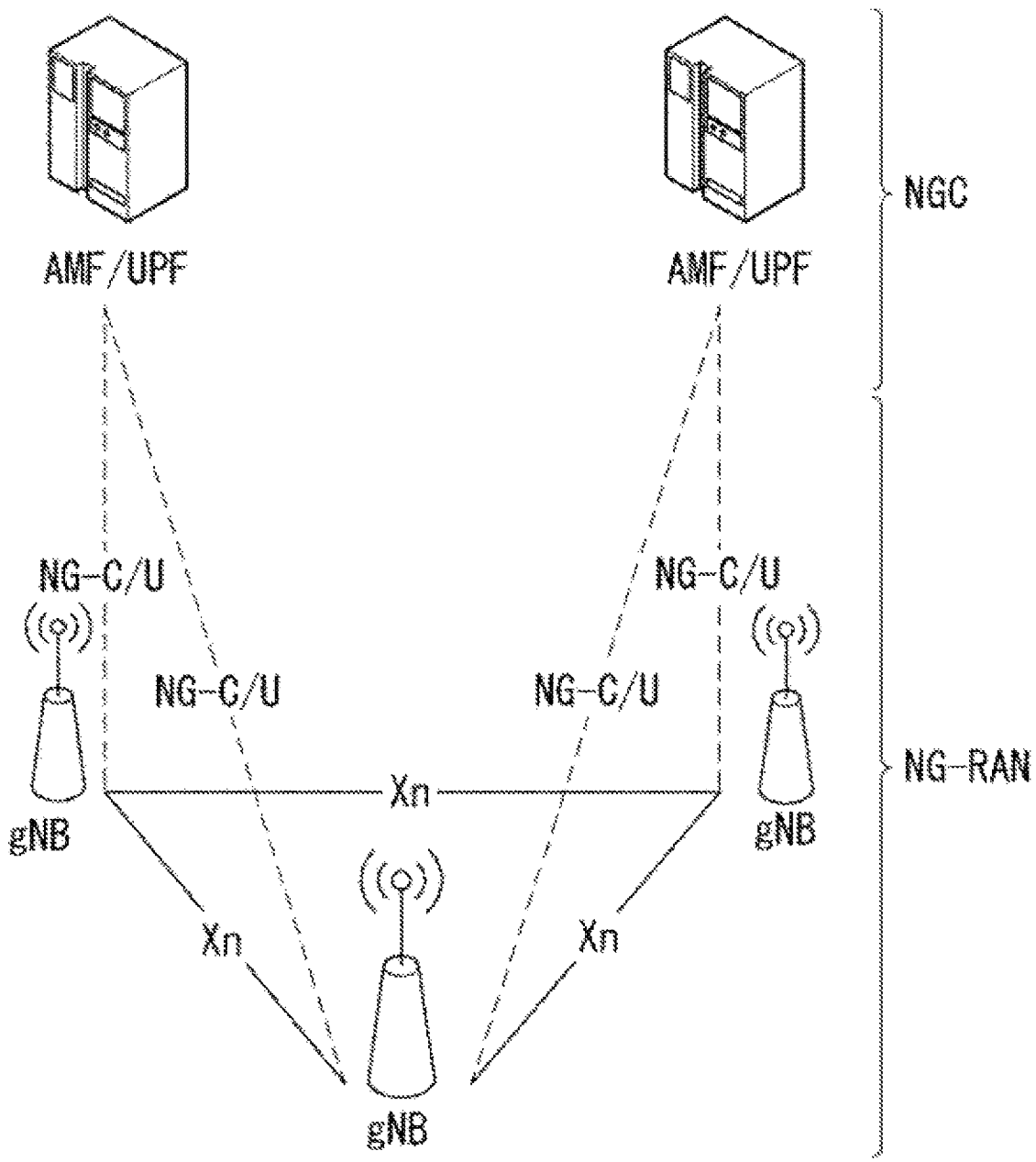
FIG. 5 is a diagram illustrating an example of an overall system structure of an NR to which the method proposed in the present disclosure may be applied.

FIG. 5 is a diagram illustrating an example of an overall system structure of an NR to which the method proposed in the present disclosure may be applied.

Referring to FIG. 5, the NG-RAN is composed of gNBs that provide an NG-RA user plane (new AS sublayer/PDCP/RLC/MAC/PHY) and a control plane (RRC) protocol termination for user equipment (UE).

The gNBs are interconnected through an Xn interface.

The gNB is also connected to the NGC through the NG interface.

More specifically, the gNB is connected to an Access and Mobility Management Function (AMF) through an N2 interface and a User Plane Function (UPF) through an N3 interface.

NR (New Rat) Numerology and Frame Structure

In the NR system, multiple numerologies may be supported. Here, the numerology may be defined by subcarrier spacing and cyclic prefix (CP) overhead. In this case, the plurality of subcarrier spacings may be derived by scaling the basic subcarrier spacing by an integer N (or μ). Further, even if it is assumed that a very low subcarrier spacing is not used at a very high carrier frequency, the numerology to be used may be selected independently of the frequency band.

In addition, in the NR system, various frame structures according to a number of numerology may be supported.

Hereinafter, an Orthogonal Frequency Division Multiplexing (OFDM) numerology and frame structure that may be considered in an NR system will be described.

A number of OFDM numerology supported in the NR system may be defined as shown in Table 3.

TABLE 3

| μ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Regarding the frame structure in the NR system, the sizes of various fields in the time domain are expressed as multiples of the time unit of $T_s=1/(\Delta f_{max} \cdot N_f)$. Here, $\Delta f_{max}=480 \cdot 10^3$ and $N_f=4096$. The downlink and uplink transmission is composed of a radio frame having a period of $T_f=(\Delta f_{max} N_f/100) \cdot T_s=10$ ms. Here, the radio frame is composed of 10 subframes having each period of $T_{sf}=(\Delta f_{max} N_f/1000) \cdot T_s=1$ ms. In this case, there may be one set of frames for uplink and one set of frames for downlink.

Figure 6:
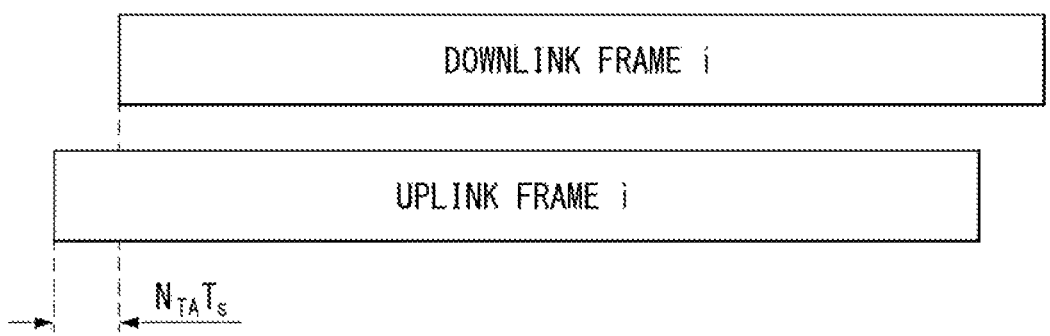
FIG. 6 is a diagram a relationship between an uplink frame and a downlink frame in a wireless communication system to which the method proposed in the present disclosure may be applied.

FIG. 6 is a diagram a relationship between an uplink frame and a downlink frame in a wireless communication system to which the method proposed in the present disclosure may be applied.

As illustrated in FIG. 6, transmission of an uplink frame number i from a user equipment (UE) should start before the start of a corresponding downlink frame in the corresponding terminal.

For numerology μ, slots are numbered in an increasing order of $n_s^{\mu} \in \{0, \ldots, N_{subframe}^{slots,\mu}-1\}$ in a subframe, and numbered in an increasing order of $n_{s,f}^{\mu} \in \{0, \ldots, N_{frame}^{slots,\mu}-1\}$ in a radio frame. One slot is composed of contiguous OFDM symbols of $N_{symb}^{\mu}$ and $N_{symb}^{\mu}$ is determined according to the numerology used and the slot configuration. The start of the slot $n_s^{\mu}$ in the subframe is temporally aligned with the start of the OFDM symbol $n_s^{\mu} N_{symb}^{\mu}$ in the same subframe.

Not all UEs can simultaneously transmit and receive, which means that all OFDM symbols of a downlink slot or an uplink slot may not be used.

Table 4 shows the number $N_{symb}^{slot}$ of OFDM symbols per slot in a normal CP, the number $N_{slot}^{frame,\mu}$ of slots per radio frame, and the number $N_{slot}^{subframe,\mu}$ of slots per subframe, and Table 5 indicates the number of symbols, the number of slots per radio frame, and the number of slots per subframe.

TABLE 4

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 5

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

Figure 7:
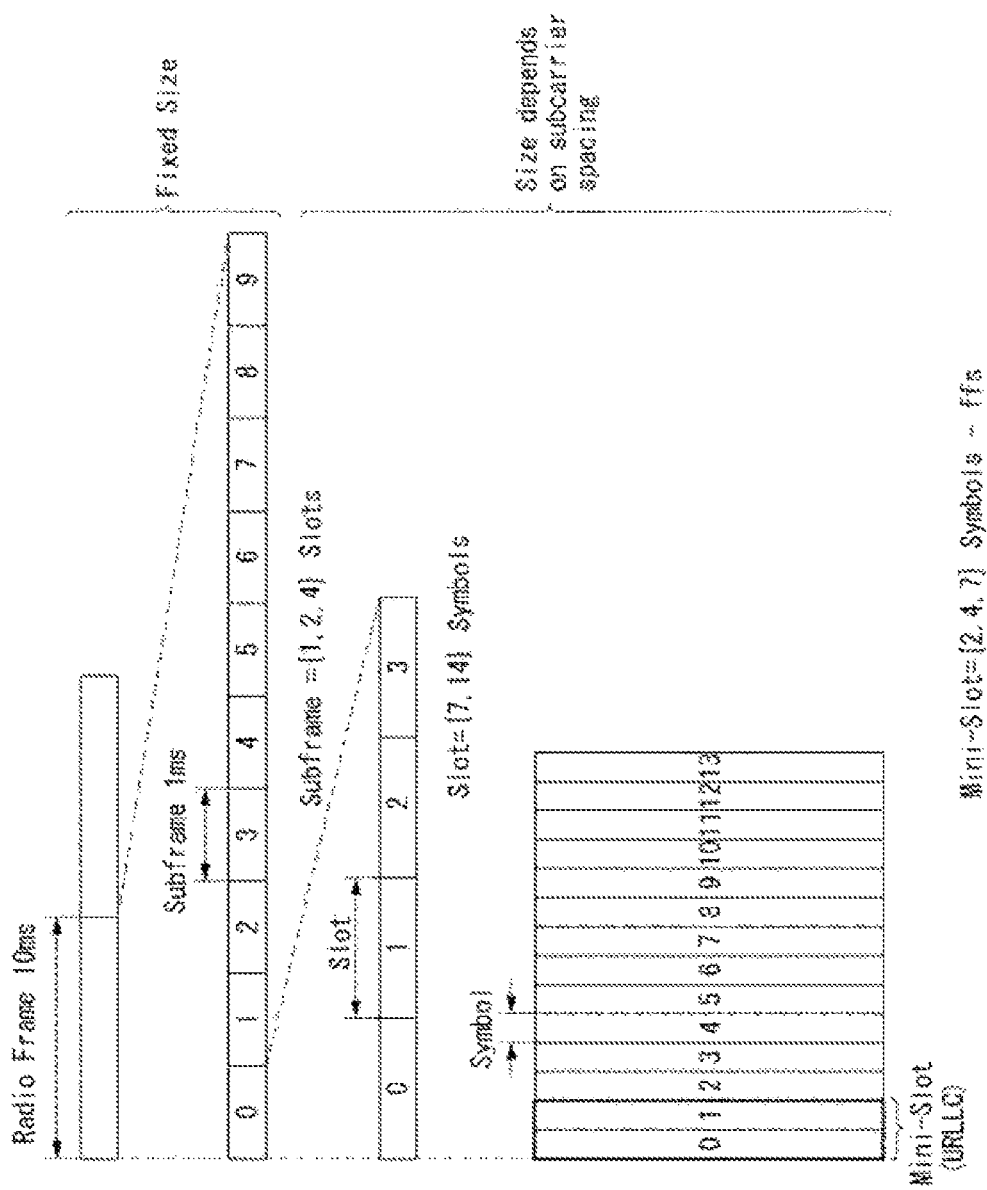
FIG. 7 is a diagram illustrating an example of a frame structure in an NR system.

FIG. 7 is a diagram illustrating an example of a frame structure in an NR system.

FIG. 7 is merely for convenience of explanation, and does not limit the scope of the present disclosure.

In the case of Table 5, $\mu=2$, that is, as an example of a case where the subcarrier spacing (SCS) is 60 kHz, referring to Table 4, 1 subframe (or frame) may include 4 slots, 1 subframe={1,2,4} slots shown in FIG. 3 are examples, and the number of slot(s) that may be included in 1 subframe may be defined as shown in Table 2.

In addition, a mini-slot may be composed of 2, 4 or 7 symbols, or may be composed of more or fewer symbols.

In relation to the physical resource in the NR system, an antenna port, a resource grid, a resource element, a resource block, a carrier part, etc. may be considered.

Hereinafter, the physical resources that may be considered in the NR system will be described in detail.

First, regarding the antenna port, the antenna port is defined such that a channel carrying a symbol on the antenna port may be inferred from a channel carrying another symbol on the same antenna port. When the large-scale property of a channel carrying a symbol on one antenna port may be inferred from a channel carrying a symbol on another antenna port, the two antenna ports may have QC/QCL (quasi co-located or quasi co-location) relationship. Here, the wide range characteristic includes one or more of delay spread, Doppler spread, frequency shift, average received power, and received timing.

Figure 8:
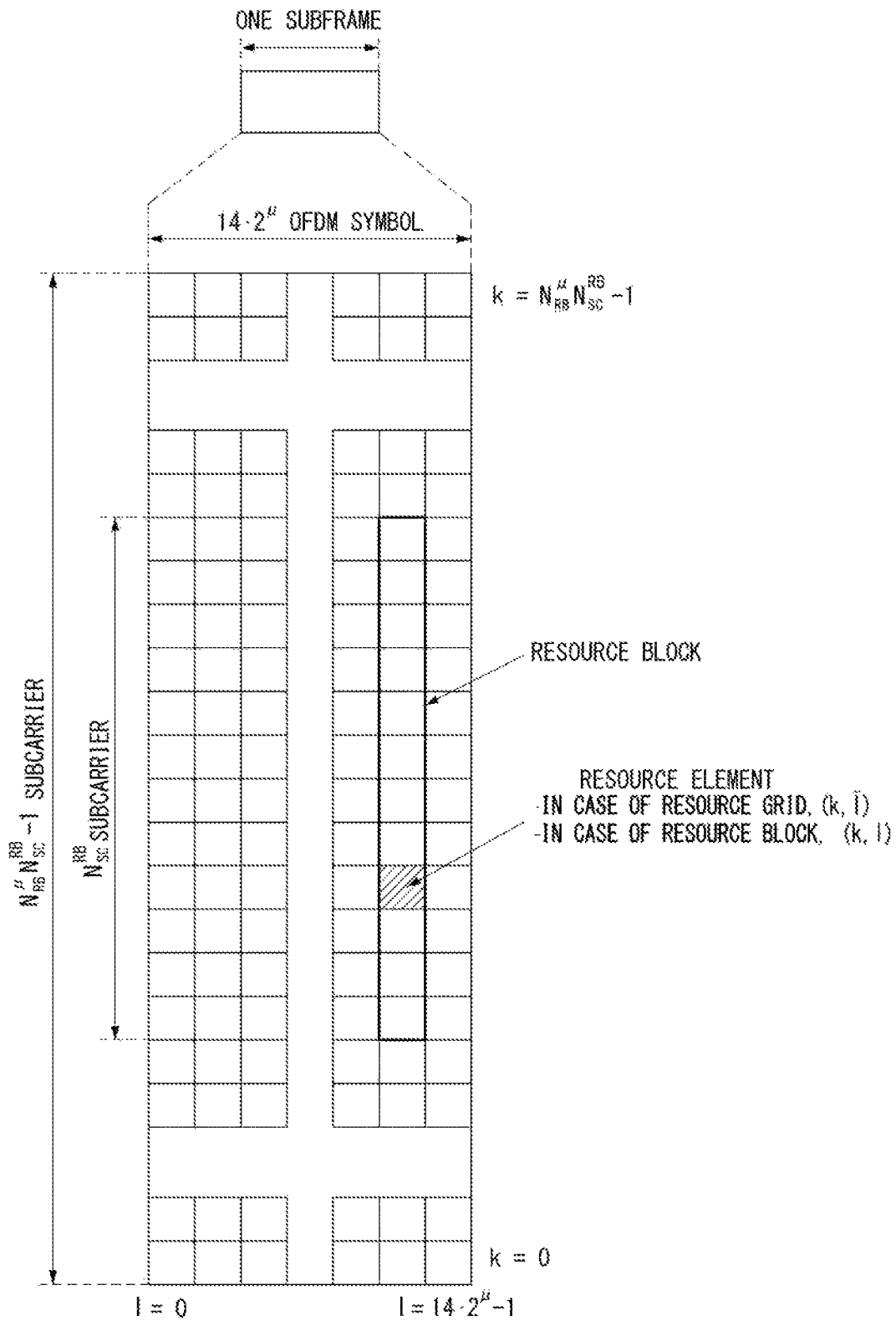
FIG. 8 is a diagram illustrating an example of a resource grid supported by a wireless communication system to which the method proposed in the present disclosure may be applied.

FIG. 8 is a diagram illustrating an example of a resource grid supported by a wireless communication system to which the method proposed in the present disclosure may be applied.

Referring to FIG. 8, it is illustratively described that a resource grid is composed of subcarriers $N_{RB}^{\mu} N_{sc}^{RB}$ in a frequency domain and one subframe is composed of 14·2$\mu$ OFDM symbols, but is not limited thereto.

In an NR system, a transmitted signal is described by one or more resource grids composed of subcarriers $N_{RB}^{\mu} N_{sc}^{RB}$ and OFDM symbols of $2^{\mu} N_{symb}^{(\mu)}$. Here, $N_{RB}^{\mu} \leq N_{RB}^{max,\mu}$. $N_{RB}^{max,\mu}$ represents the maximum transmission bandwidth, which may vary between uplink and downlink as well as numerology.

Figure 9:
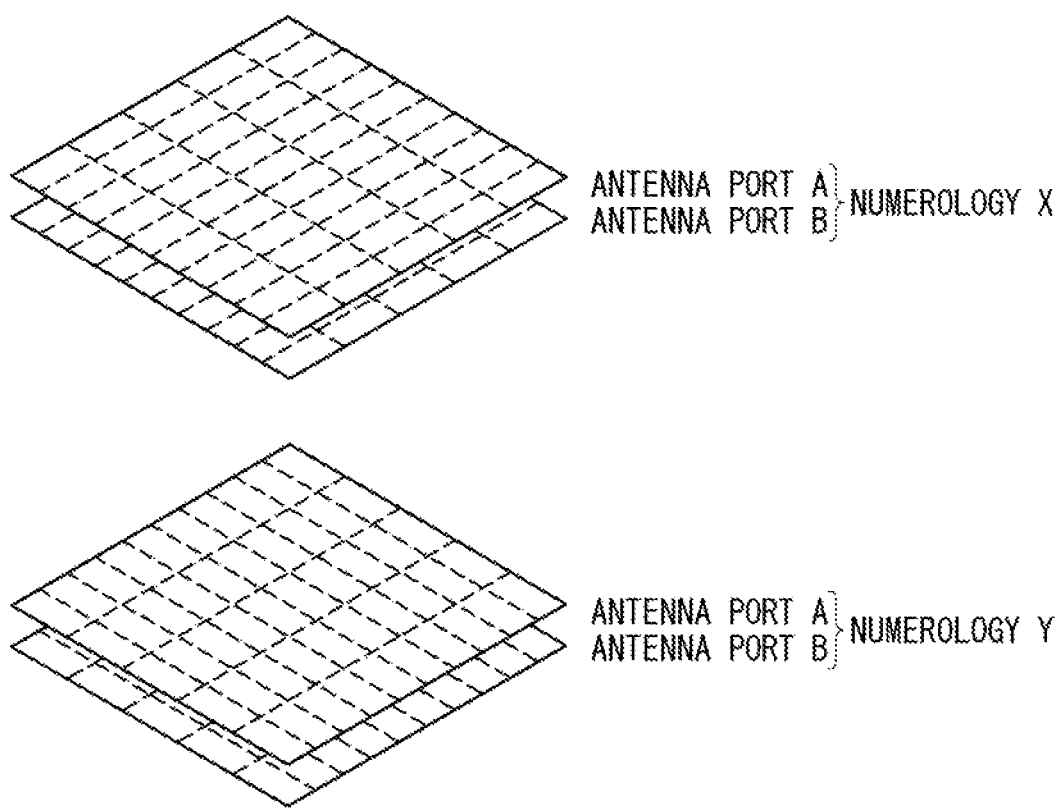
FIG. 9 is a diagram illustrating examples of an antenna port and a resource grid for each numerology to which the method proposed in the present disclosure may be applied.

In this case, as shown in FIG. 9, one resource grid may be configured for each numerology $\mu$ and antenna port p.

FIG. 9 is a diagram illustrating examples of an antenna port and a resource grid for each numerology to which the method proposed in the present disclosure may be applied.

Each element of the resource grid for numerology $\mu$ and antenna port p is referred to as a resource element, and is uniquely identified by an index pair (k, l̄). Here, k=0, ..., $N_{RB}^{\mu} N_{sc}^{RB}-1$ is the index on the frequency domain, and l̄=0, ..., $2^{\mu} N_{symb}^{(\mu)}-1$ is the position of the symbol in the subframe. When referring to a resource element in a slot, an index pair (k,l) is used. Here, l=0, ..., $N_{symb}^{\mu}-1$.

Resource elements (k, l̄) for numerology $\mu$ and antenna port p correspond to complex values $a_{k,\bar{l}}^{(p,\mu)}$. When there is no risk of confusion or when a specific antenna port or numerology is not specified, the indices p and $\mu$ may be dropped, and as a result, the complex value may be $a_{k,\bar{l}}^{(p)}$ or $a_{k,\bar{l}}$.

In addition, a physical resource block is defined as $N_{sc}^{RB}=12$ contiguous subcarriers in the frequency domain.

Point A serves as a common reference point of the resource block grid and may be obtained as follows.

OffsetToPointA for the PCell downlink indicates the frequency offset between the lowest subcarrier of the lowest resource block and point A of the lowest resource block overlapping the SS/PBCH block used by the UE for initial cell selection, and represented in resource block units assuming a 15 kHz subcarrier spacing for FR1 and a 60 kHz subcarrier spacing for FR2;

absoluteFrequencyPointA represents the frequency-position of point A expressed as in the absolute radio-frequency channel number (ARFCN).

Common resource blocks are numbered upward from 0 in the frequency domain for subcarrier spacing setting $\mu$.

The center of subcarrier 0 of the common resource block 0 for the subcarrier spacing setting $\mu$ coincides with 'point A'. In the frequency domain, the common resource block number $n_{CRB}^{\mu}$ and the resource elements (k,l) for the subcarrier spacing setting $\mu$ may be given as Equation 1 below.

$$n_{CRB}^{\mu} = \left\lfloor \frac{k}{N_{sc}^{RB}} \right\rfloor \quad \text{[Equation 1]}$$

Here, k may be defined relative to point A so that k=0 corresponds to a subcarrier centered on this point A. Physical resource blocks are numbered from 0 to $N_{BWP,i}^{size}-1$ within the bandwidth part (BWP), and i is the number of the BWP. In BWP i, the relationship between the physical resource block $n_{PRB}$ and the common resource block $n_{CRB}$ may be given by Equation 2 below.

$$n_{CRB} = n_{PRB} + N_{BWP,i}^{start} \quad \text{[Equation 2]}$$

Here, $N_{BWP,i}^{start}$ may be a common resource block in which the BWP starts relative to the common resource block 0.

On the other hand, PRB grid of each numerology supported by the carrier, BWP setting in each carrier of DL/UL (supporting up to 4 BWP), code block group (CBG) setting, transmission power control (TPC) per cell group, HARQ Process, scrambling/sequence related parameters, etc. may be set at the carrier level. A control resource set (set per cell, but associated per BWP), resource allocation-related parameters and DM-RS settings, CSI-RS-related parameters, SRS resource set, HARQ-ACK and SR (schedule request) resources, configured UL grant, etc. may be set in the BWP stage.

MTC (Machine Type Communication)

MTC (Machine Type Communication) is an application that does not require a lot of throughput that may be applied to M2M (Machine-to-Machine) or IoT (Internet-of-Things), and refers to a communication technology adopted to meet the requirements of IoT services in the 3rd Generation Partnership Project (3GPP).

MTC may be implemented to satisfy the criteria of (i) low cost and low complexity, (ii) enhanced coverage, and (iii) low power consumption.

In 3GPP, MTC has been applied from release 10, and briefly looks at the features of MTC added for each release of 3GPP.

First, the MTC described in 3GPP release 10 and release 11 relates to a load control method.

The load control method is to prevent IoT (or M2M) devices from suddenly putting a load on the base station in advance.

More specifically, release 10 relates to a method of controlling, by a base station, the load by disconnecting the connection to the connected IoT devices when a load occurs, and release 11 relates to a method of blocking access to the terminal in advance by notifying a terminal in advance that the base station will access later through broadcasting such as SIB14.

In the case of Release 12, a feature for low cost MTC was added, and for this purpose, UE category 0 was newly defined. UE category is an indicator of how much data a terminal can process in a communication modem.

That is, UE category 0 UEs reduce the baseband and RF complexity of UEs by using a half duplex operation with a reduced peak data rate, relaxed RF requirements, and a single receiving antenna.

In Release 13, a technology called eMTC (enhanced MTC) was introduced, and by operating only at 1.08 MHz, which is the minimum frequency bandwidth supported by legacy LTE, the price and power consumption may be further lowered.

The contents described below are mainly features related to eMTC, but may be equally applied to MTC, eMTC, and MTC applied to 5G (or NR) unless otherwise specified. Hereinafter, for convenience of description, it will be collectively referred to as MTC.

Therefore, the MTC to be described later may be referred to in other terms such as eMTC (enhanced MTC), LTE-M1/M2, BL (Bandwidth reduced low complexity)/CE (coverage enhanced), non-BL UE (in enhanced coverage), NR MTC, and enhanced BL/CE. That is, the term MTC may be replaced with a term to be defined in the future 3GPP standard.

1) General MTC Feature (1) MTC operates only in a specific system bandwidth (or channel bandwidth).

The specific system bandwidth may use 6 RB of legacy LTE as shown in Table 6 below, and may be defined in consideration of the frequency range and subcarrier spacing (SCS) of the NR defined in Tables 7 to 9. The specific system bandwidth may be expressed as a narrowband (NB). For reference, Legacy LTE refers to a part described in 3GPP standards other than MTC. Preferably, in the NR, the MTC may operate using RBs corresponding to the lowest system bandwidth of Tables 8 and 9 below, as in legacy LTE. Alternatively, in NR, the MTC may operate in at least one bandwidth part (BWP) or may operate in a specific band of the BWP.

TABLE 6

| Channel bandwidth BWChannel [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

Table 7 is a table showing the frequency range (FR) defined in NR.

TABLE 7

| Frequency range designation | Corresponding frequency range |
|---|---|
| FR1 | 450 MHz-6000 MHz |
| FR2 | 24250 MHz-52600 MHz |

Table 8 is a table showing an example of the maximum transmission bandwidth configuration (NRB) for the channel bandwidth and SCS in FR 1 of NR.

TABLE 8

| SCS (kHz) | 5 MHz NRB | 10 MHz NRB | 15 MHz NRB | 20 MHz NRB | 25 MHz NRB | 30 MHz NRB | 40 MHz NRB | 50 MHz NRB | 60 MHz NRB | 80 MHz NRB | 90 MHz NRB | 100 MHz NRB |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

Table 9 is a table showing an example of the maximum transmission bandwidth configuration (NRB) for the channel bandwidth and SCS in FR 2 of NR.

TABLE 9

| SCS (kHz) | 50 MHz NRB | 100 MHz NRB | 200 MHz NRB | 400 MHz NRB |
|---|---|---|---|---|
| 60 | 66 | 132 | 264 | N.A |
| 120 | 32 | 66 | 132 | 264 |

The MTC narrowband (NB) will be described in more detail.

MTC follows narrowband operation to transmit and receive physical channels and signals, and the maximum channel bandwidth is reduced to 1.08 MHz or 6 (LTE) RBs.

The narrowband may be used as a reference unit for resource allocation units of some channels of downlink and uplink, and the physical location of each narrowband in the frequency domain may be defined differently according to system bandwidth.

The bandwidth of 1.08 MHz defined in MTC is defined in order for the MTC terminal to follow the same cell search and random access procedures as the legacy terminal.

MTC may be supported by cells with a much larger bandwidth (eg 10 MHz) than 1.08 MHz, but physical channels and signals transmitted/received by MTC are always limited to 1.08 MHz.

The system having the much larger bandwidth may be a legacy LTE, an NR system, a 5G system, and the like.

Narrowband is defined as six non-overlapping consecutive physical resource blocks in the frequency domain.

If $N_{NB}^{UL} \geq 4$, the wideband is defined as 4 non-overlapping narrowbands in the frequency domain. If $N_{NB}^{UL} < 4$, $N_{WB}^{UL} = 1$ and a single wideband are composed of a $N_{NB}^{UL}$ non-overlapping narrowband(s).

For example, in the case of a 10 MHz channel (50 RBs), 8 non-overlapping narrowbands are defined.

Figure 10:
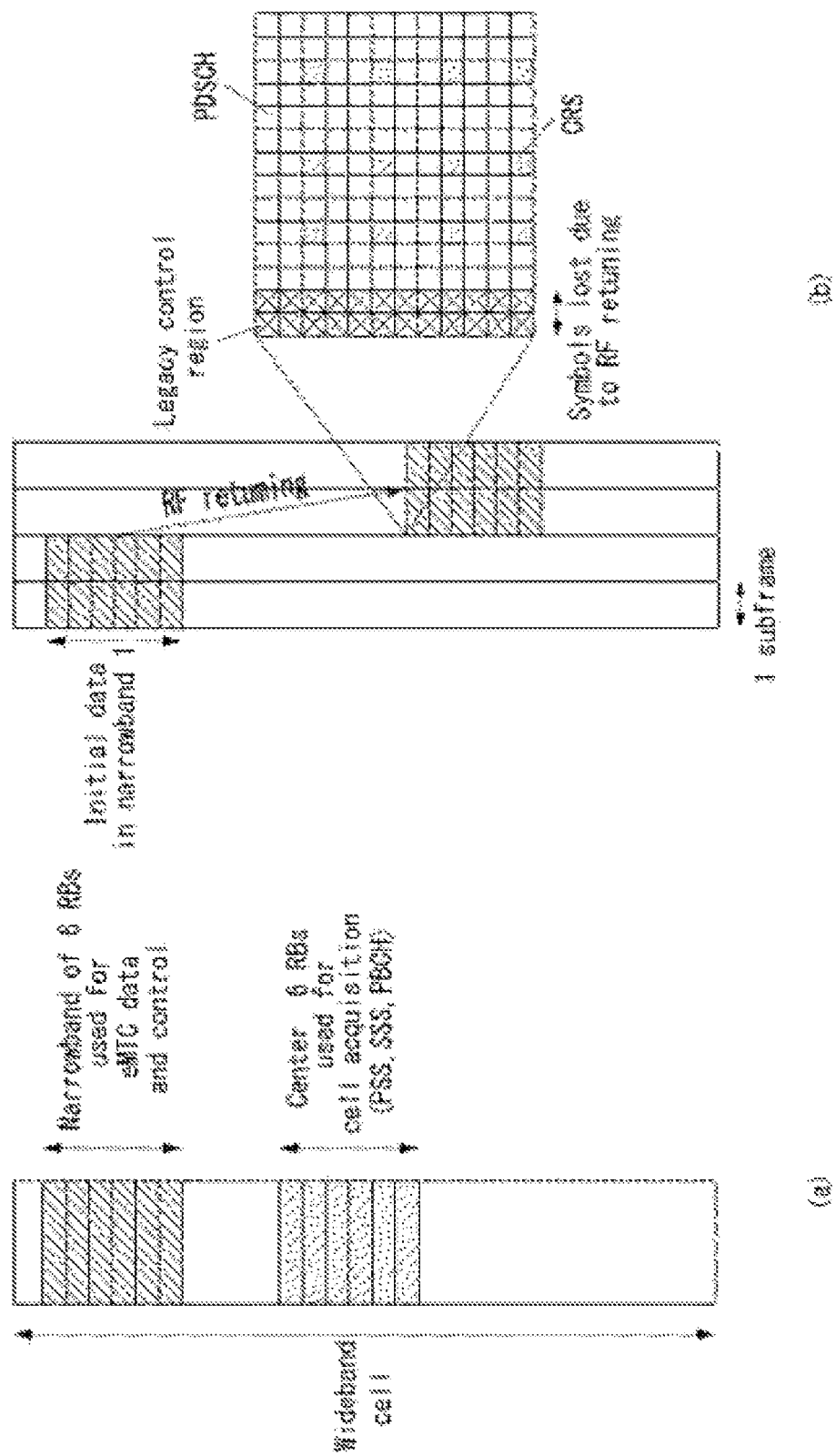
FIG. 10 is a diagram illustrating an example of a narrowband operation and frequency diversity.

FIG. 10 is a diagram illustrating an example of a narrowband operation and frequency diversity.

FIG. 10(a) is a diagram showing an example of a narrowband operation, and FIG. 10(b) is a diagram showing an example of repetition with RF retuning.

Referring to FIG. 10(b), frequency diversity by RF retuning will be described.

Due to narrowband RF, single antenna and limited mobility, MTC supports limited frequency, spatial and temporal diversity. To reduce the effects of fading and outage, frequency hopping is supported between different narrowbands by RF retuning.

This frequency hopping is applied to different uplink and downlink physical channels when repetition is possible.

For example, when 32 subframes are used for PDSCH transmission, the first 16 subframes may be transmitted on the first narrowband. At this time, the RF front-end is retuned to another narrowband, and the remaining 16 subframes are transmitted on the second narrowband.

The narrowband of the MTC may be configured by system information or downlink control information (DCI).

(2) MTC operates in a half duplex mode and uses a limited (or reduced) maximum transmit power.

(3) MTC does not use a channel (defined in legacy LTE or NR) that should be distributed over the entire system bandwidth of legacy LTE or NR.

As an example, legacy LTE channels not used for MTC are PCFICH, PHICH, and PDCCH.

Accordingly, the MTC cannot monitor the above channels and thus defines a new control channel MPDCCH (MTC PDCCH).

The MPDCCH spans up to 6 RBs in the frequency domain and one subframe in the time domain.

MPDCCH is similar to EPDCCH, and additionally supports common search space for paging and random access.

The MPDCCH is similar to the concept of E-PDCCH used in legacy LTE.

(4) MTC uses a newly defined DCI format, and may be DCI formats 6-0A, 6-0B, 6-1A, 6-1B, 6-2, etc. as an example.

(5) MTC may repeatedly transmit PBCH (physical broadcast channel), PRACH (physical random access channel), M-PDCCH (MTC physical downlink control channel), PDSCH (physical downlink shared channel), PUCCH (physical uplink control channel), and PUSCH (physical Uplink shared channel). Such MTC repetitive transmission may decode the MTC channel even when the signal quality or power is very poor, such as in a poor environment such as a basement, thereby increasing a cell radius and effecting signal penetration. The MTC can support only a limited number of transmission modes (TM) that can operate in a single layer (or single antenna), or can support a channel or a reference signal (RS) that can operate in a single layer. For example, the transmission mode in which the MTC can operate may be TM 1, 2, 6 or 9.

(6) HARQ retransmission of MTC is adaptive and asynchronous, and is based on a new scheduling assignment received on the MPDCCH.

(7) In MTC, PDSCH scheduling (DCI) and PDSCH transmission occur in different subframes (cross subframe scheduling).

(8) All resource allocation information (subframe, transport block size (TBS), subband index) for SIB1 decoding is determined by parameters of MIB, and no control channel is used for SIB1 decoding of MTC.

(9) All resource allocation information (subframe, TBS, subband index) for SIB2 decoding is determined by several SIB1 parameters, and no control channel for SIB2 decoding of MTC is used.

(10) MTC supports extended paging (DRX) cycle.

(11) MTC may use the same primary synchronization signal (PSS)/secondary synchronization signal (SSS)/common reference signal (CRS) used in legacy LTE or NR. In the case of NR, PSS/SSS is transmitted in units of an SS block (or SS/PBCH block or SSB), and a tracking RS (TRS) may be used for the same purpose as a CRS. That is, TRS is a cell-specific RS and may be used for frequency/time tracking.

2) MTC Operation Mode and Level

Next, an MTC operation mode and level will be described. MTC is classified into two operation modes (first mode and second mode) and four different levels for coverage enhancement, and may be as shown in Table 10 below.

The MTC operation mode is referred to as CE Mode. In this case, the first mode may be referred to as CE Mode A and the second mode may be referred to as CE Mode B.

TABLE 10

| Mode | Level | Description |
| --- | --- | --- |
| Mode A | Level 1 | No repetition for PRACH |
|  | Level 2 | Small Number of Repetition for PRACH |
| Mode B | Level 3 | Medium Number of Repetition for PRACH |
|  | Level 4 | Large Number of Repetition for PRACH |

The first mode is defined to improve small coverage in which complete mobility and channel state information (CSI) feedback are supported, and thus there is no repetition or a mode with a small number of repetitions. The operation of the first mode may be the same as the operation range of UE category 1. The second mode is defined for UEs with extremely poor coverage conditions supporting CSI feedback and limited mobility, and a large number of repetitive transmissions are defined. The second mode provides up to 15 dB of coverage enhancement based on the range of UE category 1. Each level of MTC is defined differently in RACH and paging procedure.

The method of determining an MTC operation mode and each level will be described.

The MTC operation mode is determined by the base station, and each level is determined by the MTC terminal. Specifically, the base station transmits RRC signaling including information on the MTC operation mode to the terminal. Here, RRC signaling may be an RRC connection setup message, an RRC connection reconfiguration message, or an RRC connection reestablishment message. Here, the term of the message may be expressed as an information element (IE).

Thereafter, the MTC terminal determines a level within each operation mode and transmits the determined level to the base station. Specifically, the MTC terminal determines the level in the operation mode based on the measured channel quality (e.g. RSRP, RSRQ or SINK), and notifies the determined level to the base station using PRACH resources (frequency, time, preamble) corresponding to the determined level.

3) MTC Guard Period

As described above, MTC operates in the narrowband. The position of the narrowband may be different for each specific time unit (e.g. subframe or slot). The MTC terminal tunes to different frequencies in all time units. Therefore, a certain time is required for all frequency retuning, and this certain time is defined as the guard period of the MTC. That is, when switching from one time unit to the next time unit, the guard period is required, and the transmission and reception do not occur during the period.

The guard period is defined differently depending on whether it is a downlink or an uplink, and is defined differently according to a downlink or uplink situation. First, the guard period defined in the uplink is defined differently according to the characteristics of data carried by the first time unit (time unit N) and the second time unit (time unit N+1). Next, the guard period of the downlink requires a condition that (1) the first downlink narrowband center frequency and the second narrowband center frequency are different, and (2) in TDD, the first uplink narrowband center frequency and the second downlink center frequency are different.

Referring to the MTC guard period defined in Legacy LTE, the guard period of $N_{symb}^{retune}$ SC-FDMA symbols are generated at most for Tx-Tx frequency retuning between two contiguous subframes. When the higher layer parameter ce-RetuningSymbols is set, then $N_{symb}^{retune}$ is equal to ce-RetuningSymbols, otherwise $N_{symb}^{retune}=2$. In addition, for the MTC terminal configured with the higher layer parameter srs-UpPtsAdd, a guard period of the maximum SC-FDMA symbol is generated for Tx-Tx frequency retuning between the first special subframe for frame structure type 2 and the second uplink subframe.

Figure 11:
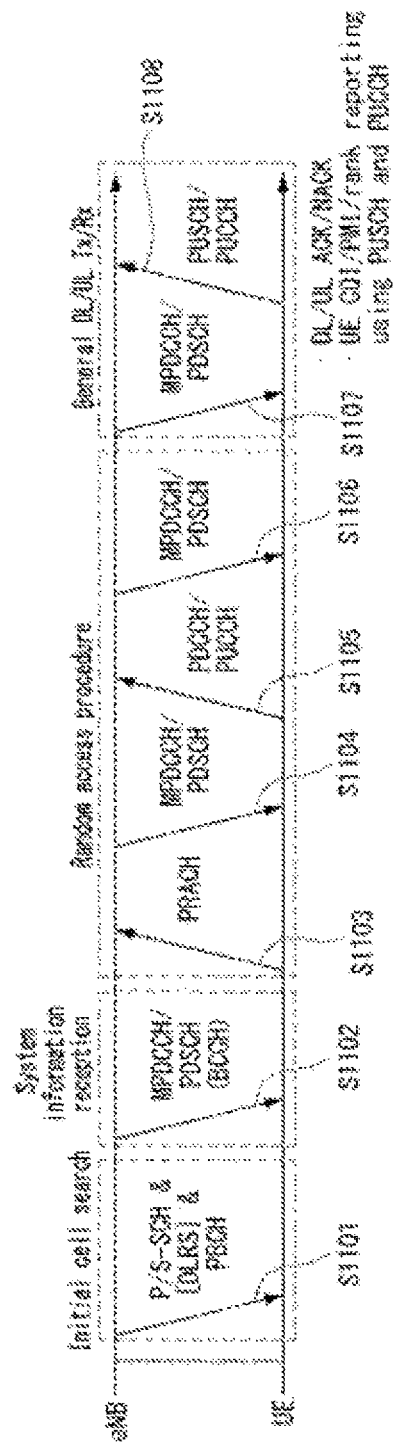
FIG. 11 is a diagram illustrating physical channels that may be used for MTC and a general signal transmission method using the physical channels.

FIG. 11 is a diagram illustrating physical channels that may be used for MTC and a general signal transmission method using the physical channels.

The MTC terminal, which is powered on again while the power is turned off, or that newly enters the cell, performs an initial cell search operation such as synchronizing with the base station in step S1101. To this end, the MTC terminal receives a Primary Synchronization Signal (PSS) and a Secondary Synchronization Signal (SSS) from the base station, synchronizes with the base station, and acquires information such as a cell identifier (ID). The PSS/SSS used for the initial cell search operation of the MTC may be a legacy LTE PSS/SSS, a Resynchronization signal (RSS), or the like.

Thereafter, the MTC terminal may receive a physical broadcast channel (PBCH) signal from the base station to obtain intra-cell broadcast information.

Meanwhile, the MTC terminal may check a downlink channel state by receiving a downlink reference signal (DL RS) in the initial cell search step. Broadcast information transmitted through the PBCH is MIB (Master Information Block), and in MTC, the MIB is repeated in a subframe (subframe #9 for FDD, subframe #5 for TDD) different from the first slot of subframe #0 of the radio frame.

PBCH repetition is performed by repeating exactly the same constellation (constellation) point in different OFDM symbols so that it may be used for initial frequency error estimation even before attempting PBCH decoding.

Figure 12:
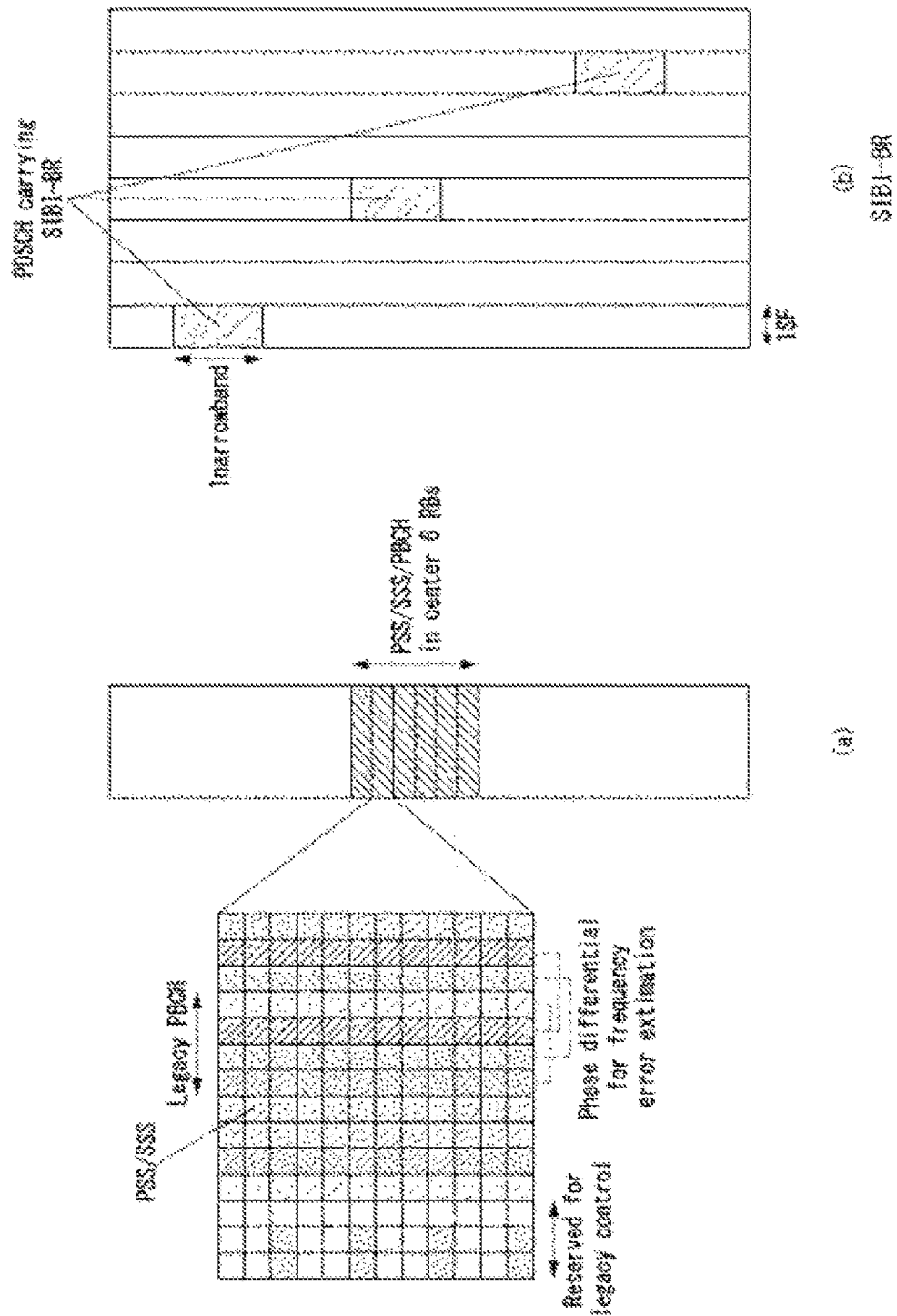
FIG. 12 is a diagram an example of an operation and configuration related to system information of an MTC system.

FIG. 12 is a diagram an example of an operation and configuration related to system information of an MTC system.

FIG. 12(a) is a diagram showing an example of a frequency error estimation method of a repetition pattern for subframe #0, a general CP, and repeated symbols in FDD, and FIG. 12(b) illustrates an example of the transmission of the SIB-BR on the wideband LTE channel.

In MIB, five reserved bits are used in MTC to transmit scheduling information for a new system information block for bandwidth reduced device (SIB1-BR) including a time/frequency location and a transmission block size.

The SIB-BR is transmitted directly on the PDSCH without any control channel associated with it.

The SIB-BR remains unchanged in 512 radio frames (5120 ms) to allow multiple subframes to be combined.

Table 11 is a table showing an example of the MIB.

TABLE 11

```
-- ASN1START
MasterInformationBlock ::=      SEQUENCE{
    dl-Bandwidth                ENUMERATED {
                                    n6, n15, n25, n50, n75, n100},
    phich-Config                PHICH-Config,
    systemFrameNumber           BIT STRING (SIZE (8)),
    schedulingInfoSIB1-BR-r13   INTEGER (0..31),
    systemInfoUnchanged-BR-r15  BOOLEAN,
    spare                       BIT STRING (SIZE (4))
}
-- ASN1STOP
```

In Table 11, the schedulingInfoSIB1-BR field represents an index for a table defining SystemInformationBlockType1-BR scheduling information, and value 0 means that SystemInformationBlockType1-BR is not scheduled. Overall functions and information carried by SystemInformationBlockType1-BR (or SIB1-BR) are similar to SIB1 of legacy LTE. The contents of SIB1-BR may be classified into (1) PLMN, (2) cell selection criteria, and (3) scheduling information for SIB2 and other SIBs.

After completing the initial cell search, the MTC terminal may acquire more detailed system information by receiving the MPDCCH and the PDSCH according to the MPDCCH information in step S1102. MPDCCH is (1) very similar to EPDCCH, carries common and UE specific signaling, (2) may be transmitted only once or may be transmitted repeatedly (the number of repetitions is configured by higher layer signaling), (3) A number of MPDCCHs are supported and the UE monitors the set of MPDCCHs, (4) is formed by combining an enhanced control channel element (eCCE), each eCCE includes a set of resource elements, (5) RA-RNTI (Radio Network Temporary Identifier), SI-RNTI, P-RNTI, C-RNTI, temporary C-RNTI, and semi-persistent scheduling (SPS) C-RNTI.

Thereafter, the MTC terminal may perform a random access procedure such as steps S1103 to S1106 in order to complete access to the base station. The basic configuration related to the RACH procedure is transmitted by SIB2. In addition, SIB2 includes parameters related to paging. Paging Occasion (PO) is a subframe in which P-RNTI may be transmitted on MPCCH. When the P-RNTI PDCCH is repeatedly transmitted, PO refers to the start subframe of the MPDCCH repetition. The paging frame (PF) is one radio frame and may include one or a plurality of POs. When DRX is used, the MTC terminal monitors only one PO per DRX cycle. Paging NarrowBand (PNB) is one narrowband, and the MTC terminal performs paging message reception.

To this end, the MTC terminal may transmit a preamble through a physical random access channel (PRACH) (S1103), and receive a response message (RAR) to the preamble through an MPDCCH and a corresponding PDSCH (S1104). In the case of contention-based random access, the MTC terminal may perform a contention resolution procedure such as transmission of an additional PRACH signal (S1105) and reception of an MPDCCH signal and a PDSCH signal corresponding thereto (S1106). Signals and/or messages (Msg 1, Msg 2, Msg 3, Msg 4) transmitted in the RACH procedure in the MTC may be repeatedly transmitted, and this repetition pattern is set differently according to the CE level. Msg 1 means PRACH preamble, Msg 2 means RAR (random access response), Msg 3 means UL transmission of the MTC terminal for RAR, and Msg 4 means DL transmission of the base station for Msg 3.

For random access, signaling for different PRACH resources and different CE levels is supported. This provides the same control of the near-far effect for the PRACH by grouping together UEs experiencing similar path loss. Up to four different PRACH resources may be signaled to the MTC terminal.

The MTC terminal estimates the RSRP using a downlink RS (e.g. CRS, CSI-RS, TRS, etc.), and selects one of the resources for random access based on the measurement result. Each of the four resources for random access has a relationship with the number of repetitions for the PRACH and the number of repetitions for the random access response (RAR).

Therefore, the MTC terminal with bad coverage needs a large number of repetitions to be successfully detected by the base station, and needs to receive an RAR having a corresponding repetition number to satisfy their coverage level.

Search spaces for RAR and contention resolution messages are also defined in the system information and are independent for each coverage level.

The PRACH waveform used in MTC is the same as the PRACH waveform used in legacy LTE (e.g. OFDM and Zadof-Chu sequence).

After performing the above-described procedure, the MTC terminal receives MPDCCH signal and/or PDSCH signal (S1107) and transmits physical uplink shared channel (PUSCH) signal and/or physical uplink control channel (PUCCH) signal (S1108) as a general uplink/downlink signal transmission procedure. Control information transmitted from the MTC terminal to the base station is collectively referred to as uplink control information (UCI). UCI may include HARQ-ACK/NACK, scheduling request (SR), channel quality indicator (CQI), precoding matrix indicator (PMI), rank indication (RI) information, etc.

When the RRC connection to the MTC terminal is established, the MTC terminal blind-decodes the MPDCCH in a search space configured to obtain uplink and downlink data allocation.

MTC uses all OFDM symbols available in a subframe to transmit DCI. Therefore, time domain multiplexing between the control channel and the data channel is impossible in the same subframe. That is, as described above, cross-subframe scheduling between the control channel and the data channel is possible.

The MPDCCH having the last repetition in subframe #N schedules PDSCH allocation in subframe #N+2.

The DCI transmitted by the MPDCCH provides information on how many times the MPDCCH is repeated so that the MTC terminal knows when PDSCH transmission starts.

PDSCH allocation may be performed in different narrowbands. Therefore, the MTC terminal needs to retune before decoding the PDSCH allocation.

For uplink data transmission, scheduling follows the same timing as legacy LTE. Here, the last MPDCCH in subframe #N schedules PUSCH transmission starting in subframe #N+4.

Figure 13:
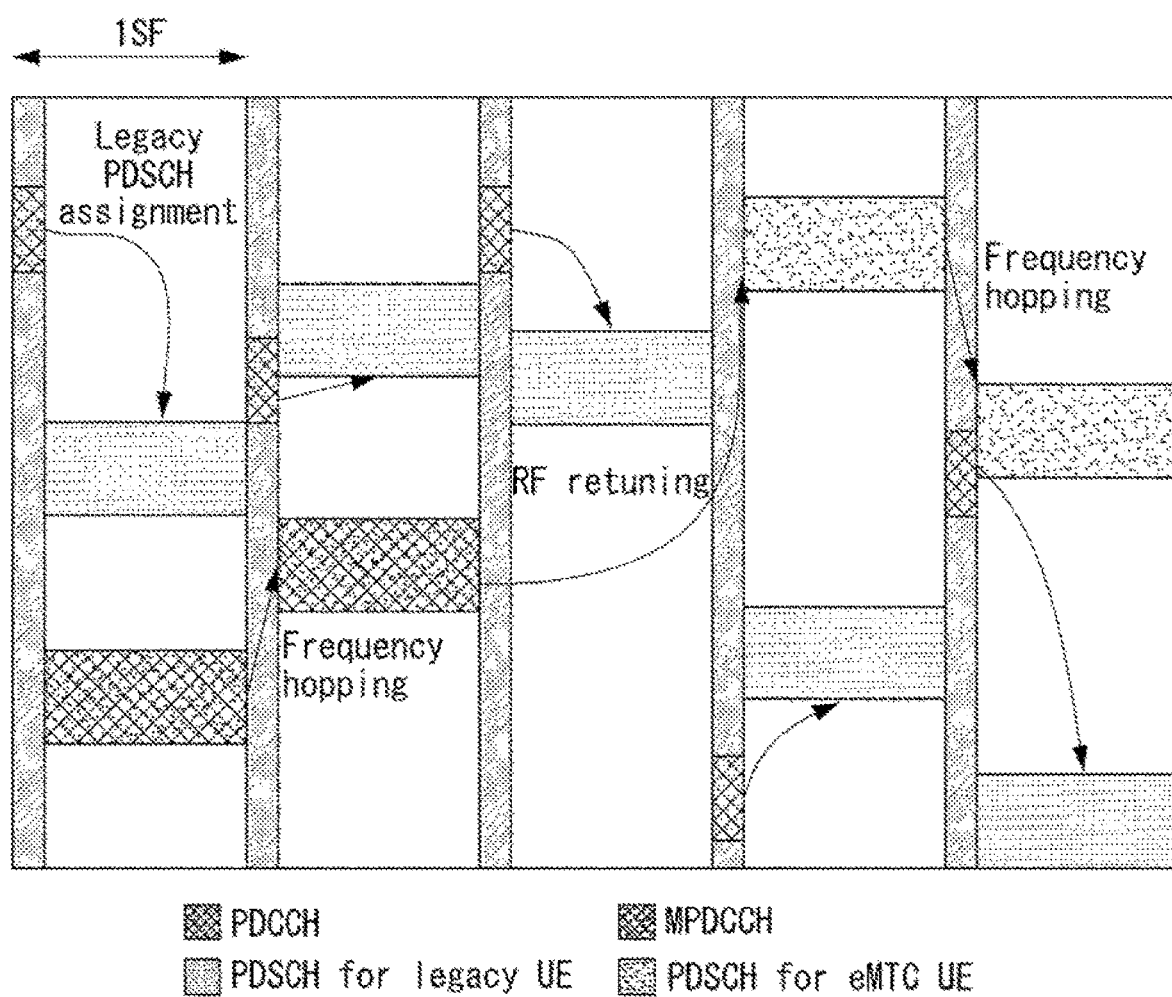
FIG. 13 is a diagram illustrating an example of scheduling for each of the MTC and legacy LTE.

FIG. 13 is a diagram illustrating an example of scheduling for each of the MTC and legacy LTE.

Legacy LTE allocation is scheduled using the PDCCH, which uses the first OFDM symbols in each subframe, and the PDSCH is scheduled in the same subframe as the subframe in which the PDCCH is received.

In contrast, the MTC PDSCH is scheduled to cross-subframe, and one subframe is defined between the MPDCCH and the PDSCH to allow MPDCCH decoding and RF retuning.

The MTC control channel and data channels may be repeated through a large number of subframes having a maximum of 256 subframes for the MPDCCH and a maximum of 2048 subframes for the PDSCH so as to be decoded under extreme coverage conditions.

NB-IoT (Narrowband-Internet of Things)

NB-IoT may mean a system to support low complexity and low power consumption through system bandwidth (system BW) corresponding to 1 Physical Resource Block (PRB) of a wireless communication system (e.g. LTE system, NR system, etc.).

Here, NB-IoT may be referred to as other terms such as NB-LTE, NB-IoT enhancement, enhanced NB-IoT, further enhanced NB-IoT, and NB-NR. That is, NB-IoT may be defined or replaced by a term to be defined in the 3GPP standard, and hereinafter, it will be collectively expressed as "NB-IoT" for convenience of description.

NB-IoT may be mainly used as a communication method of implementing IoT (i.e. Internet of Things) by supporting a device (or terminal) such as machine-type communication (MTC) in a cellular system. In this case, by allocating 1 PRB of the existing system band for NB-IoT, there is an advantage in that the frequency may be efficiently used. In addition, in the case of NB-IoT, since each terminal recognizes a single PRB (single PRB) as a respective carrier, the PRB and the carrier referred to in the present disclosure may be interpreted as having the same meaning.

Hereinafter, the frame structure, physical channel, multi-carrier operation, operation mode, general signal transmission/reception, etc. related to NB-IoT in the present disclosure will be described in consideration of the case of the existing LTE system, but it goes without saying that it may be extended and applied even in the case of a next-generation system (e.g. NR system, etc.). In addition, the contents related to NB-IoT in the present disclosure may be extended and applied to MTC (Machine Type Communication) aiming for similar technical purposes (e.g. low-power, low-cost, coverage improvement, etc.).

1) NB-IoT Frame Structure and Physical Resource

Figure 14:
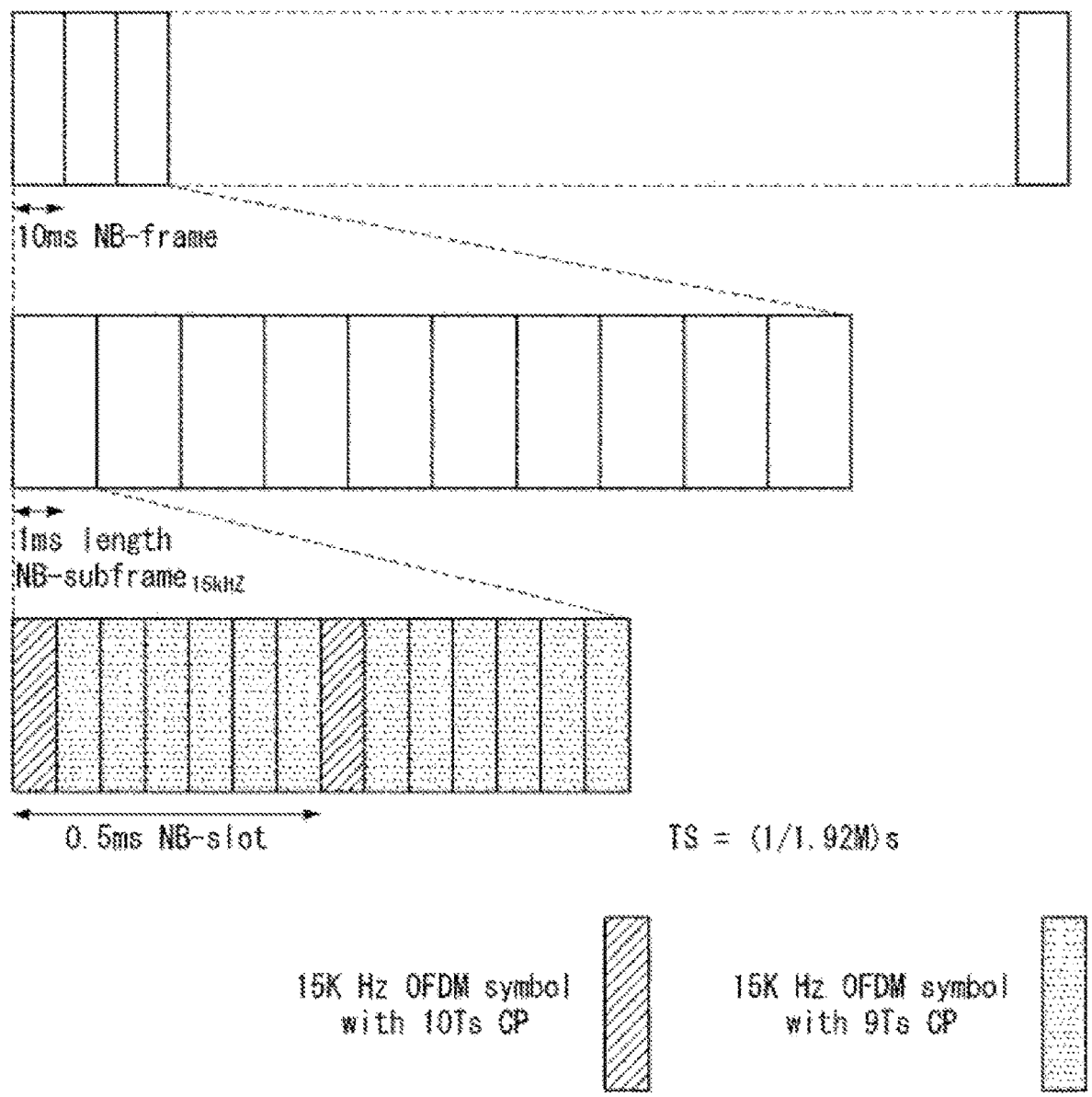
FIG. 14 is a diagram illustrating an example of a frame structure when a subcarrier spacing is 15 kHz.
Figure 15:
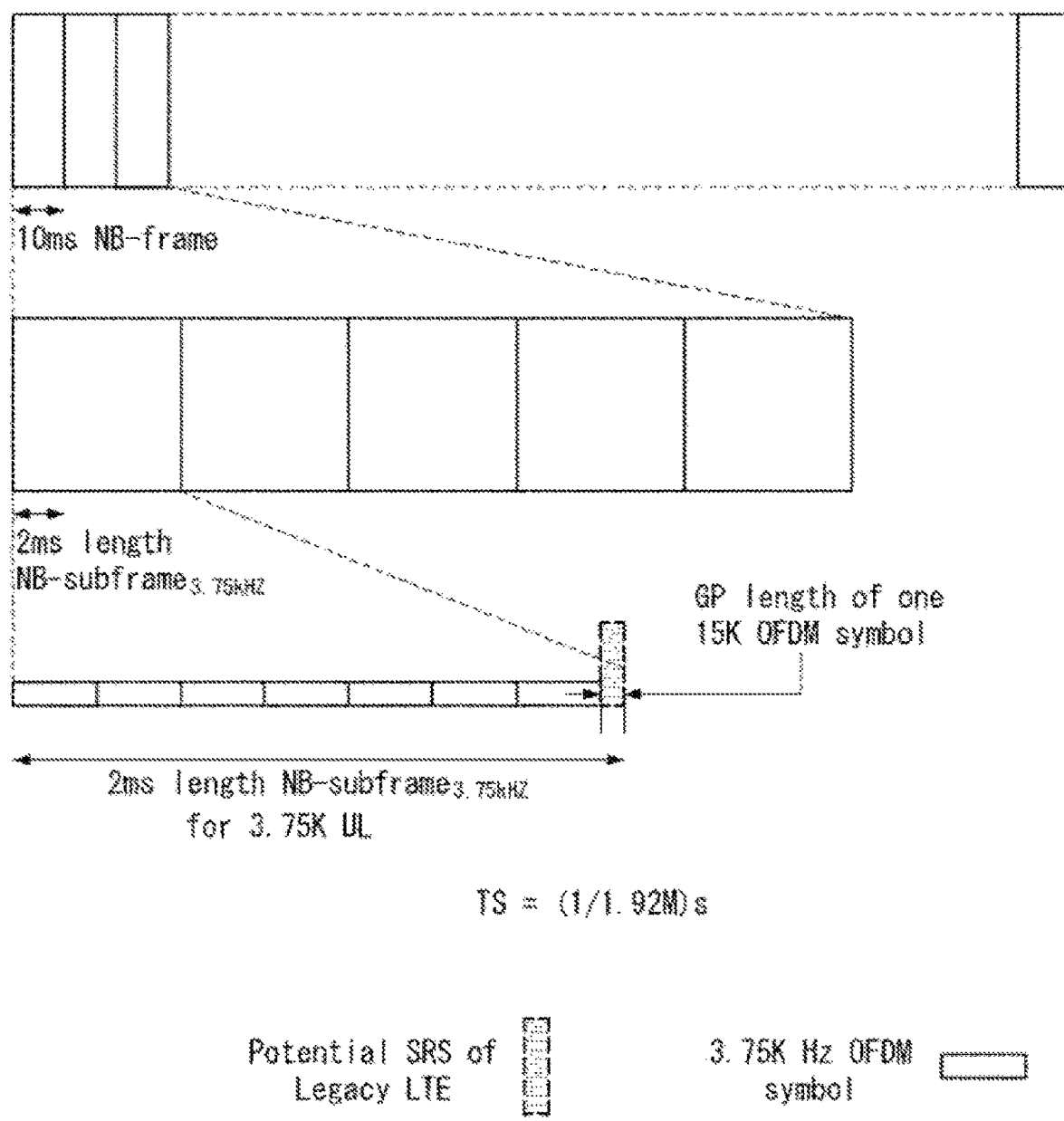
FIG. 15 is a diagram illustrating an example of a frame structure when a subcarrier spacing is 3.75 kHz.

First, the NB-IoT frame structure may be set differently according to subcarrier spacing. Specifically, FIG. 14 illustrates an example of a frame structure when the subcarrier spacing is 15 kHz, and FIG. 15 illustrates an example of a frame structure when the subcarrier spacing is 3.75 kHz. However, the NB-IoT frame structure is not limited thereto, and of course, NB-IoT for other subcarrier spacing (e.g. 30 kHz, etc.) may be considered in different time/frequency units.

In addition, in the present disclosure, the NB-IoT frame structure based on the LTE system frame structure has been described as an example, but this is for convenience of description and is not limited thereto, and it goes without saying that the method described in the present disclosure may be extended and applied to NB-IoT based on the frame structure of a next-generation system (eg NR system).

FIGS. 14 and 15 illustrate examples of an NR-IoT frame structure.

Referring to FIG. 14, the NB-IoT frame structure for 15 kHz subcarrier spacing may be set the same as the frame structure of the legacy system (i.e. LTE system) described above. That is, a 10 ms NB-IoT frame may include 10 1 ms NB-IoT subframes, and a 1 ms NB-IoT subframe may include 2 0.5 ms NB-IoT slots. In addition, each 0.5 ms NB-IoT may include 7 OFDM symbols.

In contrast, referring to FIG. 15, a 10 ms NB-IoT frame includes 5 2 ms NB-IoT subframes, and a 2 ms NB-IoT subframe includes 7 OFDM symbols and one guard period (GP). In addition, the 2 ms NB-IoT subframe may be expressed as an NB-IoT slot or an NB-IoT resource unit (RU).

Next, the physical resources of the NB-IoT for each of the downlink and uplink will be described.

First, the physical resources of the NB-IoT downlink may be set with reference to physical resources of other wireless communication systems (e.g. an LTE system, an NR system, or the like) except that the system bandwidth is a specific number of RBs (e.g. one RB, that is, 180 kHz). As an example, as described above, when the NB-IoT downlink supports only 15 kHz subcarrier spacing, the physical resource of the NB-IoT downlink may be set to a resource region in which the resource grid of the LTE system shown in FIG. 15 described above is limited to 1 RB (i.e. 1 PRB) in the frequency domain.

Next, even in the case of the physical resource of the NB-IoT uplink, as in the case of the downlink, the system bandwidth may be limited to one RB. As an example, when the NB-IoT uplink supports 15 kHz and 3.75 kHz subcarrier spacing as described above, the resource grid for the NB-IoT uplink may be expressed as shown in FIG. 16.

Figure 16:
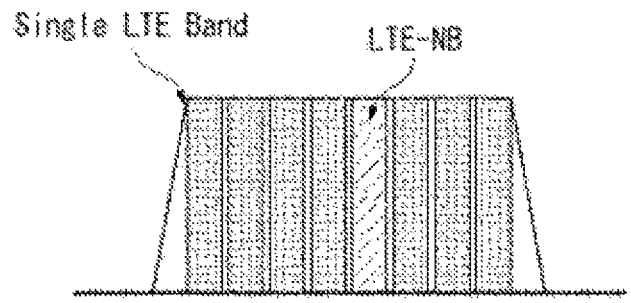
FIG. 16 is a diagram illustrating an example of a resource grid for NB-IoT uplink.
Figure 16:
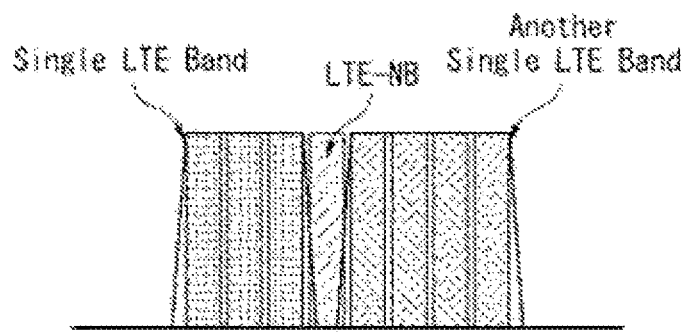
Figure 16:
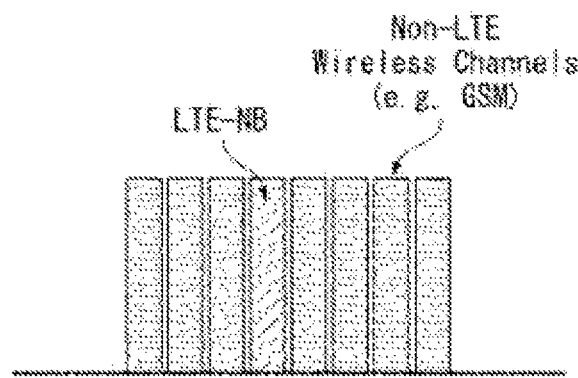

FIG. 16 is a diagram illustrating an example of a resource grid for NB-IoT uplink.

In this case, in FIG. 16, the number of subcarriers and the slot period of the uplink band may be given as shown in Table 12 below.

TABLE 12

| Subcarrier spacing | $N_{sc}^{UL}$ | $T_{slot}$ |
|---|---|---|
| $\Delta f = 3.751$ kHz | 48 | $61440 \cdot T_s$ |
| $\Delta f = 15$ kHz | 12 | $15360 \cdot T_s$ |

In addition, the resource unit (RU) of the NB-IoT uplink may be composed of SC-FDMA symbols in the time domain and $N_{symb}^{UL} N_{slots}^{UL}$ contiguous subcarriers in the frequency domain. For example, $N_{sc}^{RU}$ and $N_{symb}^{UL}$ may be given by Table 13 below in case of frame structure type 1 (i.e. FDD), and may be given by Table 14 in case of frame structure type 2 (i.e. TDD).

TABLE 13

| NPUSCH format | $\Delta f$ | $N_{sc}^{RU}$ | $N_{slots}^{UL}$ | $N_{symb}^{UL}$ |
|---|---|---|---|---|
| 1 | 3.75 kHz | 1 | 16 | 7 |
|   | 15 kHz | 1 | 16 |   |
|   |   | 3 | 8 |   |
|   |   | 6 | 4 |   |
|   |   | 12 | 2 |   |
| 2 | 3.75 kHz | 1 | 4 |   |
|   | 15 kHz | 1 | 4 |   |

TABLE 14

| NPUSCH format | $\Delta f$ | Supported uplink-downlink configurations | $N_{sc}^{RU}$ | $N_{slots}^{UL}$ | $N_{symb}^{UL}$ |
|---|---|---|---|---|---|
| 1 | 3.75 kHz | 1, 4 | 1 | 16 | 7 |
|   | 15 kHz | 1, 2, 3, 4, 5 | 1 | 16 |   |
|   |   |   | 3 | 8 |   |
|   |   |   | 6 | 4 |   |
|   |   |   | 12 | 2 |   |
| 2 | 3.75 kHz | 1, 4 | 1 | 4 |   |
|   | 15 kHz | 1, 2, 3, 4, 5 | 1 | 4 |   |

2) Physical Channel of NB-IoT

A base station and/or a terminal supporting NB-IoT may be configured to transmit and receive a physical channel and/or a physical signal separately set from the existing system. Hereinafter, detailed contents related to a physical channel and/or a physical signal supported by NB-IoT will be described.

First, the downlink of the NB-IoT system will be described. An Orthogonal Frequency Division Multiple Access (OFDMA) scheme may be applied to the NB-IoT downlink based on subcarrier spacing of 15 kHz. Through this, orthogonality between subcarriers may be provided so that co-existence with an existing system (e.g. an LTE system, an NR system) may be efficiently supported.

The physical channel of the NB-IoT system may be expressed in a form in which "N (Narrowband)" is added to be distinguished from the existing system. For example, the downlink physical channel is defined as a Narrowband Physical Broadcast Channel (NPBCH), a Narrowband Physical Downlink Control Channel (NPDCCH), a Narrowband Physical Downlink Shared Channel (NPDSCH), and the like, and the downlink physical signal is a Narrowband Primary Synchronization Signal (NPSS), a Narrowband Secondary Synchronization Signal (NSSS), a Narrowband Reference Signal (NRS), a Narrowband Positioning Reference Signal (NPRS), a Narrowband Wake Up Signal (NWUS), and the like.

In general, the downlink physical channel and physical signal of the NB-IoT described above may be set to be transmitted based on a time domain multiplexing scheme and/or a frequency domain multiplexing scheme.

In addition, characteristically, in the case of NPBCH, NPDCCH, and NPDSCH, which are downlink channels of the NB-IoT system, repetition transmission may be performed for coverage enhancement.

In addition, the NB-IoT uses a newly defined DCI format, and as an example, a DCI format for NB-IoT may be defined as DCI format N0, DCI format N1, DCI format N2, or the like.

Next, the uplink of the NB-IoT system will be described. A single carrier frequency division multiple access (SC-FDMA) scheme may be applied to the NB-IoT uplink based on subcarrier spacing of 15 kHz or 3.75 kHz. In the uplink of NB-IoT, multi-tone transmission and single-tone transmission may be supported. For example, the multi-tone transmission is supported only in subcarrier spacing of 15 kHz, and the single-tone transmission may be supported for subcarrier spacing of 15 kHz and 3.75 kHz.

As described in the downlink part, the physical channel of the NB-IoT system may be expressed in a form in which "N (Narrowband)" is added to be distinguished from the existing system. For example, the uplink physical channel may be defined as a narrowband physical random access channel (NPRACH) and a narrowband physical uplink shared channel (NPUSCH), and the uplink physical signal may be defined as a narrowband de-modulation reference signal (NDMRS).

Here, the NPUSCH may be composed of NPUSCH format 1 and NPUSCH format 2, and the like. For example, the NPUSCH format 1 may be used for UL-SCH transmission (or transport), and the NPUSCH format 2 may be used for uplink control information transmission such as HARQ ACK signaling.

In addition, characteristically, in the case of NPRACH, which is a downlink channel of the NB-IoT system, repetition transmission may be performed for coverage enhancement. In this case, the repetitive transmission may be performed by applying frequency hopping.

3) Multi-Carrier Operation of NB-IoT

Next, a multi-carrier operation of NB-IoT will be described. The multi-carrier operation may mean that a plurality of carriers having different uses (i.e. different types) are used when the base station and/or the terminal transmit and receive channels and/or signals to and from each other in the NB-IoT.

In general, the NB-IoT can operate in a multi-carrier mode as described above. At this time, in the NB-IoT, the carrier may be defined as an anchor type carrier (i.e. anchor carrier, anchor PRB) and a non-anchor type carrier (i.e. non-anchor carrier, a non-anchor PRB).

The anchor carrier may mean a carrier that transmits NPSS, NSSS, NPBCH, NPDSCH for system information block (N-SIB), and the like for initial access from the viewpoint of the base station. That is, in the NB-IoT, a carrier for initial access may be referred to as an anchor carrier, and other(s) may be referred to as a non-anchor carrier. In this case, only one anchor carrier may exist on the system, or a plurality of anchor carriers may exist.

4) Operation Mode of NB-IoT

Next, an operation mode of NB-IoT will be described. In the NB-IoT system, three operation modes may be supported. FIG. 16 illustrates an example of operation modes supported in the NB-IoT system. In the present disclosure, the operation mode of the NB-IoT is described based on the LTE band, but this is only for convenience of description, and it goes without saying that it may be extended and applied to a band of another system (e.g. NR system band).

Specifically, FIG. 16(a) illustrates an example of an in-band system, FIG. 16(b) illustrates an example of a guard-band system, and FIG. 16(c) illustrates an example of a stand-alone system. In this case, the in-band system may be expressed in an in-band mode, the guard-band system may be expressed in an guard-band mode, and the stand-alone system may be expressed in a stand-alone mode.

The in-band system may refer to a system or mode in which a specific 1 RB (i.e. PRB) in the (legacy) LTE band is used for NB-IoT. The in-band system may be operated by allocating some resource blocks of an LTE system carrier.

The guard-band system may refer to a system or mode using NB-IoT in a space reserved for the (legacy) LTE band guard-band. The guard-band system may be operated by allocating a guard-band of an LTE carrier that is not used as a resource block in the LTE system. As an example, the (legacy) LTE band may be configured to have a guard-band of at least 100 kHz at the end of each LTE band. To use 200 kHz, two non-contiguous guard-bands may be used.

As described above, the in-band system and the guard-band system may be operated in a structure in which the NB-IoT coexists in the (legacy) LTE band.

In contrast, the stand-alone system may mean a system or mode independently configured from the (legacy) LTE band. The stand-alone system may be operated by separately allocating a frequency band (e.g. a GSM carrier reallocated in the future) used in GERAN (GSM EDGE Radio Access Network).

Each of the three operation modes described above may be independently operated, or two or more operation modes may be combined and operated.

5) General Signal Transmission/Reception Procedure of NB-IoT

Figure 17:
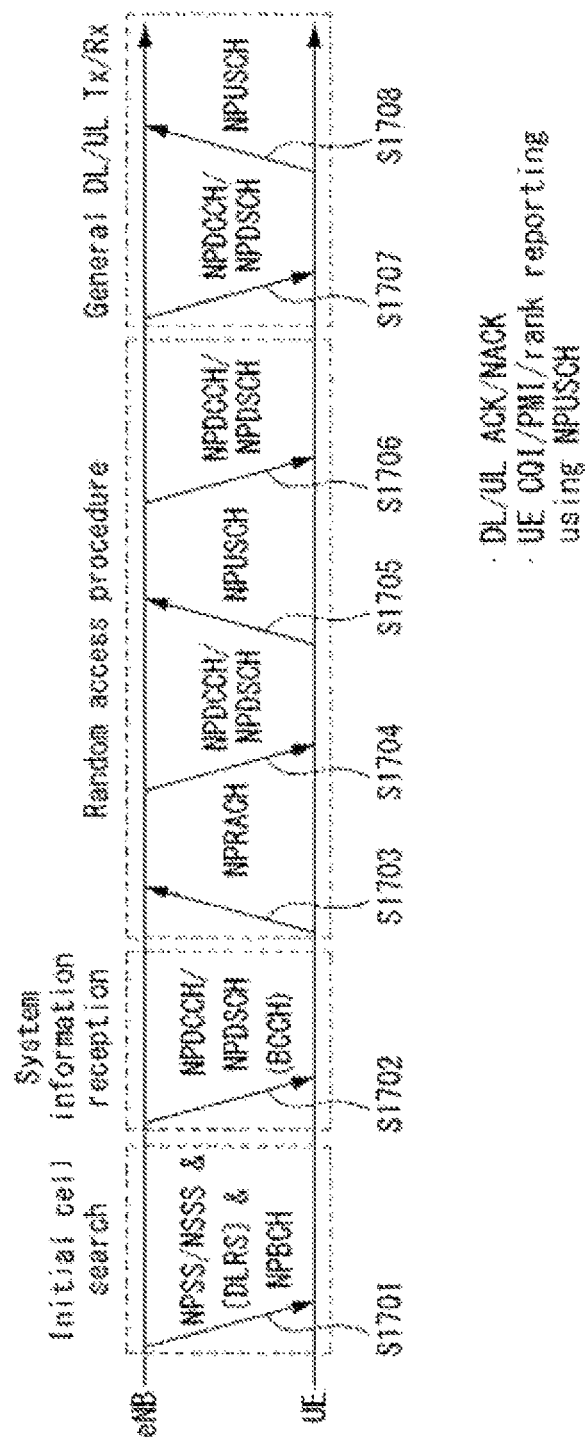
FIG. 17 is a diagram illustrating an example of physical channels that may be used for NB-IoT and a general signal transmission method using the physical channels.

FIG. 17 is a diagram illustrating an example of physical channels that may be used for NB-IoT and a general signal transmission method using the physical channels.

In a wireless communication system, the NB-IoT terminal may receive information from the base station through downlink (DL), and the NB-IoT terminal may transmit information to the base station through uplink (UL). In other words, in the wireless communication system, the base station may transmit information to the NB-IoT terminal through downlink, and the base station may receive information from the NB-IoT terminal through uplink.

The information transmitted and received by the base station and the NB-IoT terminal includes data and various control information, and various physical channels may exist according to the type/use of the information transmitted and received by the base station and the NB-IoT terminal. In addition, the method of transmitting and receiving a signal of the NB-IoT described with reference to FIG. 17 may be performed by the wireless communication device.

When a power supply is turned on again while the power supply is turned off, the NB-IoT terminal newly entering a cell may perform an initial cell search operation such as an operation of synchronizing the terminal and the base station (S1701). To this end, the NB-IoT terminal may receive NPSS and NSSS from the base station, perform synchronization with the base station, and obtain information such as cell identity. In addition, the NB-IoT terminal may obtain intra-cell broadcast information by receiving the NPBCH from the base station. In addition, the NB-IoT terminal may check the downlink channel state by receiving a DL RS (Downlink Reference Signal) in the initial cell search step.

In other words, when there is an NB-IoT terminal that has newly entered the cell, the base station may perform the initial cell search operation such as synchronizing with the corresponding terminal. The base station may transmit NPSS and NSSS to the NB-IoT terminal to perform synchronization with the corresponding terminal and transmit information such as cell identity. In addition, the base station may transmit (or broadcast) the NPBCH to the NB-IoT terminal to transmit the broadcast information in the cell. In addition, the base station may check the downlink channel state by transmitting a DL RS to the NB-IoT terminal in the initial cell search step.

After completing the initial cell search, the NB-IoT terminal may receive the NPDCCH and the corresponding NPDSCH to obtain more detailed system information (S1702). In other words, the base station may transmit more specific system information by transmitting the NPDCCH and the corresponding NPDSCH to the NB-IoT terminal that has finished the initial cell search.

Thereafter, the NB-IoT terminal may perform a random access procedure to complete access to the base station (S1703 to S1706).

Specifically, the NB-IoT terminal may transmit a preamble to the base station through the NPRACH (S1703), and as described above, the NPRACH may be configured to be repeatedly transmitted based on frequency hopping or the like for coverage enhancement. In other words, the base station may (repeatedly) receive the preamble through the NPRACH from the NB-IoT terminal.

Thereafter, the NB-IoT terminal may receive a random access response (RAR) for the preamble from the base station through the NPDCCH and the corresponding NPDSCH (S1704). In other words, the base station may transmit the random access response (RAR) for the preamble to the NB-IoT terminal through the NPDCCH and the corresponding NPDSCH.

Thereafter, the NB-IoT terminal transmits the NPUSCH to the base station using the scheduling information in the RAR (S1705), and may perform a contention resolution procedure such as NPDCCH and corresponding NPDSCH (S1706). In other words, the base station may receive the NPUSCH from the terminal by using the scheduling information in the NB-IoT RAR and perform the collision resolution procedure.

After performing the above-described procedure, the NB-IoT terminal may perform NPDCCH/NPDSCH reception (S1707) and NPUSCH transmission (S1708) as a general uplink/downlink signal transmission procedure. In other words, after performing the above-described procedures, the base station may perform NPDCCH/NPDSCH transmission and NPUSCH reception as a general signal transmission/reception procedure to the NB-IoT terminal.

In the case of the NB-IoT, as described above, the NPBCH, NPDCCH, NPDSCH, etc. may be repeatedly transmitted for coverage enhancement. In addition, in the case of the NB-IoT, the UL-SCH (i.e. general uplink data), and the uplink control information may be transmitted through the NPUSCH. In this case, the UL-SCH and the uplink control information may be set to be transmitted through different NPUSCH formats (e.g. NPUSCH format 1, NPUSCH format 2, etc.).

In addition, the control information transmitted from the terminal to the base station may be referred to as UCI (Uplink Control Information). The UCI may include hybrid automatic repeat and reQuest acknowledgement/negative-ACK (HARQ ACK/NACK), scheduling request (SR), channel state information (CSI), and the like. The CSI includes a channel quality indicator (CQI), a precoding matrix indicator (PMI), rank indication (RI), and the like. As described above, in the NB-IoT, the UCI may be generally transmitted through NPUSCH. In addition, according to a request/instruction of a network (e.g. a base station), the terminal may transmit UCI through the NPUSCH in a perdiodic, aperiodic, or semi-persistent manner.

The techniques/methods proposed in this document are classified for convenience of description, and it is obvious that some configurations of a technique/method may be substituted with configurations of other techniques/methods, or may be applied in combination with each other.

When designing the NB-IoT system for an LTE system, a channel raster offset may be generated between an anchor PRB (anchor PRB) and a channel raster. In addition, the channel raster offset may be set to a value of {+2.5 kHz, −2.5 kHz, +7.5 kHz, −7.5 kHz}, and the information on the channel raster offset is MIB (Master Information Block)-NB (Narrowband) of NPBCH. Here, the channel raster represents a minimum unit for reading a downlink synchronization signal when a terminal (e.g. UE) performs an initial access procedure or the like.

Figure 18:
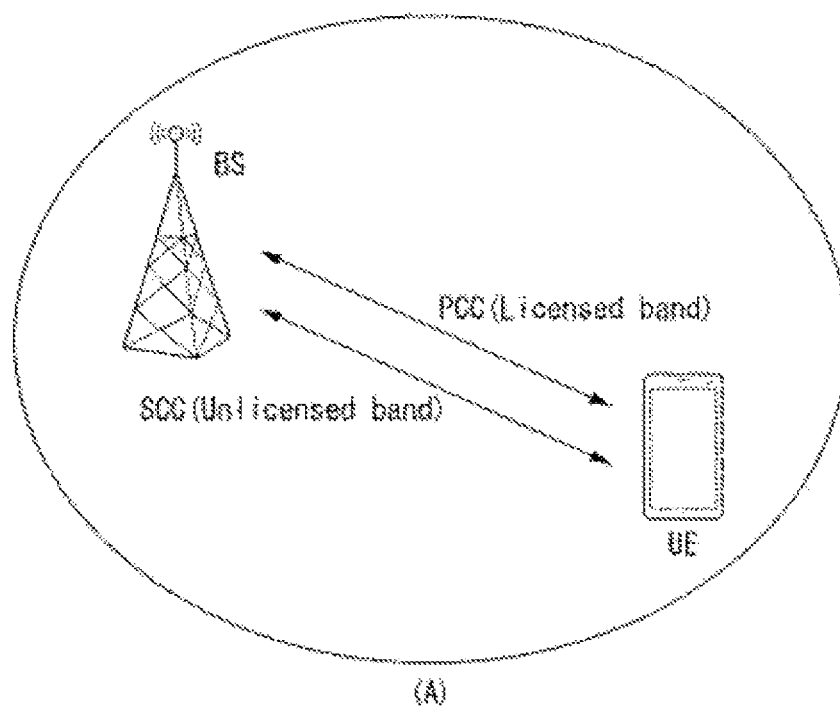
FIG. 18 is a diagram illustrating an example of a wireless communication system supporting an unlicensed band applicable to the present invention.
Figure 18:
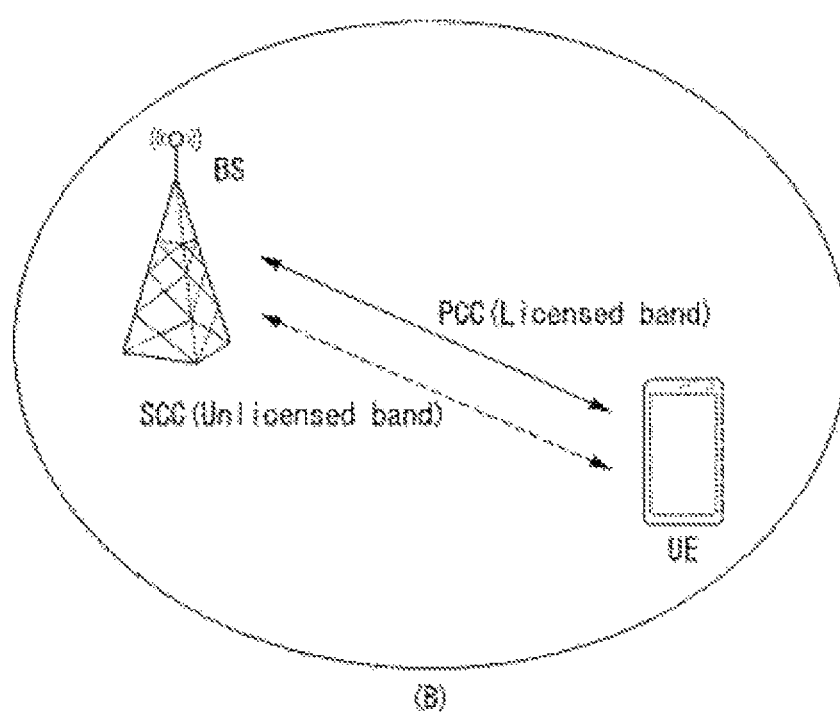

FIG. 18 is a diagram illustrating an example of a wireless communication system supporting an unlicensed band applicable to the present invention.

In the following description, a cell operating in a licensed band (hereinafter, L-band) is defined as an L-cell, and a carrier of the L-cell is defined as (DL/UL) LCC. In addition, a cell operating in an unlicensed band (hereinafter, U-band) is defined as a U-cell, and a carrier of the U-cell is defined as (DL/UL) UCC. The carrier/carrier-frequency of the cell may mean the operating frequency (e.g. center frequency) of the cell. The cell/carrier (for example, CC) is collectively referred to as a cell.

As illustrated in FIG. 18(a), when the terminal and the base station transmit and receive signals through carrier-coupled LCC and UCC, the LCC may be configured as a primary CC (PCC) and the UCC may be configured as secondary CC (SCC).

As illustrated in FIG. 18(b), the terminal and the base station may transmit and receive signals through one UCC or a plurality of carrier-coupled UCCs. That is, the terminal and the base station may transmit and receive signals through only the UCC(s) without the LCC.

Hereinafter, the signal transmission/reception operation (unless otherwise stated) in the unlicensed band above described in the present disclosure may be performed based on all the above-described layout scenarios.

Radio Frame Structure for Unlicensed Band

For the operation in the unlicensed band, the LTE frame type 3 or NR frame structure may be used. The configuration of OFDM symbols occupied for uplink/downlink signal transmission in the frame structure for the unlicensed band may be configured by the base station. Here, the OFDM symbol may be replaced with an SC-FDM(A) symbol.

In order to transmit the downlink signal through the unlicensed band, the base station may inform the terminal of the configuration of the OFDM symbols used in subframe #n through the signaling. Here, the subframe may be replaced with a slot or a time unit (TU).

Specifically, in the case of the LTE system supporting the unlicensed band, the terminal may assume (or identify) the configuration of the OFDM symbol occupied in subframe #n through a specific field (for example, subframe configuration for LAA field, etc.) in the DCI received from the base station in subframe #n−1 or subframe #n.

Table 15 illustrates a method in which the subframe configuration for the LAA field in the LTE system indicates the configuration of the OFDM symbols used for transmission of the downlink physical channel and/or the physical signal in a current subframe and/or a next subframe.

TABLE 15

| Value of 'Subframe configuration for LAA' field in current subframe | Configuration of occupied OFDM symbols (current subframe, next subframe) |
|---|---|
| 0000 | (−,14) |
| 0001 | (−,12) |
| 0010 | (−,11) |

TABLE 15-continued

| Value of 'Subframe configuration for LAA' field in current subframe | Configuration of occupied OFDM symbols (current subframe, next subframe) |
|---|---|
| 0011 | (−,10) |
| 0100 | (−,9) |
| 0101 | (−,6) |
| 0110 | (−,3) |
| 0111 | (14,*) |
| 1000 | (12,−) |
| 1001 | (11,−) |
| 1010 | (10,−) |
| 1011 | (9,−) |
| 1100 | (6,−) |
| 1101 | (3,−) |
| 1110 | reserved |
| 1111 | reserved |

NOTE:
−(−, Y) means UE may assume the first Y symbols are occupied in next subframe and other symbols in the next subframe are not occupied.
−(X, −) means UE may assume the first X symbols are occupied in current subframe and other symbols in the current subframe are not occupied.
−(X, *) means UE may assume the first X symbols are occupied in current subframe, and at least the first OFDM symbol of the next subframe is not occupied.

In order to transmit the uplink signal through the unlicensed band, the base station may inform the terminal of information on the uplink transmission period through the signaling.

Specifically, in the case of the LTE system supporting the unlicensed band, the terminal may obtain 'UL duration' and 'UL offset' information for subframe #n through the 'UL duration and offset' field in the detected DCI.

Table 16 illustrates a method in which the UL duration and offset field indicates the UL offset and UL duration configuration in the LTE system.

TABLE 16

| Value of 'UL duration and offset' field | UL offset, $l$ (in subframes) | UL duration, $d$ (in subframes) |
|---|---|---|
| 00000 | Not configured | Not configured |
| 00001 | 1 | 1 |
| 00010 | 1 | 2 |
| 00011 | 1 | 3 |
| 00100 | 1 | 4 |
| 00101 | 1 | 5 |
| 00110 | 1 | 6 |
| 00111 | 2 | 1 |
| 01000 | 2 | 2 |
| 01001 | 2 | 3 |
| 01010 | 2 | 4 |
| 01011 | 2 | 5 |
| 01100 | 2 | 6 |
| 01101 | 3 | 1 |
| 01110 | 3 | 2 |
| 01111 | 3 | 3 |
| 10000 | 3 | 4 |
| 10001 | 3 | 5 |
| 10010 | 3 | 6 |
| 10011 | 4 | 1 |
| 10100 | 4 | 2 |
| 10101 | 4 | 3 |
| 10110 | 4 | 4 |
| 10111 | 4 | 5 |
| 11000 | 4 | 6 |
| 11001 | 6 | 1 |
| 11010 | 6 | 2 |
| 11011 | 6 | 3 |
| 11100 | 6 | 4 |
| 11101 | 6 | 5 |
| 11110 | 6 | 6 |
| 11111 | reserved | reserved |

As an example, when the UL duration and offset field sets (or indicates) UL offset 1 and UL duration d for subframe #n, the terminal does not need to receive a downlink physical channel and/or a physical signal within subframe #n+1+i (i=0, 1, . . . , d−1).

Downlink Signal Transmission Method Through Unlicensed Band

The base station may perform one of the following unlicensed band access procedures (e.g. Channel Access Procedure (CAP)) for downlink signal transmission in the unlicensed band.

(1) First Downlink CAP Method

Figure 19:
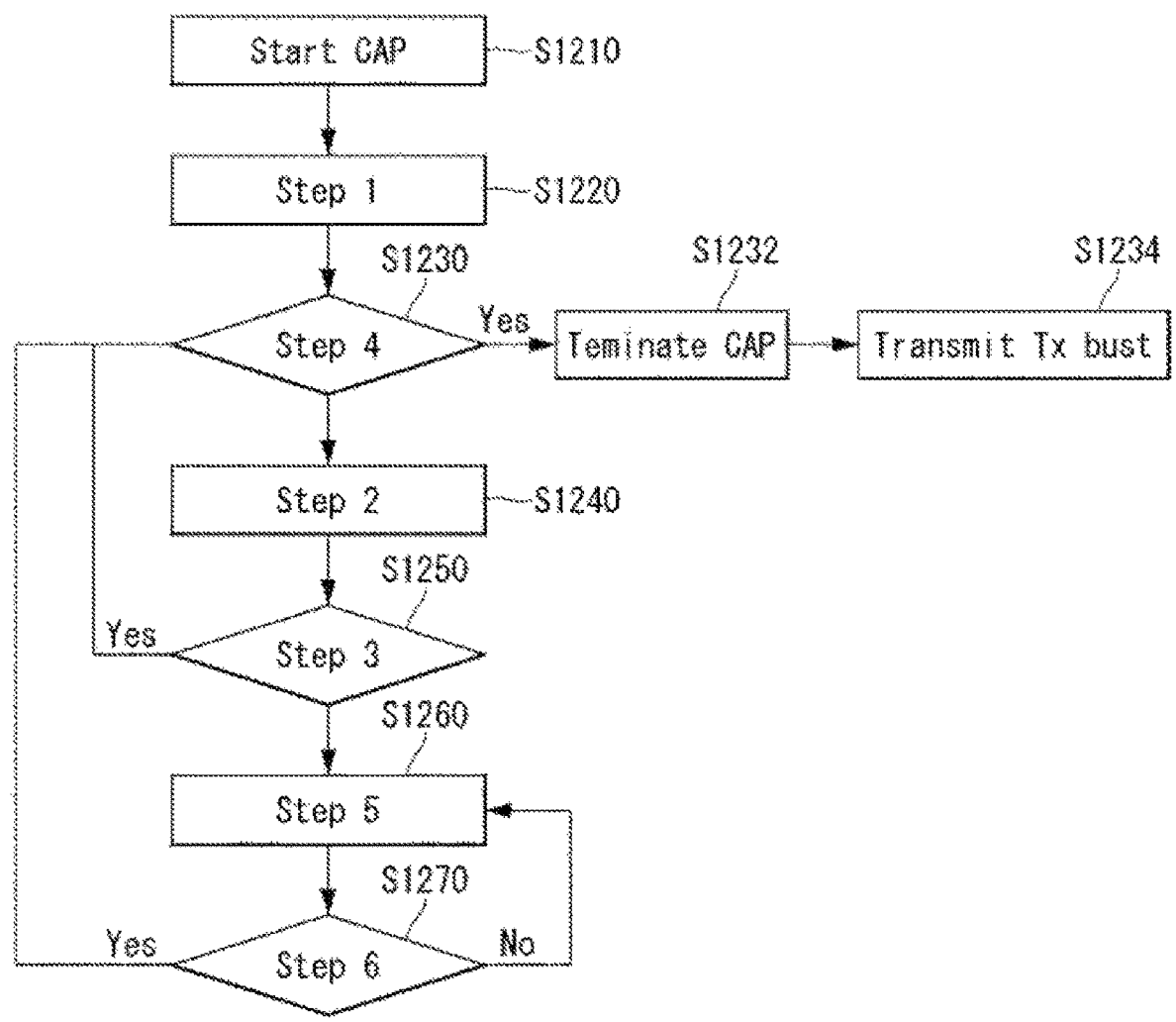
FIG. 19 is a flowchart of a CAP operation for transmitting a downlink signal through an unlicensed band of a base station.

FIG. 19 is a flowchart of a CAP operation for transmitting a downlink signal through an unlicensed band of a base station The base station may initiate a channel access procedure (CAP) for downlink signal transmission (e.g. signal transmission including PDSCH/PDCCH/EPDCCH) through an unlicensed band (S1910). The base station may randomly select the backoff counter N within the contention window (CW) according to step 1. At this time, the N value is set to the initial value Ninit (S1920). Ninit is selected as a random value among values between 0 and CWp. Subsequently, if the backoff counter value N is 0 according to step 4 (S1930; Y), the base station ends the CAP process (S1932). Subsequently, the base station may perform Tx burst transmission including PDSCH/PDCCH/EPDCCH (S1934). On the other hand, if the backoff counter value is not 0 (S1930; N), the base station decreases a backoff counter value by 1 according to step 2 (S1940). Subsequently, the base station checks whether a channel of a U-cell(s) is in an idle state (S1950), and if the channel is in an idle state (S1950; Y), it checks whether the backoff counter value is 0 (S1930). Conversely, if the channel is not in an idle state in step S1950, that is, if the channel is in a busy state (S1950; N), the base station checks whether the corresponding channel is idle for a delay period longer than the slot time (e.g. 9 μsec) (defer duration Td; 25 usec or more) according to step 5 (S1960). If the channel is idle in the delay period (S1970; Y), the base station may resume the CAP process. Here, the delay period may consist of a 16 μsec period and mp contiguous slot times (e.g. 9 μsec) immediately following. On the other hand, if the channel is busy during the delay period (S1970; N), the base station performs step S1960 again to check whether the channel of the U-cell(s) is idle during the new delay period.

Table 17 exemplifies that mp, minimum CW, maximum CW, maximum channel occupancy time (MCOT), and allowed CW sizes that are applied to the CAP vary according to the channel access priority class.

TABLE 17

| Channel Access Priority Class ($p$) | $m_p$ | $CW_{min, p}$ | $CW_{max, p}$ | $T_{m\ cot, p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 또는 10 ms | {15, 31, 63} |
| 4 | 7 | 15 | 1023 | 8 또는 10 ms | {15, 31, 63, 127, 255, 511, 1023} |

The contention window size applied to the first downlink CAP may be determined based on various methods. As an example, the contention window size may be adjusted based on a probability that HARQ-ACK values corresponding to PDSCH transmission(s) within a certain time period (e.g. a reference TU) are determined as NACK. When the base station transmits a downlink signal including a PDSCH related to a channel access priority class p on a carrier, when the probability that the HARQ-ACK values corresponding to the PDSCH transmission(s) in the reference subframe k (or reference slot k) are determined as NACK is at least Z=80%, the base station increases CW values set for each priority class to the next higher priority allowed, respectively. Alternatively, the base station maintains the CW values set for each priority class as initial values. The reference subframe (or reference slot) may be defined as a start subframe (or start slot) in which the most recent signal transmission on a corresponding carrier in which at least some of the HARQ-ACK feedback is available is performed.

(2) Second Downlink CAP Method

The base station may perform downlink signal transmission through an unlicensed band (e.g. signal transmission including discovery signal transmission and not including PDSCH) based on the second downlink CAP method to be described later.

When the length of the signal transmission period of the base station is less than 1 ms, the base station immediately after the channel is sensed as idle for at least the sensing period Tdrs=25 us (immediately after) through the unlicensed band downlink signal (e.g. including discovery signal transmission and a signal not including the PDSCH). Here, Tdrs is composed of a section Tf (=16 μs) immediately following one slot section Tsl=9 μs.

(3) Third Downlink CAP Method

The base station may perform the following CAP to transmit a downlink signal through multiple carriers in an unlicensed band.

1) Type A: The base station performs CAP for multi-carriers based on a counter N (counter N considered in CAP) defined for each carrier, and performs downlink signal transmission based on this.

Type A1: Counter N for each carrier is determined independently of each other, and downlink signal transmission through each carrier is performed based on the counter N for each carrier.

Type A2: Counter N for each carrier is determined as an N value for the carrier with the largest contention window size, and downlink signal transmission through the carrier is performed based on the counter N for each carrier.

2) Type B: The base station performs a CAP based on counter N only for a specific carrier among a plurality of carriers, and performs downlink signal transmission by determining whether channel idle for the remaining carriers prior to signal transmission on a specific carrier.

Type B1: A single contention window size is defined for a plurality of carriers, and the base station utilizes a single contention window size when performing a CAP based on counter N for a specific carrier.

Type B2: The contention window size is defined for each carrier, and the largest contention window size among the contention window sizes is used when determining the Ninit value for a specific carrier.

Downlink Signal Transmission Method Through Unlicensed Band

The terminal performs contention-based CAP for uplink signal transmission in the unlicensed band. The terminal performs a Type 1 or Type 2 CAP for uplink signal transmission in an unlicensed band. In general, the terminal may perform a CAP (e.g. Type 1 or Type 2) configured by the base station for uplink signal transmission.

(1) Type 1 Uplink CAP Method

Figure 20:
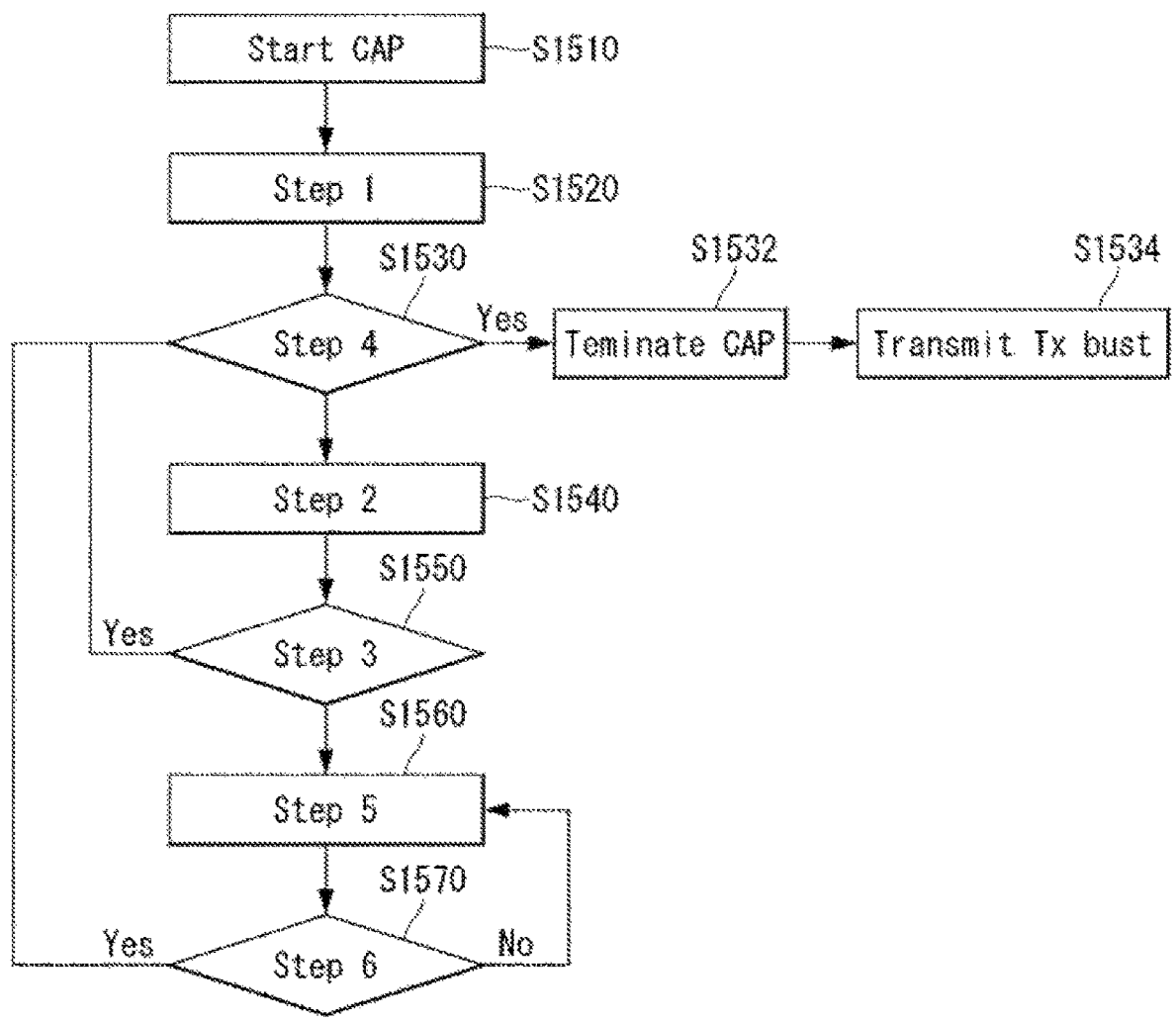
FIG. 20 is a flowchart of a Type 1 CAP operation of a terminal for uplink signal transmission.

FIG. 20 is a flowchart of a Type 1 CAP operation of a terminal for uplink signal transmission.

The terminal may initiate a channel access procedure (CAP) for signal transmission through an unlicensed band (S2010). The base station may randomly select the backoff counter N within the contention window (CW) according to step 1. At this time, the N value is set to the initial value Ninit (S2020). Ninit is selected as an any value among values between 0 and CWp. Subsequently, if the backoff counter value N is 0 according to step 4 (S2030; Y), the terminal ends the CAP process (S2032). Subsequently, the terminal may perform Tx burst transmission (S2034). On the other hand, if the backoff counter value is not 0 (S2030; N), the terminal decreases a backoff counter value by 1 according to step 2 (S2040). Subsequently, the terminal checks whether a channel of a U-cell(s) is in an idle state (S2050), and if the channel is in an idle state (S2050; Y), it checks whether the backoff counter value is 0 (S2030). Conversely, if the channel is not in an idle state in step S2050, that is, if the channel is in a busy state (S2050; N), the terminal checks whether the corresponding channel is idle for a delay period longer than the slot time (e.g. 9 μsec) (defer duration Td; 25 usec or more) according to step 5 (S2060). If the channel is idle in the delay period (S2070; Y), the terminal may resume the CAP process. Here, the delay period may consist of a 16 μsec period and mp contiguous slot times (e.g. 9 ###sec) immediately following. On the other hand, if the channel is in the busy state during the delay period (S2070; N), the terminal performs step S2060 again to check whether the channel is in the idle state during the new delay period.

Table 18 exemplifies that mp, minimum CW, maximum CW, maximum channel occupancy time (MCOT), and allowed CW sizes that are applied to the CAP vary according to the channel access priority class.

TABLE 18

| Channel Access Priority Class (p) | $m_p$ | $CW_{min,p}$ | $CW_{max,p}$ | $T_{ulm\ cot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms 또는 10 ms | {15, 31, 63, 127, 255, 511, 1023} |
| 4 | 7 | 15 | 1023 | 6 ms 또는 10 ms | {15, 31, 63, 127, 255, 511, 1023} |

NOTE 1:
For $p = 3, 4$, $T_{ulm\ cot,p} = 10$ ms if the higher layer parameter 'absenceOfAnyOtherTechnology-r14' indicates TRUE, otherwise, $T_{ulm\ cot,p} = 6$ ms.

NOTE 2:
When $T_{ulm\ cot,p} = 6$ ms it may be increased to 8 ms by inserting one or more gaps. The minimum duration of a gap shall be 100 μs. The maximum duration before including any such gap shall be 6 ms.

The contention window size applied to the Type 1 uplink CAP may be determined based on various methods. As an example, the contention window size may be adjusted based on whether to toggle a New Data Indicator (NDI) value for at least one HARQ processor related to HARQ_ID_ref, which is a HARQ process ID of UL-SCH within a certain time period (e.g. a reference TU). When the terminal performs signal transmission using the Type 1 channel access procedure related to the channel access priority class p on the carrier, the terminal is for all priority classes p∈{1, 2, 3, 4} when the NDI value for at least one HARQ process related to HARQ_ID_ref is toggled, and $CW_p = CW_{min,p}$, and if not, the CWp for all priority classes p∈{1, 2, 3, 4} is increased to the next higher allowed value.

The reference subframe nref (or reference slot nref) is determined as follows.

When the terminal receives a UL grant in a subframe (or slot) ng and performs transmission including a UL-SCH without a gap starting from a subframe (or slot) n0 within a subframe (or slot) $n_0, n_1, \ldots, n_w$ (here, subframe (or slot) nw is a subframe (or slot) in which the terminal transmits UL-SCH based on the Type 1 CAP, the most recent subframe (or slot) before ng-3), a reference subframe (or slot) nref is a subframe (or slot) n0.

(2) Type 2 Uplink CAP Method

When the terminal uses a Type 2 CAP to transmit an uplink signal (e.g. a signal including a PUSCH) through an unlicensed band, the terminal may transmit the uplink signal (for example, signal including the PUSCH) through the unlicensed band immediately after sensing that the channel is idle at least for the sensing period $T_{short\_ul}$=25 us Tshort_ul is composed of a section $T_f$=16 us immediately followed by one slot section $T_{sl}$=9 us. Tf includes an idle slot period Tsl at the start point of the Tf.

C. Structure of Uplink and Downlink Channels

Downlink Channel Structure

The base station transmits a related signal to the terminal through the downlink channel to be described later, and the terminal receives the related signal from the base station through the downlink channel to be described later.

(1) Physical Downlink Shared Channel (PDSCH)

The PDSCH carries downlink data (e.g. DL-shared channel transport block, DL-SCH TB), and modulation methods such as Quadrature Phase Shift Keying (QPSK), Quadrature Amplitude Modulation (QAM), 64 QAM, and 256 QAM are applied. A codeword is generated by encoding TB. The PDSCH can carry up to two codewords. Scrambling and modulation mapping are performed for each codeword, and modulation symbols generated from each codeword are mapped to one or more layers. Each layer is mapped to a resource along with a de-modulation reference signal (DMRS) to generate an OFDM symbol signal, and is transmitted through a corresponding antenna port.

(2) Physical Downlink Control Channel (PDCCH)

The PDCCH carries downlink control information (DCI) and a QPSK modulation method is applied. One PDCCH is composed of 1, 2, 4, 8, 16 control channel elements (CCEs) according to the aggregation level (AL). One CCE is composed of six resource element groups (REGs). One REG is defined by one OFDM symbol and one (P)RB.

Figure 21:
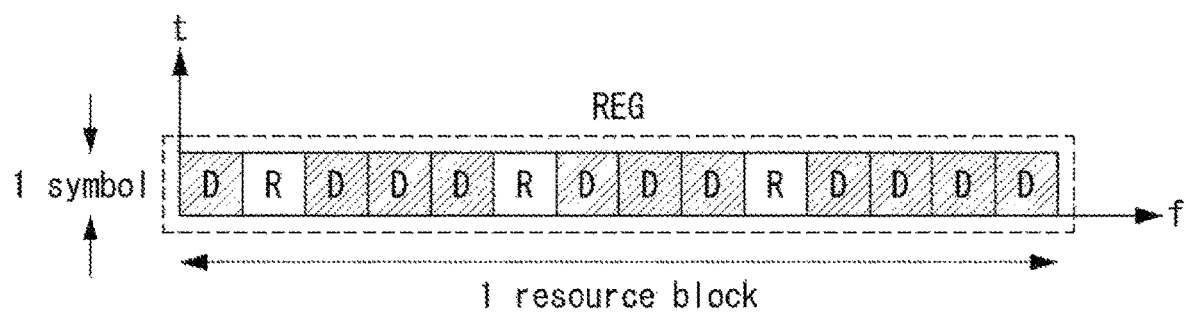
FIG. 21 is a diagram illustrating one REG structure.

FIG. 21 is a diagram illustrating one REG structure.

In FIG. 21, D represents a resource element (RE) to which the DCI is mapped, and R represents an RE to which the DMRS is mapped. The DMRS is mapped to first, fifth, and ninth REs in the frequency domain direction within one symbol.

The PDCCH is transmitted through a control resource set (CORESET). The CORESET is defined as a REG set with a given numerology (e.g. SCS, CP length, etc.). A plurality of CORESETs for one terminal may be overlapped in the time/frequency domain. The CORESET may be set through system information (e.g. MIB) or UE-specific higher layer (e.g. Radio Resource Control, RRC, layer) signaling. Specifically, the number of RBs configuring CORESET and the number of symbols (maximum 3) may be configured by higher layer signaling.

The precoder granularity in the frequency domain for each CORESET is configured to one of the following by higher layer signaling:

sameAsREG-bundle: same as REG bundle size in frequency domain allContiguousRBs: same as the number of consecutive RBs in the frequency domain inside CORESET REGs in CORESET are numbered based on a time-first mapping manner. That is, the REGs are numbered sequentially from 0 starting from the first OFDM symbol in the lowest-numbered resource block inside the CORESET.

The mapping type from CCE to REG is configured to one of a non-interleaved CCE-REG mapping type or an interleaved CCE-REG mapping type.

Figure 22:
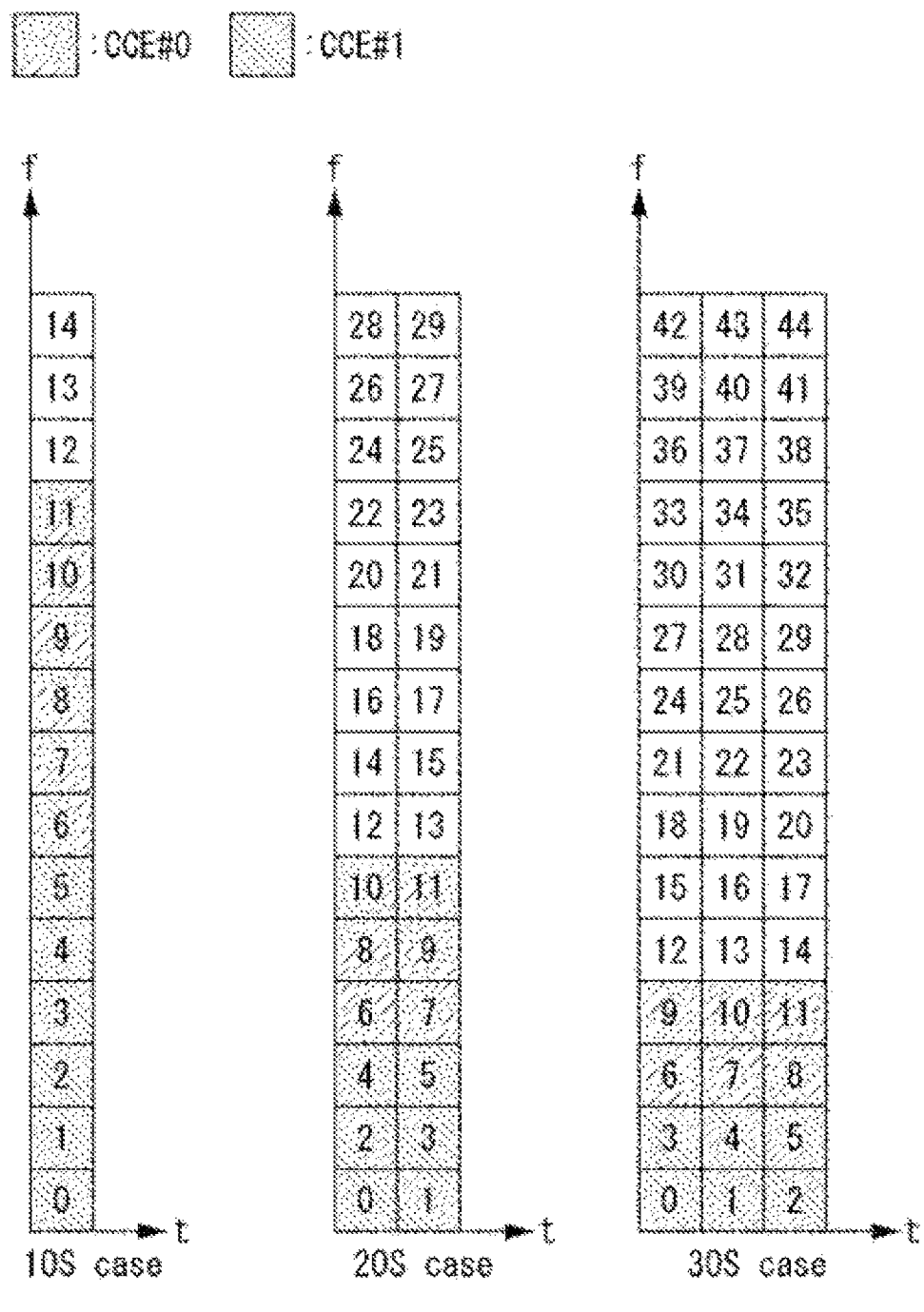
FIG. 22 is a diagram illustrating a non-interleaved CCE-REG mapping type.

FIG. 22 is a diagram illustrating a non-interleaved CCE-REG mapping type.

As illustrated in FIG. 22, non-interleaved CCE-REG mapping type (or localized mapping type): 6 REGs for a given CCE configure one REG bundle, and all REGs for a given CCE are continuous. One REG bundle may correspond to one CCE.

Figure 23:
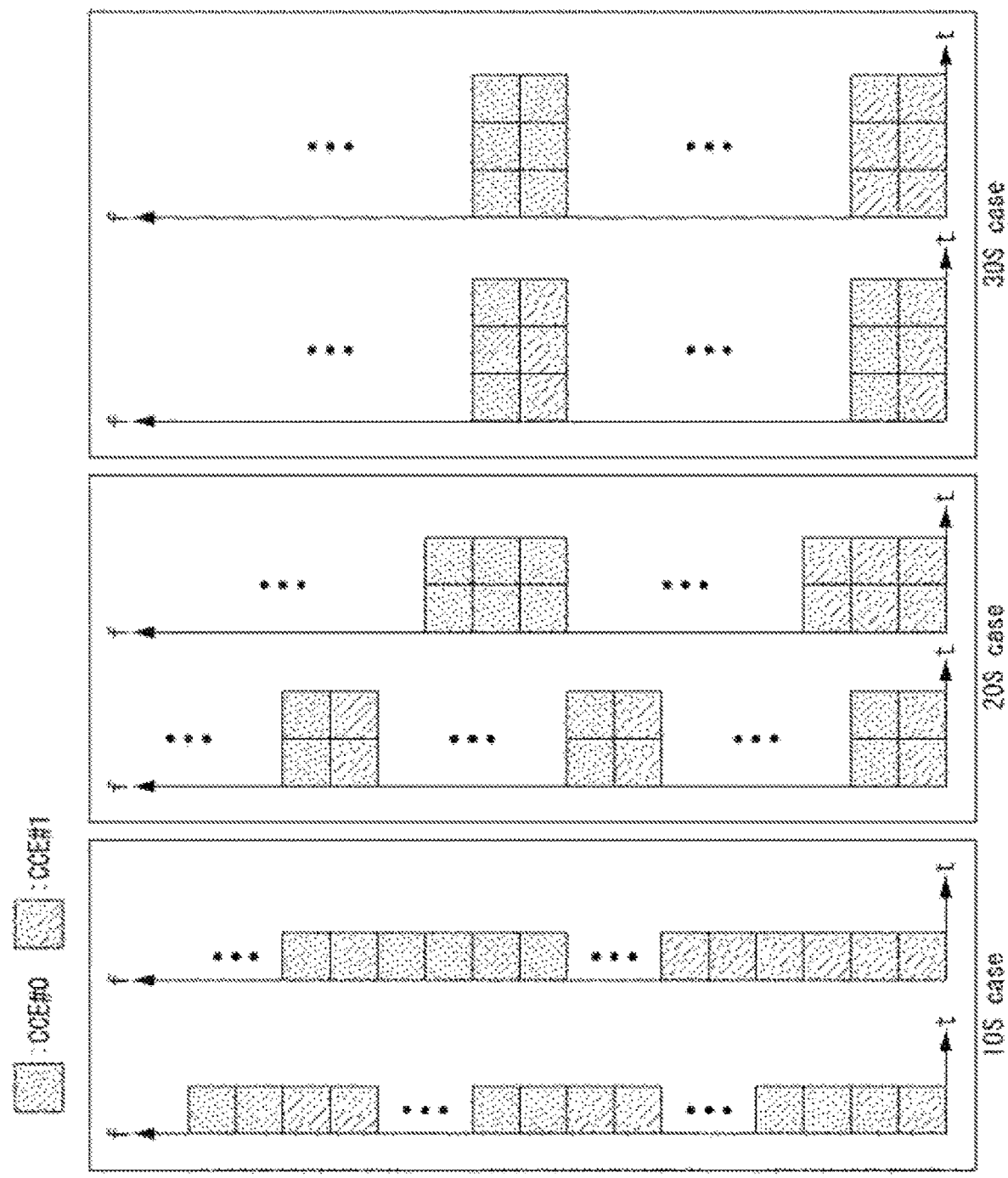
FIG. 23 is a diagram illustrating an interleaved CCE-REG mapping type.

FIG. 23 is a diagram illustrating an interleaved CCE-REG mapping type.

As illustrated in FIG. 23, interleaved CCE-REG mapping type (or distributed mapping type): 2, 3, or 6 REGs for a given CCE configure one REG bundle, and the REG bundle is interleaved in the CORESET. The REG bundle in the CORESET composed of 1 OFDM symbol or 2 OFDM symbols is composed of 2 or 6 REGs, and the REG bundle in the CORESET composed of 3 OFDM symbols is composed of 3 or 6 REGs. The size of the REG bundle may be set for each CORESET.

Figure 24:
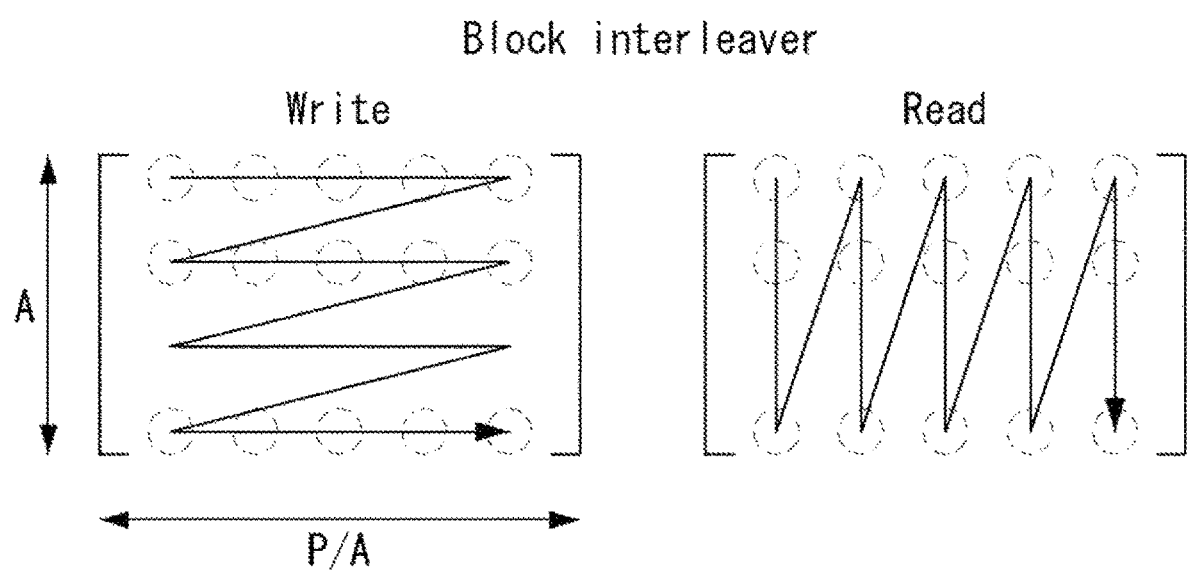
FIG. 24 is a diagram illustrating a block interleaver.

FIG. 24 is a diagram illustrating a block interleaver.

The number of rows (A) of the (block) interleaver for the above interleaving operation is set to one of 2, 3, and 6. When the number of interleaving units for a given CORESET is P, the number of columns of the block interleaver is equal to P/A. A write operation for the block interleaver is performed in a row-first direction as illustrated in FIG. 24, and a read operation is performed in a column-first direction. The cyclic shift (CS) in the interleaving unit is applied based on an ID that can be set independently for an ID that can be set for the DMRS.

The terminal acquires DCI transmitted through the PDCCH by performing decoding (alias, blind decoding) on the set of PDCCH candidates. The set of PDCCH candidates decoded by the terminal is defined as a PDCCH search space set. The search space set may be a common search space or a UE-specific search space. The terminal may acquire DCI by monitoring PDCCH candidates in one or more search space sets configured by MIB or higher layer signaling. Each CORESET setting is associated with one or more sets of search spaces, and each set of search spaces is associated with one CORESET setting. One set of search spaces is determined based on the following parameters.

controlResourceSetId: It represents the set of control resources related to the search space set.

monitoringSlotPeriodicityAndOffset: It indicates PDCCH monitoring period interval (slot unit) and PDCCH monitoring interval offset (slot unit)

monitoringSymbolsWithinSlot: It indicates the PDCCH monitoring pattern in the slot for PDCCH monitoring (e.g. it indicates the first symbol(s) of the control resource set)

nrofCandidates: It indicates the number of PDCCH candidates per AL={1, 2, 4, 8, 16} (one of 0, 1, 2, 3, 4, 5, 6, 8)

Table 19 shows features of each search space type.

TABLE 19

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 20 shows DCI formats transmitted through PDCCH

TABLE 20

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule TB-based (or TB-level) PUSCH, and DCI format 0_1 may be used to schedule TB-based (or TB-level) PUSCH or CBG (Code Block Group)-based (or CBG-level) PUSCH. DCI format 1_0 may be used to schedule TB-based (or TB-level) PDSCH, and DCI format 1_1 may be used to schedule TB-based (or TB-level) PDSCH or CBG-based (or CBG-level) PDSCH. DCI format 2_0 is used to transmit dynamic slot format information (e.g. dynamic SFI) to the terminal, and DCI format 2_1 is used to transmit downlink preemption information to the terminal. DCI format 2_0 and/or DCI format 2_1 may be transmitted to terminals in a corresponding group through a group common PDCCH, which is a PDCCH transmitted to the terminals defined as one group.

Uplink Channel Structure

The terminal transmits a related signal to the base station through an uplink channel to be described later, and the base station receives a related signal from the terminal through an uplink channel to be described later.

(1) Physical Uplink Shared Channel (PUSCH)

The PUSCH carries uplink data (e.g. UL-shared channel transport block, UL-SCH TB) and/or uplink control information (UCI), and is transmitted based on CP-OFDM (Cyclic Prefix-Orthogonal Frequency Division Multiplexing) waveform or a DFT-s-OFDM (Discrete Fourier Transform-spread-Orthogonal Frequency Division Multiplexing) waveform. When the PUSCH is transmitted based on the DFT-s-OFDM waveform, the terminal transmits the PUSCH by applying transform precoding. For example, when transform precoding is not possible (e.g. transform precoding is disabled), the terminal transmits PUSCH based on the CP-OFDM waveform, and when transform precoding is possible (e.g. transform precoding is enabled), the terminal may transmit the PUSCH based on the CP-OFDM waveform or the DFT-s-OFDM waveform. The PUSCH transmission may be dynamically scheduled by UL grant in DCI, or scheduled (configured grant) semi-statically based on higher layer (e.g. RRC) signaling (and/or Layer 1 (L1) signaling (e.g. PDCCH)). The PUSCH transmission may be performed based on a codebook or a non-codebook.

(2) Physical Uplink Control Channel (PUSCH)

The PUCCH carries uplink control information, HARQ-ACK and/or scheduling request (SR), and is divided into short PUCCH and long PUCCH according to the PUCCH transmission length. Table 21 shows PUCCH formats

TABLE 21

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 carries UCI of a maximum size of 2 bits, and is mapped and transmitted on a sequence basis. Specifically, the terminal transmits one of a plurality of sequences through a PUCCH of PUCCH format 0 to transmit a specific UCI to the base station. The terminal transmits a PUCCH of PUCCH format 0 within a PUCCH resource for SR configuration corresponding only when transmitting a positive SR.

PUCCH format 1 carries UCI of a maximum size of 2 bits, and the modulation symbol is spread by an orthogonal cover code (OCC) (which is set differently depending on whether or not frequency hopping) in the time domain. The DMRS is transmitted in a symbol in which a modulation symbol is not transmitted (i.e. time division multiplexing (TDM) is performed).

PUCCH format 2 carries UCI of a bit size larger than 2 bits, and a modulation symbol is transmitted after DMRS and frequency division multiplexing (FDM). The DM-RS is located at symbol indexes #1, #4, #7, and #10 in a given resource block with a density of 1/3. A PN (Pseudo Noise) sequence is used for the DM_RS sequence. The frequency hopping may be activated for 2-symbol PUCCH format 2.

PUCCH format 3 does not perform multiplexing of terminals within the same physical resource blocks, and carries UCI with a bit size larger than 2 bits. In other words, the PUCCH resource of PUCCH format 3 does not include an orthogonal cover code. The modulation symbol is transmitted after DMRS and TDM (Time Division Multiplexing).

PUCCH format 4 supports multiplexing of up to 4 terminals in the same physical resource block, and carries UCI with a bit size larger than 2 bits. In other words, the PUCCH resource of PUCCH format 3 includes an orthogonal cover code. The modulation symbol is transmitted after DMRS and TDM (Time Division Multiplexing).

SPS (Semi-Persistent Scheduling)

Semi-Persistent Scheduling (SPS) is a scheduling method in which resources are continuously maintained for a specific time period to a specific terminal.

When a certain amount of data is transmitted for a specific time, such as VoIP (Voice over Internet Protocol), it is not necessary to transmit control information for each data transmission section for resource allocation, so the waste of control information may be reduced by using the SPS method. In the so-called SPS method, a time resource region in which a resource may be allocated to a terminal is first allocated.

In this case, in the semi-persistent allocation method, a time resource region allocated to a specific terminal may be set to have periodicity. Thereafter, time-frequency resource allocation is completed by allocating a frequency resource region as necessary. This allocation of the frequency resource region may be referred to as so-called activation. If the semi-persistent allocation method is used, since resource allocation is maintained for a certain period by one signaling, it is not necessary to repeatedly allocate resources, thereby reducing signaling overhead.

Thereafter, when resource allocation for the terminal is no longer required, signaling for releasing frequency resource allocation may be transmitted from the base station to the terminal. This release of the allocation of the frequency resource region may be referred to as deactivation.

In the current LTE, for SPS for uplink and/or downlink, first, it is informed the terminal in which subframes SPS transmission/reception should be performed through Radio Resource Control (RRC) signaling. That is, a time resource among the time-frequency resources allocated for SPS through RRC signaling is designated first. In order to inform the subframe that can be used, for example, the period and offset of the subframe may be indicated. However, since the terminal is allocated only the time resource domain through RRC signaling, even if RRC signaling is received, it does not immediately perform transmission/reception by the SPS, and completes the time-frequency resource allocation by allocating the frequency resource domain as needed. Allocating the frequency resource region in this way may be referred to as activation, and releasing the allocation of the frequency resource region may be referred to as deactivation.

Therefore, after receiving the PDCCH indicating activation, the terminal allocates frequency resources according to RB allocation information included in the received PDCCH, and applies the modulation and code rate according to MCS (Modulation and Coding Scheme) information. Rate), and starts to perform transmission/reception according to the subframe period and offset allocated through the RRC signaling.

Then, when the terminal receives the PDCCH indicating deactivation from the base station, the transmission and reception are stopped. If a PDCCH indicating activation or reactivation is received after stopping transmission/reception, the transmission/reception is resumed with the subframe period and offset allocated by RRC signaling using the RB allocation, MCS, or the like specified in the PDCCH. That is, the time resource allocation is performed through the RRC signaling, but the actual signal transmission/reception may be performed after receiving a PDCCH indicating the activation and reactivation of the SPS, and the interruption of the signal transmission/reception is performed after receiving the PDCCH indicating the deactivation of the SPS.

Specifically, when the SPS is activated by the RRC, the following information may be provided.

SPS C-RNTI

When the SPS for uplink is activated, the uplink SPS interval (semiPersistSchedIntervalUL) and the number of empty transmissions before implicit termination In the case of TDD, whether twoIntervalsConfig is enabled or disabled for uplink When the SPS for downlink is activated, downlink SPS interval (semiPersistSchedIntervalDL) and the number of HARQ processes configured for SPS On the other hand, when the SPS is deactivated by the RRC, the configured grant or assignment needs to be discarded.

In addition, the SPS is supported only in SpCell, and is not supported for the RN communication with the E-UTRAN together with the RN subframe configuration.

Regarding the downlink SPS, after the semi-persistent downlink assignment is set, the MAC entity needs to sequentially consider that the N-th assignment occurs in the subframe as shown in Equation 3 below.

Regarding the downlink SPS, after the semi-persistent downlink assignment is set, the MAC entity needs to sequentially consider that the N-th assignment occurs in the subframe as shown in Equation 3 below.

[Equation 3]

$$(10*SFN + \text{subframe}) = [(10*SFNstart \text{ time} + subframestart \text{ time}) + N*semiPersistSchedIntervalDL] \text{ modulo } 10240$$

In Equation 3, SFNstart time and subframestart time mean an SFN and a subframe in which the configured downlink designation is (re)initialized, respectively. In the case of BL UEs or UEs with improved coverage, the SFNstart time and subframestart time may refer to the SFN and subframe of the first PDSCH transmission in which the configured downlink designation is (re)initialized.

In contrast, in relation to the uplink SPS, after the SPS uplink grant (Semi-Persistent Scheduling uplink grant) is set, the MAC entity sequentially needs to consider that the N-th grant occurs in the subframe, as shown in Equation 4 below.

[Equation 4]

$$(10 * SFN + \text{subframes}) = [(10 * SFN_{start} \text{ time} + subframe_{start} \text{ time}) +$$
$$N * semiPersistSchedIntervalUL *$$
$$\text{Subframe\_Offset} * (N \bmod 2)] \bmod 10240$$

In Equation 4, SFNstart time and subframestart time mean an SFN and a subframe in which a configured uplink grant is (re)initialized, respectively. In the case of BL UEs or UEs with improved coverage, the SFNstart time and subframestart time may refer to the SFN and subframe of the first PDSCH transmission in which the configured uplink grant is (re)initialized.

Table 22 below is an example of an RRC message (SPS-Config) for specifying the above-described SPS configuration.

TABLE 22

```
-- ANS1START
MasterInformationBlock-NB ::=      SEQUENCE {
    systemFrameNumber-MSB-r13          BIT STRING (SIZE (4)),
    hyperSFN-LSB-r13                   BIT STRING (SIZE (2)),
    schedulingInfoSIB1-r13             INTEGER (0..15),
    systemInfoValueTag-r13             INTEGER (0..31),
    ab-Enabled-r13                     BOOLEAN,
    operationModeInfo-r13              CHOICE {
        inband-SamePCI-r13                 Inband-SamePCI-NB-r13,
        inband-DifferentPCI-r13            Inband-DifferentPCI-NB-r13,
        guardband-r13                      Guardband-NB-r13,
        standalone-r13                     Standalone-NB-r13
    },
    spare                              BIT STRING (SIZE (11))
}
ChannelRasterOffset-NB-r13 ::= ENUMERATED (khz-7dot5, khz-2dot5,
khz2dot5, khz7dot5)
Guardband-NB-r13 ::=               SEQUENCE {
    rasterOffset-r13                   ChannelRasterOffset-NB-r13,
    spare                              BIT STRING (SIZE (3))
```

TABLE 22-continued

```
}
Inband-SamePCI-NB-r13 ::=          SEQUENCE {
    eutra-CRS-SequenceInfo-r13         INTEGER (0..31)
}
Inband-differentPCI-NB-r13 ::=     SEQUENCE {
    eutra-NumCRS-Ports-r13             ENUMERATED {same, four},
    rasterOffset-r13                   ChannelRasterOffset-NB-r13,
    spare                              BIT STRING (SIZE (2))
}
Standalone-NB-r13 ::=              SEQUENCE {
    spare                              BIT STRING (SIZE (5))
}
-- ASN1STOP
```

PDCCH/EPDCCH/MPDCCH Validation for Semi-Persistent Scheduling

The terminal may check the PDCCH including the SPS indication when all of the following conditions are satisfied. First, the CRC parity bit added for the PDCCH payload should be scrambled with SPS C-RNTI, and secondly, the new data indicator (NDI) field should be set to 0. Here, in the case of DCI formats 2, 2A, 2B, 2C, and 2D, the new data indicator field indicates one of the activated transport blocks.

In addition, the terminal may check the EPDCCH including the SPS indication when all of the following conditions are satisfied. First, the CRC parity bit added for the EPDCCH payload should be scrambled with the SPS C-RNTI, and secondly, the new data indicator (NDI) field should be set to 0. Here, in the case of DCI formats 2, 2A, 2B, 2C, and 2D, the new data indicator field indicates one of the activated transport blocks.

In addition, the terminal may check the MPDCCH including the SPS indication when all of the following conditions are satisfied. First, the CRC parity bit added for the MPDCCH payload should be scrambled with the SPS C-RNTI, and secondly, the new data indicator (NDI) field should be set to 0.

The validation is completed when each field used in the DCI format is set according to Table 23 or Table 24, Table 25, and Table 26 below. When such validation is completed, the terminal recognizes the received DCI information as valid SPS activation or deactivation (or cancellation). On the other hand, if the validation is not completed, the terminal recognizes that a non-matching CRC is included in the received DCI format.

Table 23 shows a field for validating the PDCCH/EPDCCH indicating the SPS activation

TABLE 23

| | DCI format 0 | DCI format 1/1A | DCI format 2/2A/2B/2C/2D |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FPP: sat to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

Table 24 illustrates a field for validating PDCCH/EPDCCH indicating SPS deactivation (or release).

TABLE 24

| | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |

TABLE 24-continued

|  | DCI format 0 | DCI format 1A |
|---|---|---|
| Modulation and coding scheme | N/A | set to '11111' |
| Redundancy version | N/A | set to '00' |

Table 25 shows a field for validating the MPDCCH indicating the SPS activation

TABLE 25

|  | DCI format 6-0A | DCI format 6-1A |
|---|---|---|
| HARQ process number | set to '000' | FDD: set to '000'<br>TDD: set to '0000' |
| Redundancy version | set to '00' | set to '00' |
| TPC command for scheduled PUSCH | set to '00' | N/A |
| TPC command for scheduled PUCCH | N/A | set to '00' |

Table 26 illustrates a field for validating the MPDCCH indicating SPS deactivation (or release).

TABLE 26

|  | DCI format 6-0A | DCI format 6-1A |
|---|---|---|
| HARQ process number | set to '000' | FDD 5 set to '000'<br>TDD: set to '0000' |
| Redundancy version | set to '00' | set to '00' |
| Repetition number | set to '00' | set to '00' |
| Modulation and coding scheme | set to '1111' | set to '1111' |
| TPC command for scheduled PUSCH | set to '00' | N/A |
| Resource block assignment | Set to all '1's | Set to all '1's |

When the DCI format indicates activation of SPS downlink scheduling, the TPC command value for the PUCCH field may be used as an index indicating four PUCCH resource values configured by a higher layer.

Table 27 shows the PUCCH resource values for the downlink SPS

TABLE 27

| Value of 'TPC command for PUCCH' | $n_{PUCCH}^{(1,p)}$ |
|---|---|
| '00' | The first PUCCH resource value configured by the higher layers |
| '01' | The second PUCCH resource value configured by the higher layers |
| '10' | The third PUCCH resource value configured by the higher layers |
| '11' | The fourth PUCCH resource value configured by the higher layers |

Downlink Control Channel Related Procedure in NB-IoT

A procedure related to the Narrowband Physical Downlink Control Channel (NPDCCH) used in NB-IoT will be described.

The terminal needs to monitor NPDCCH candidates (i.e. a set of NPDCCH candidates) as configured by higher layer signaling for control information. Here, the monitoring may mean attempting to decode each of the NPDCCHs in the set according to all monitored DCI formats. The set of NPDCCH candidates for monitoring may be defined as an NPDCCH search space. In this case, the terminal may perform monitoring using an identifier (e.g. C-RNTI, P-RNTI, SC-RNTI, G-RNTI) corresponding to the corresponding NPDCCH discovery region.

In this case, the terminal needs to monitor one of a) Type1-NPDCCH common search space (Type1-NPDCCH common search space), b) Type2-NPDCCH common search space (Type2-NPDCCH common search space), and c) NPDCCH terminal-specific search area (NPDCCH UE-specific search space). In this case, the terminal does not need to simultaneously monitor the NPDCCH UE-specific discovery area and the Type1-NPDCCH common discovery area. In addition, the terminal does not need to simultaneously monitor the NPDCCH terminal-specific search area and the Type2-NPDCCH common search area. In addition, the terminal does not need to simultaneously monitor the Type1-NPDCCH common search area and the Type2-NPDCCH common search area.

An NPDCCH search area at an aggregation level and a repetition level is defined by a set of NPDCCH candidates. Here, each of the NPDCCH candidates is repeated in R contiguous NB-IoT downlink subframes excluding a subframe used for transmission of a system information (SI) message starting at subframe k.

In the case of the NPDCCH terminal-specific search area, the aggregation and repetition levels defining the search area and the corresponding monitored NPDCCH candidates are substitute the RMAX value with the parameter al-Repetition-US S configured by the higher layer, which is listed as shown in Table 28.

TABLE 28

|  |  | NCCE indices of monitored NPDCCH candidates | |
|---|---|---|---|
| $R_{max}$ | R | L' = 1 | L' = 2 |
| 1 | 1 | {0}, {1} | {0, 1} |
| 2 | 1 | {0}, {1} | {0, 1} |
|  | 2 |  | {0, 1} |
| 4 | 1 |  | {0, 1} |
|  | 2 |  | {0, 1} |
|  | 4 |  | {0, 1} |
| {0, 1} >= 8 | $R_{max}/8$ |  | {0, 1} |
|  | $R_{max}/4$ |  | {0, 1} |
|  | $R_{max}/2$ |  | {0, 1} |
|  | $R_{max}$ |  | {0, 1} |

Note 1:
{x} and {y} refer to the NPDCCH format 0 candidate of the NCCE index 'x' and the NPDCCH format 0 candidate of the NCCE index 'y'.
Note 2:
{x, y} refers to NPDCCH format 1 candidates corresponding to NCCE indexes 'x' and 'y'.

In the case of the Type1-NPDCCH common search area, the aggregation and repetition levels defining the search area and the corresponding monitored NPDCCH candidates are substitute the RMAX value with the parameter al-Repetition-CSS-Paging configured by the higher layer, which is listed as shown in Table 29.

TABLE 29

|  |  | NCCE indices of monitored NPDCCH candidates | |
|---|---|---|---|
| $R_{max}$ | R | L' = 1 | L' = 2 |
| 1 | 1 |  | {0, 1} |
| 2 | 1, 2 |  | {0, 1} |
| 4 | 1, 2, 4 |  | {0, 1} |
| 8 | 1, 2, 4, 8 |  | {0, 1} |
| 16 | 1, 2, 4, 8, 16 |  | {0, 1} |
| 32 | 1, 2, 4, 8, 16, 32 |  | {0, 1} |
| 64 | 1, 2, 4, 8, 16, 32, 64 |  | {0, 1} |
| 128 | 1, 2, 4, 8, 16, 32, 64, 128 |  | {0, 1} |

TABLE 29-continued

| $R_{max}$ | R | \{L' = 1\} | \{L' = 2\} |
|---|---|---|---|
| 256 | 1, 4, 8, 16, 32, 64, 128, 256 | | \{0, 1\} |
| 512 | 1, 4, 16, 32, 64, 128, 256, 512 | | \{0, 1\} |
| 1024 | 1, 8, 32, 64, 128, 256, 512, 1024 | | |
| 2048 | 1, 8, 64, 128, 256, 512, 1024, 2048 | | |

Note 1:
\{x\} and \{y\} refer to the NPDCCH format 0 candidate of the NCCE index 'x' and the NPDCCH format 0 candidate of the NCCE index 'y'.
Note 2:
\{x, y\} refers to NPDCCH format 1 candidates corresponding to NCCE indexes 'x' and 'y'.

In the case of the Type2-NPDCCH common search area, the aggregation and repetition levels defining the search area and the corresponding monitored NPDCCH candidates are substitute the RMAX value with the parameter npdcch-MaxNumRepetitions-RA configured by the higher layer, which is listed as shown in Table 30.

TABLE 30

| $R_{max}$ | R | \{L' = 1\} | \{L' = 2\} |
|---|---|---|---|
| 1 | 1 | | \{0, 1\} |
| 2 | 1 | | \{0, 1\} |
|  | 2 | | \{0, 1\} |
| 4 | 1 | | \{0, 1\} |
|  | 2 | | \{0, 1\} |
|  | 4 | | \{0, 1\} |
| \{0, 1\} >= 8 | $R_{max}/8$ | | \{0, 1\} |
|  | $R_{max}/4$ | | \{0, 1\} |
|  | $R_{max}/2$ | | \{0, 1\} |
|  | $R_{max}$ | | \{0, 1\} |

Note 1:
\{x\} and \{y\} refer to the NPDCCH format 0 candidate of the NCCE index 'x' and the NPDCCH format 0 candidate of the NCCE index 'y'.
Note 2: \{x, y\} refers to NPDCCH format 1 candidates corresponding to NCCE indexes 'x' and 'y'.

In this case, the location of the starting subframe k is given by k=kb. Here, kb denotes the b-th consecutive NB-IoT downlink subframe from subframe k0, b denotes u*R, and u denotes 0, 1, ... (RMAX/R)−1. In addition, the subframe k0 means a subframe that satisfies Equation (5).

$$(10n_f + \lfloor n_s/2 \rfloor) \mod T = \alpha_{offset} \cdot T, \text{ where } T = R_{max} \cdot G \quad \text{[Equation 5]}$$

In the case of the NPDCCH terminal-specific search area, G shown in Equation 5 is given by the higher layer parameter nPDCCH-startSF-UESS, and $\alpha_{offset}$ is given by the higher layer parameter nPDCCH-startSFoffset-UESS. In addition, in the case of the NPDCCH Type2-NPDCCH common search area, G shown in Equation 5 is given by the higher layer parameter nPDCCH-startSF-Type2CSS, and $\alpha_{offset}$ is given by the higher layer parameter nPDCCH-startSFoffset-Type2CSS. In addition, in the case of the Type1-NPDCCH common search area, k is k0, and is determined from the location of the NB-IoT paging opportunity subframe.

When the terminal is configured by a higher layer as a PRB for monitoring an NPDCCH UE-specific color gamut, the terminal should monitor the NPDCCH UE-specific search area in the PRB configured by the higher layer. In this case, the terminal does not expect to receive NPSS, NSSS, and NPBCH in the corresponding PRB. On the other hand, if the PRB is not configured by the higher layer, the terminal should monitor the NPDCCH UE-specific search area in the same PRB as the NPSS/NSSS/NPBCH is detected.

When the NB-IoT terminal detects an NPDCCH having DCI format N0 ending in subframe n, and when transmission of the corresponding NPUSCH format 1 starts in subframe n+k, the terminal is no need to monitor the NPDCCH of any subframe starting in the range from subframe n+1 to subframe n+k−1.

In addition, when the NB-IoT terminal detects an NPDCCH having DCI format N1 or DCI format N2 ending in subframe n, and the transmission of the corresponding NPDSCH starts at subframe n+k, the terminal does not need to monitor the NPDCCH of any subframe starting in the range from subframe n+1 to subframe n+k−1.

In addition, when the NB-IoT terminal detects an NPDCCH having a DCI format N1 ending in subframe n, and when the transmission of the corresponding NPUSCH format 2 starts at subframe n+k, the terminal does not need to monitor the NPDCCH of any subframe starting in the range from subframe n+1 to subframe n+k−1.

In addition, when the NB-IoT terminal detects an NPDCCH having a DCI format N1 for "PDCCH order" ending in subframe n, and when THE transmission of the corresponding NPRACH starts in subframe n+k, the terminal does not need to monitor the NPDCCH of any subframe starting in the range from subframe n+1 to subframe n+k−1.

In addition, when the NB-IoT terminal has NPUSCH transmission ending in subframe n, the terminal does not need to monitor the NPDCCH of any subframe starting within the range from subframe n+1 to subframe n+3.

In addition, when the NPDCCH candidate of the NPDCCH search area ends in subframe n, and when the terminal is configured to monitor the NPDCCH candidate of another NPDCCH search area starting before subframe n+5, the NB-IoT terminal does not need to monitor NPDCCH candidates.

Regarding the NPDCCH starting position, the starting OFDM symbol for the NPDCCH is given by the index lNPDCCHStart in the first slot of subframe k. In this case, when the higher layer parameter operarionModeInfo indicates '00' or '01', the index lNPDCCHStart is given by the higher layer parameter eutaControlRegionSize. In contrast, when the higher layer parameter operarionModeInfo indicates '10' or '11', the index lNPDCCHStart is 0.

NPDCCH Validation for SPS

The terminal may determine that the NPDCCH for allocating semi-persistent scheduling is valid only when all of the following conditions are satisfied.

The CRC parity bit acquired for the NPDCCH payload should be scrambled with semi-persistent scheduling C-RNTI.

A new data indicator field should be set to '0'.

If all fields for the used DCI format N0 are set according to Table 31 or Table 32 below, the validity of the NPDCCH may be checked.

TABLE 31

| | DCI format N0 |
|---|---|
| HARQ process (present if UE is configured with 2 uplink HARQ processes) | set to '0' |
| Redundancy version | set to '0' |
| Modulation and coding scheme | set to '0000' |
| Resource assignment | set to '000' |

TABLE 32

|  | DCI format N0 |
|---|---|
| HARQ process number (present if UE is configured with 2 uplink HARQ processes) | set to '0' |
| Redundancy version | set to '0' |
| Repetition number | set to '000' |
| Modulation and coding scheme | set to '1111' |
| Subcarrier indication | Set to all '1's |

When the validity of the NPDCCH is confirmed, the terminal should regard the NPDCCH as effective semi-persistent scheduling activation or release according to received DCI information.

When the validity of the NPDCCH is not confirmed, the UE should regard the received DCI information as being received along with a non-matched CRC.

DCI Format

DCI transmits downlink or uplink scheduling information for one cell and one RNTI. Here, RNTI is implicitly encoded as CRC.

As DCI formats related to NB-IoT, DCI format N0 (DCI format N0), DCI format N1 (DCI format N1), and DCI format N2 (DCI format N2) may be considered.

First, the DCI format N0 is used for scheduling the NPUSCH in one UL cell, and may transmit the following information.

A flag for discriminating between format N0 and format N1 (e.g. 1 bit), where a value 0 may indicate format N0, and value 1 may indicate format N1.
 Subcarrier indication (e.g. 6 bits)
 Resource assignment (e.g. 3 bits)
 Scheduling delay (e.g. 2 bits)
 Modulation and coding scheme (e.g. 4 bits)
 Redundancy version (e.g. 1 bit)
 Repetition number (e.g. 3 bits)
 New data indicator (e.g. 1 bit)
 DCI subframe repetition number (e.g. 2 bits)

Next, DCI format N1 is used for scheduling of one NPDSCH codeword in one cell and a random access procedure initiated by the NPDCCH order. In this case, the DCI corresponding to the NPDCCH sequence may be carried by the NPDCCH.

The DCI format N1 may transmit the following information.

A flag for discriminating between format N0 and format N1 (e.g. 1 bit), where a value 0 may indicate format N0, and value 1 may indicate format N1.

Format N1 is used for a random access procedure initiated by the NPDCCH sequence only when the NPDCCH sequence indicator is set to '1', the CRC (Cyclic Redundancy Check) of format N1 is scrambled with C-RNTI, and all other fields are set as follows.

Starting number of NPRACH repetitions (e.g. 2 bits)
 NPRACH subcarrier indication of PRACH (e.g. 6 bits)
 All remaining bits of format N1 are set to '1'.

Otherwise, the following remaining information is transmitted.

Scheduling delay (e.g. 3 bits)
 Resource assignment (e.g. 3 bits)
 Modulation and coding scheme (e.g. 4 bits)
 Repetition number (e.g. 4 bits)
 New data indicator (e.g. 1 bit)
 HARQ-ACK resource (e.g. 4 bits)
 DCI subframe repetition number (e.g. 2 bits)

When the CRC of format N1 is scrambled with RA-RNTI, the following information (i.e. field) among the information (i.e. fields) is reserved.

New data indicator
 HARQ-ACK resource

At this time, if the number of information bits of the format N1 is smaller than the number of information bits of the format N0, '0' should be appended until the payload size of the format N1 becomes the same as the payload size of the format N0.

Next, DCI format N2 is used for paging and direct indication, and may transmit the following information.

A flag for discriminating between paging and direct indication (e.g. 1 bit), where a value of 0 may indicate a direct indication, and a value of 1 may indicate paging.

When the value of the flag is 0, the DCI format N2 includes direct indication information (e.g. 8 bits), and reserved information bits for setting the same size as the format N2 in which the flag value is 1.

On the other hand, when the value of the flag is 1, the DCI format N2 includes (or transmits) resource allocation (e.g. 3 bits), modulation and coding technique (e.g. 4 bits), repetition number (e.g. 4 bits), and DCI subframe repetition number (e.g. 3 bits).

Resource Allocation for Uplink Transmission with Configured Grant

When the PUSCH resource allocation is semi-persistently configured by the higher layer parameter ConfiguredGrantConfig of the bandwidth information element, and the PUSCH transmission corresponding to the configured grant is triggered, the next higher layer parameter is applied to the PUSCH transmission:

In the case of type 1 PUSCH transmission by the configured grant, the following parameters are provided to ConfiguredGrantConfig.
 The higher layer parameter timeDomainAllocation value m provides a row index m+1 indicating an allocated table, and the allocated table indicates a combination of a start symbol, a length, and a PUSCH mapping type. Here, the table selection follows the rules for UE specific search space defined in 6.1.2.1.1 of TS38.214.
 Frequency domain resource allocation is determined by the higher layer parameter frequencyDomainAllocation according to the procedure of section 6.1.2.2 of TS38.214 for a given resource allocation type indicated by resourceAllocation.
 IMCS is provided by the higher layer parameter mcsAndTBS.
 As in section 7.3.1.1 of TS 38.212, the DM-RS CDM group, DM-RS port, SRS resource indication and DM-RS sequence initialization number are determined. The antenna port value, the bit value for the DM-RS sequence initialization, the precoding information and the number of layers, and the SRS resource indicator are provided by antennaPort, dmrs-SeqInitialization, precodingAndNumberOfLayers, and srs-ResourceIndicator, respectively.
 When the frequency hopping is enabled, the frequency offset between two frequency hops may be configured by the higher layer parameter frequencyHoppingOffset.
 In the case of type 2 PUSCH transmission by the configured grant: The resource allocation follows the higher layer configuration according to [10, TS 38.321] and the uplink grant (UL grant) received in the downlink control information (DCI).

When the higher layer does not deliver a transport block to be transmitted in a resource allocated for uplink transmission without a grant, the terminal does not transmit anything in the resource configured by ConfiguredGrant-Config.

The set of permissible periods P is defined in [12, TS 38.331].

Transport Block Repetition for Uplink Transmission with a Configured Grant

Higher layer configuration parameters repK and repK-RV define K repetition to be applied to the transmitted transport block and RV pattern to be applied to repetition. For the nth transmission case among K repetitions (n=1, K), the corresponding transmission is associated with the (mod(n−1,4)+1)th value in the set RV sequence. The initial transmission of the transport block may be started in the following cases.

If the set RV sequence is {0, 2, 3, 1}, the first transmission occasion of K repetition If the set RV sequence is {0, 3, 0, 3}, any one of the transmission occasions of K repetitions associated with RV=0.

If the set RV sequence is {0, 0, 0, 0}, one of the transmission occasions of K repetition (excluding the last transmission occasion when K=8)

For any RV sequence, when transmitted by repetition K times, the repetition should end at the point where it first reaches when it is the last transmission occasion among K repetitions in period P or when a UL grant for scheduling the same TB is received within period P.

Regarding the time duration for transmission of K repetitions, the terminal does not expect to set a duration greater than the duration induced by the period P.

For both type 1 and type 2 PUSCH transmission, when repK>1 is configured to the terminal, the terminal should repeat the TB through contiguous repK slots by applying the same symbol allocation in each slot. If the terminal procedure for determining the slot configuration defined in section 11.1 of TS 38.213 determines the symbol of a slot allocated for PUSCH as a downlink symbol, the transmission in the corresponding slot is omitted for multi-slot PUSCH transmission.

Uplink Power Control in NB-IoT

The uplink power control controls transmission power of another uplink physical channel.

Uplink Power Control Operation of UE (UE Behavior)

The setting of the UE transmit power for the narrowband physical uplink shared channel (NPUSCH) transmission is defined as follows. In the case of FDD, the UE may use the enhanced random access power control [12], and is configured by a higher layer, and in the case of TDD, the enhanced random access power control should be applied to the UE that initiates the random access procedure at the first and second configured NPRACH repetition level.

The transmit power $P_{NPUSCH,c}(i)$ of the terminal for NPUSCH transmission in the NB-IoT uplink slot i for the serving cell C is given as follows:

When the enhanced random access power control is not applied, in the case of NPUSCH(re) transmission corresponding to random access response grant and all other NPUSCH transmissions in which the number of repetitions of the allocated NPUSCH RU is greater than 2:

$$P_{NPUSCH,c}(i) = P_{CMAX,c}(i) \text{ [dBm]} \quad \text{[Equation 6]}$$

In other cases, $$P_{NPUSCH,c}(i) = \min \begin{Bmatrix} P_{CMAX,c}(i), \\ 10\log_{10}(M_{NPUSCH,c}(i)) + P_{O\_NPUSCH,c}(j) + \alpha_c(j) \cdot PL_c \end{Bmatrix} \quad \text{[Equation 7]}$$

[dBm]

where $P_{CMAC,c}(i)$—$P_{CMAC,c}(i)$ is the configured UE transmit power defined in [6] of the NB-IoT UL slot i for the cell serving C.

$1_{O\_NPUSCHd}(j)$—$P_{O\_NPUSCHd}(j)$ is a parameter consisting of a sum of a component $P_{O\_NOMIANL\_NPUSCH,c}(j)$ provided from the higher layer and a component $P_{O\_UE\_NPUSCH,c}(j)$ provided from the higher layer for the serving cell C in j=1, and j∈{1,2}. In the case of the NPUSCH (re) transmission corresponding to the dynamically scheduled grant, j=1, and in the case of the NPUSCH (re) transmission corresponding to the random access response grant, j=2, and $P_{O\_UE\_NPUSCH,c}(2)=0$. In the case where the enhanced random access power control is not applied, $P_{O\_NOMIANL\_NPUSCH,c}(2)=P_{O\_PRE}+\Delta_{PREAMBLE\_Msg3}$, where the parameters preambleInitialReceivedTargetPower [8] ($P_{O\_PRE}$) and $\Delta_{PREAMBLE\_Msg3}$ are signaled by the higher layer for the cell serving C. If enhanced random access power control is applied. When the enhanced random access power control is applied, $$P_{O\_NORMINAL\_NPUSCH,c}(2) = \text{MSG3\_RECEIVED\_TARGET\_POWER} + \Delta_{PREAMBLE\_Msg3} \quad \text{[Equation 8]}$$

Here, j=1, $\alpha_c(j)=1$ in NPUSCH format 2; in NPUSCH format 1, $\alpha_c(j)$ is provided in the higher layer for the serving cell C. When j=2, $\alpha_c(j)=1$.

$PL_c$ is the estimated downlink path loss calculated by the UE for the cell C and $PL_c$=nrs-Power+nrs-PowerOffsetNonAnchor-NRSRP, where nrs-Power is provided by the higher layer and lower clause 16.2.2.2, and nrs-power-offsetNonAnchor is configured to 0 when it is not provided by the higher layer.

Power Headroom

When the UE transmits NPUSCH for cell serving in NB-IoT UL slot i, power headroom is calculated using the following.

$$PH_c(i) = P_{CMAX,c}(i) - \{P_{O\_NPUSCH,c}(1) + \alpha_c(1) \cdot PL_c\} \text{ [dB]} \quad \text{[Equation 9]}$$

Here, PCMX,c(i), PO_NPUSCH,c(1), αc(1), and PLc are defined in Subclause 16.2.1.1.1.

The power headroom should be rounded to the nearest value from [PH1, PH2, PH3, PH4] dB of the set as defined in [10], and should be transferred to the higher layer by the physical layer <Embodiment of the Present Disclosure>

The above contents (3GPP system, frame structure, NB-IoT system, etc.) may be applied in combination with the methods proposed in the present disclosure to be described later, or may be supplemented to clarify the technical characteristics of the methods proposed in the present disclosure.

Narrow Band (NB)-LTE is a system for supporting low complexity and low power consumption with a system bandwidth corresponding to 1 PRB of an LTE system. This can be mainly used as a communication method of implementing the Internet of Things (IoT) by supporting a device such as machine-type communication (MTC) in a cellular system.

By using the same OFDM parameters as LTE, such as subcarrier spacing of the existing LTE, there is an advantage in that the frequency can be efficiently used by allocating 1 PRB to the legacy LTE band for NB-LTE without additional band allocation. In the case of the downlink, the physical channel of the NB-LTE is defined as NPSS/NSSS, NPBCH, NPDCCH/NEPDCCH, NPDSCH, etc., and N is added to be distinguished from LTE.

Semi-permanent scheduling (SPS) has been introduced and used in legacy LTE and LTE eMTC. The first terminal receives SPS configuration setup information through RRC signaling. Subsequently, when the terminal SPS activation DCI (with SPS-C-RNTI) is received, the SPS is operated using SPS configuration information received through RRC signaling, resource scheduling information, MCS information, etc. included in the DCI. When the terminal receives the SPS release DCI (with SPS-C-RNTI), the SPS is released. Thereafter, when the SPS activation DCI (with SPS-C-RNTI) is received again, the SPS operates as described above. If, after receiving the SPS release DCI (with SPS-C-RNTI), the terminal receives the SPS configuration release information by RRC signaling, the terminal may not detect the SPS activation before receiving the SPS configuration setup information again (because the SPS-C-RNTI value is not known).

The meaning of the phrase 'monitor search space' used in the present disclosure means the process of decoding the NPDCCH for a specific area according to the DCI format to be received through the search space, and then scrambling the corresponding CRC with a predetermined RNTI value to check whether the desired value is correct. In addition, since each UE in the NB-LTE system recognizes a single PRB as a respective carrier, it can be said that the PRB mentioned in this document has the same meaning as a carrier. The DCI formats N0, N1, and N2 mentioned in this document refer to DCI formats N0, N1, and N2 in the 3GPP TS 36.212[2] standard.

In addition, the above contents (3GPP system, frame structure, NB-IoT, MTC system, U-band system, etc.) may be applied in combination with the methods proposed in the present disclosure to be described later, or may be supplemented to clarify the technical characteristics of the methods proposed in the present disclosure.

In addition, contents (half DMRS design for PUR, DMRS orthogonality for PUR transmission, interlace definition method based on the entire CC BW, interlace definition method based on LBT-SB, integrated solution for CFS PUR and CBS PUR, or the like) related to PUR (preconfigure uplink resource) to be described later is related to the uplink transmission, and may be equally applied to the uplink signal transmission method in the NB-IoT system, MTC system, and U-Band system (unlicensed band) described above, and it goes without saying that it can be transformed or replaced to fit the terms, expressions, and structures defined in each system so that the technical idea proposed in the present disclosure can be implemented in the relevant system.

For example, the uplink transmission through a PUR to be described later may be performed in an L-cell and/or a U-cell defined in a U-Band system.

The above-described methods (e.g., the methods described in the first to third embodiments) are methods in which one base station (e.g., NR base station) basically supports the LTE NB-IoT system and/or the LTE eMTC system within the NR band.

However, the above-described methods (e.g., the methods described in the first to third embodiments) may be extended and applied to a form in which two different base stations (e.g., LTE base station, NR base station) coexist while providing their respective services. That is, even when an NR base station supports an NR system and an LTE base station supports an NB-IoT system or an eMTC system and coexists in a frequency band, the above-described methods may be considered for optimization.

In addition, as mentioned above, when the above-described methods (for example, the methods described in the first to third embodiments) are used when the NB-IoT system and/or (e) the MTC system coexist with the NR system, it goes without saying that each of the two or more methods may be applied independently, or two or more methods may be applied in combination.

Figure 25:
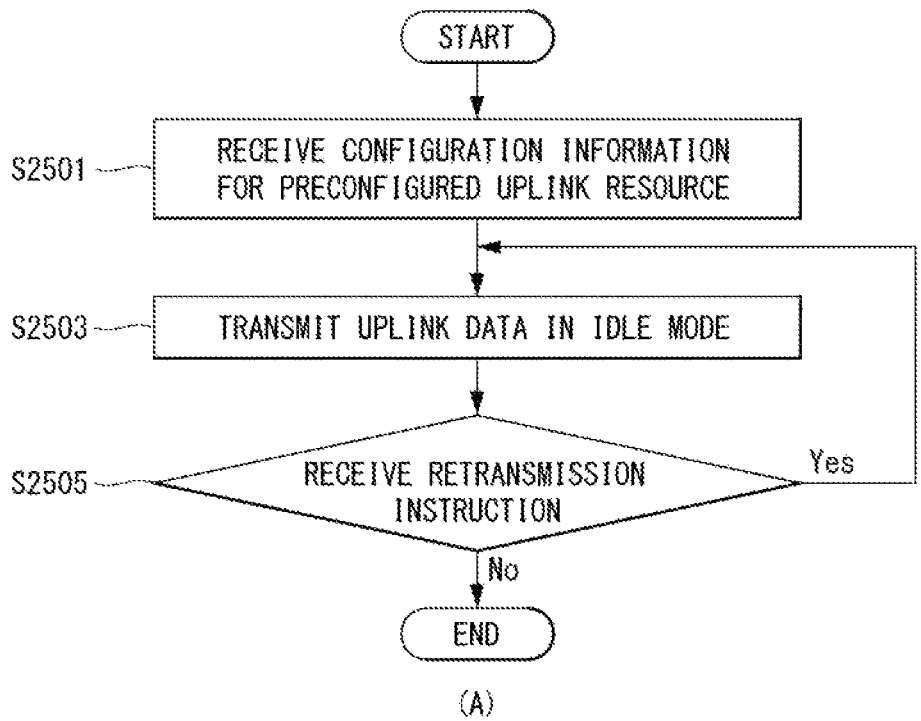
FIG. 25 is an operation flowchart of a terminal and a base station performing idle mode PUR transmission of one or more physical channels/signals to which the method proposed in the present disclosure may be applied.
Figure 25:
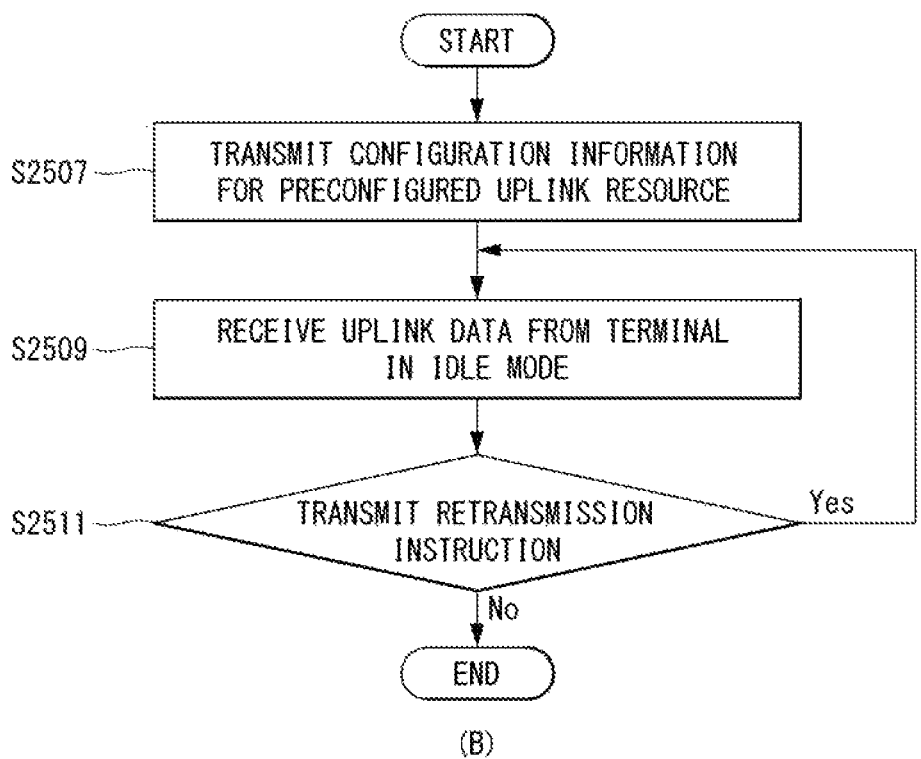

FIG. 25 is an operation flowchart of a terminal and a base station performing idle mode PUR transmission of one or more physical channels/signals to which the method proposed in the present disclosure may be applied.

FIG. 25(A) is a diagram illustrating an example of an operation flowchart of a terminal performing idle mode PUR transmission of one or more physical channels/signals to which the method proposed in the present disclosure may be applied.

FIG. 25(A) is merely for convenience of description and does not limit the scope of the present invention.

As illustrated in FIG. 25(A), first, the terminal receives configuration information for a preconfigured uplink resource (PUR) (S2501).

Then, the terminal transmits uplink data in the idle mode (S2503).

Finally, when the terminal receives the retransmission instruction, step S2503 is performed again, and when the retransmission instruction is not performed, the operation is terminated (S2505).

FIG. 25(B) is a diagram illustrating an example of an operation flowchart of a base station performing idle mode PUR transmission of one or more physical channels/signals to which the method proposed in the present disclosure may be applied.

FIG. 25(B is merely for convenience of description and does not limit the scope of the present invention.

As illustrated in FIG. 25(B), the base station transmits configuration information for a preconfigured uplink resource to the terminal (S2507).

Subsequently, the base station receives uplink data from the terminal in the idle mode (S2509).

Finally, when the base station transmits the retransmission instruction to the terminal, step S2509 is performed again, and when the retransmission instruction is not transmitted, the operation ends (S2511).

Figure 26:
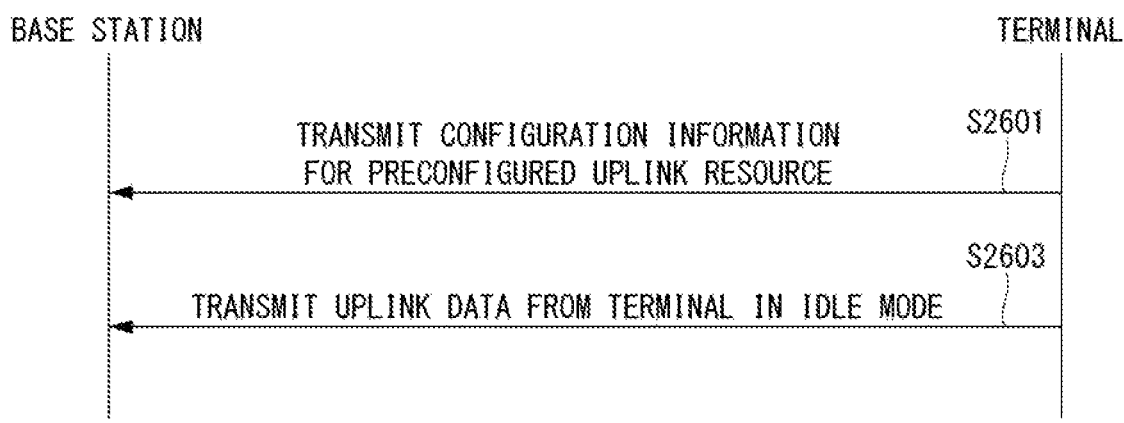
FIG. 26 is a diagram illustrating an example of signaling between a terminal and a base station performing idle mode PUR transmission/reception of one or more physical channels/signals to which the method proposed in the present disclosure may be applied.

FIG. 26 is a diagram illustrating an example of signaling between a terminal and a base station performing idle mode PUR transmission/reception of one or more physical channels/signals to which the method proposed in the present disclosure may be applied.

FIG. 26 is merely for convenience of description and does not limit the scope of the present invention.

As illustrated in FIG. 26, the base station transmits configuration information for a preconfigured uplink resource to the terminal (S2601).

Subsequently, the terminal transmits uplink data to the base station in the idle mode (S2603).

Figure 27:
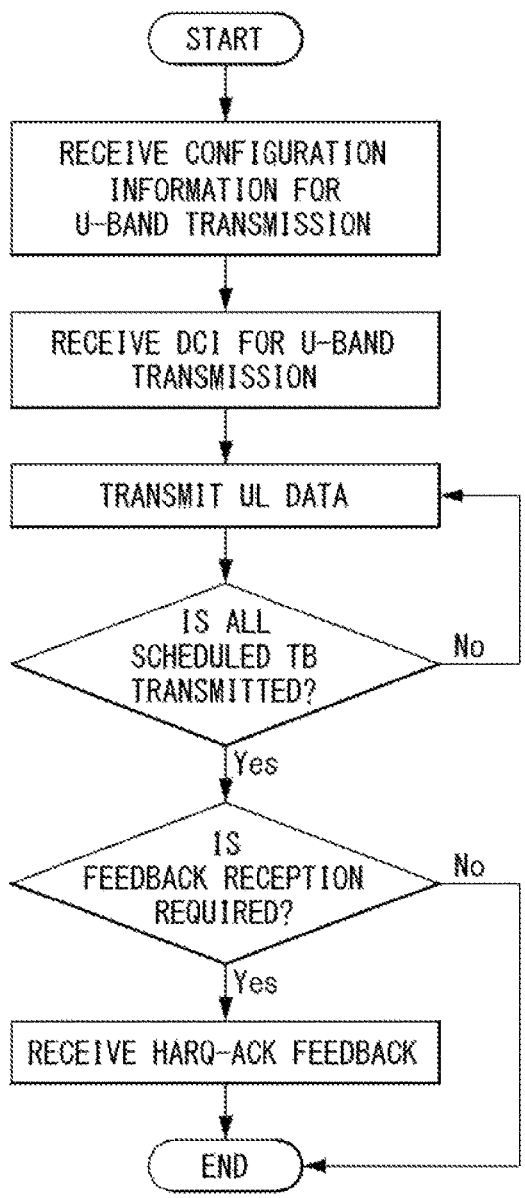
FIG. 27 is a diagram illustrating an example of an operation flowchart of a terminal performing NR U-band transmission of one or more physical channels/signals to which the method proposed in the present disclosure may be applied.
Figure 27:
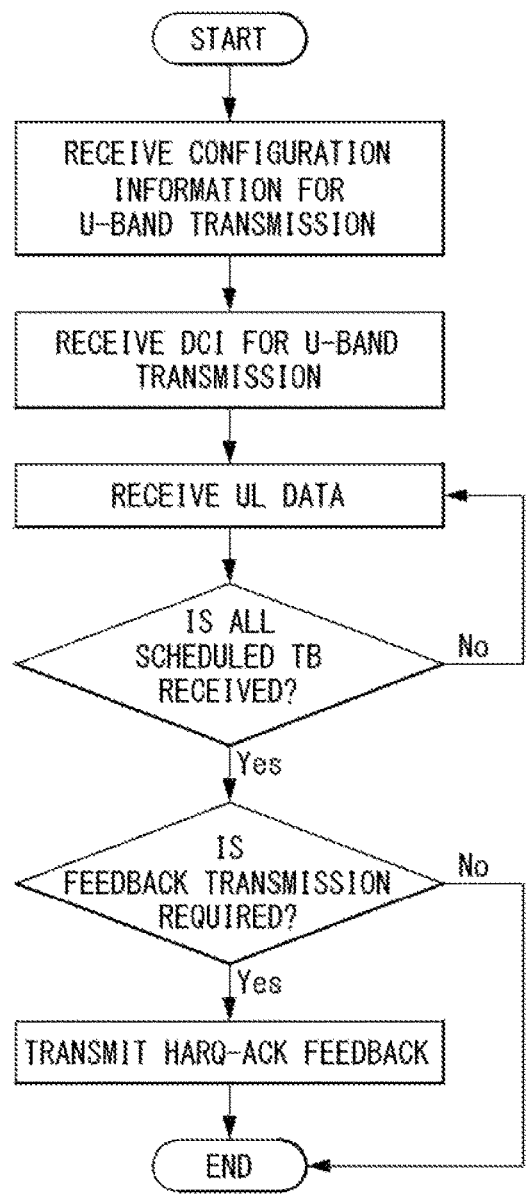

FIG. 27 is a diagram illustrating an example of an operation flowchart of a terminal performing NR U-band transmission of one or more physical channels/signals to which the method proposed in the present disclosure may be applied.

FIG. 27 is merely for convenience of description and does not limit the scope of the present invention.

FIG. 27(a) is a flowchart showing a method of transmitting an uplink by a terminal.

FIG. 27(b) is a flowchart illustrating a method of receiving a downlink by a terminal.

Figure 28:
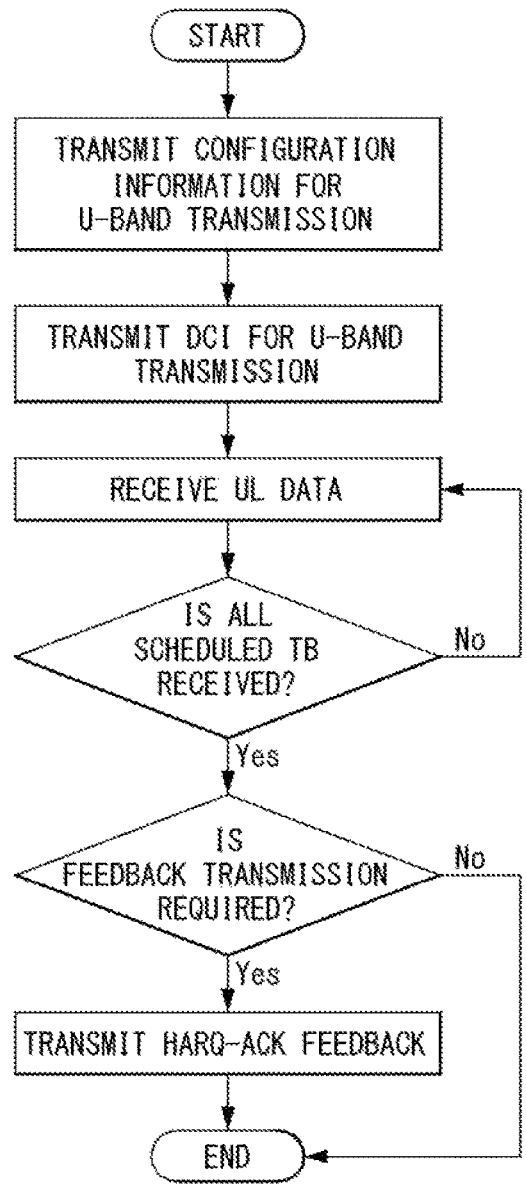
FIG. 28 is a diagram illustrating an example of an operation flowchart of a base station performing NR U-band transmission of one or more physical channels/signals to which the method proposed in the present disclosure may be applied.
Figure 28:
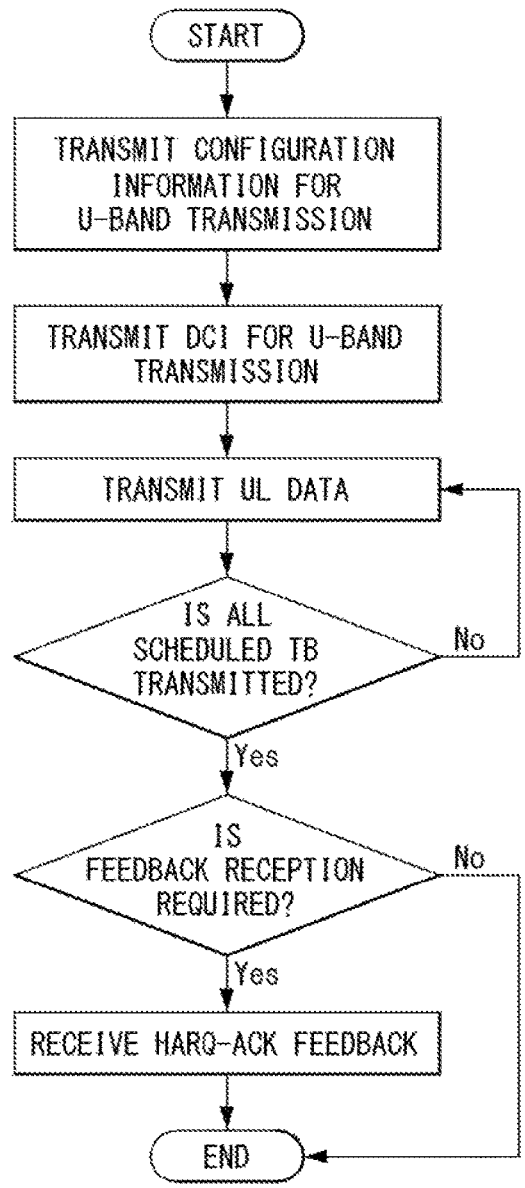

FIG. 28 is a diagram illustrating an example of an operation flowchart of a base station performing NR U-band transmission of one or more physical channels/signals to which the method proposed in the present disclosure may be applied.

FIG. 28 is merely for convenience of description and does not limit the scope of the present invention.

FIG. 28(a) is a flowchart illustrating a method of receiving uplink by a base station.

FIG. 28(b) is a flowchart illustrating a method of transmitting a downlink by a base station.

Figure 29:
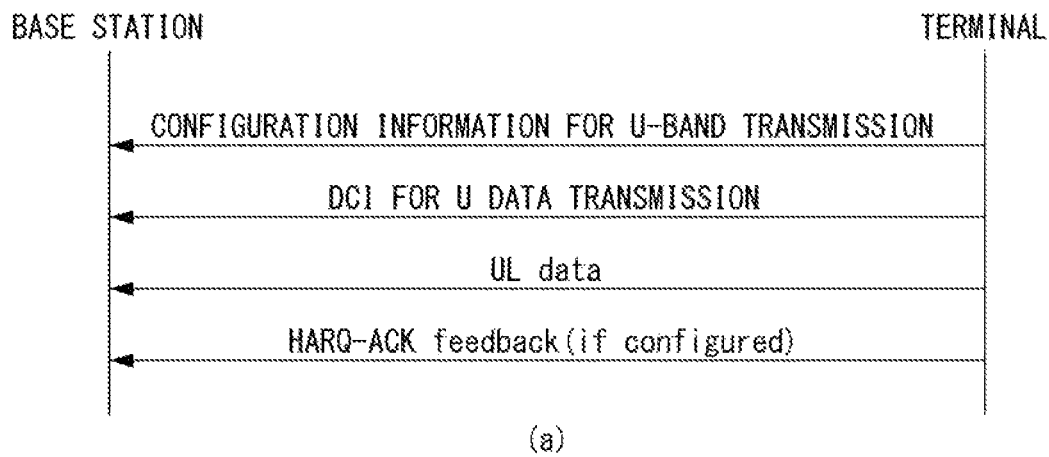
FIG. 29 is a diagram illustrating an example of signaling between a terminal and a base station performing NR U-band transmission/reception of one or more physical channels/signals to which the method proposed in the present disclosure may be applied.
Figure 29:
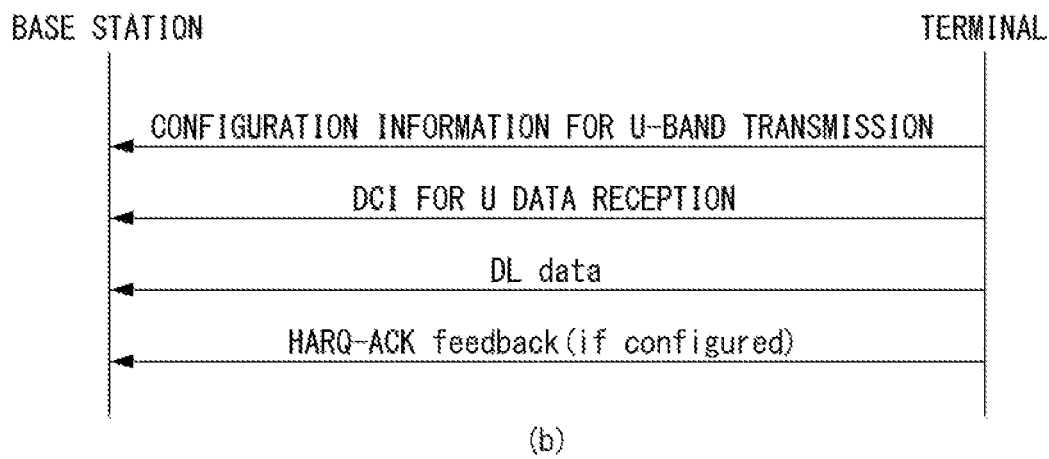

FIG. 29 is a diagram illustrating an example of signaling between a terminal and a base station performing NR U-band transmission/reception of one or more physical channels/signals to which the method proposed in the present disclosure may be applied.

FIG. 29 is merely for convenience of description and does not limit the scope of the present invention.

FIG. 29(a) is a flowchart showing a method of transmitting and receiving uplink data between a base station and a terminal, and FIG. 29(b) is a flowchart showing a method of transmitting and receiving downlink data between a base station and a terminal.

Details to be described later may be applied to a U-Band system in combination with a wireless communication system supporting an unlicensed band and an uplink and downlink channel structure.

For example, a DMRS design to be described later may be defined for transmission and reception of signals in the L-cell and/or the U-cell.

First Embodiment

In a first embodiment, a half-DMRS design method is proposed.

The DMRS sequence for transmission of 12 subcarrier or six subcarrier NPUSCH that is transmitted from the terminal to the base station is composed of a 12-length sequence and a 6-length sequence, respectively.

That is, the number of subcarriers for transmitting data from the terminal to the base station is set to be the same as the length of the DMRS sequence.

Figure 30:
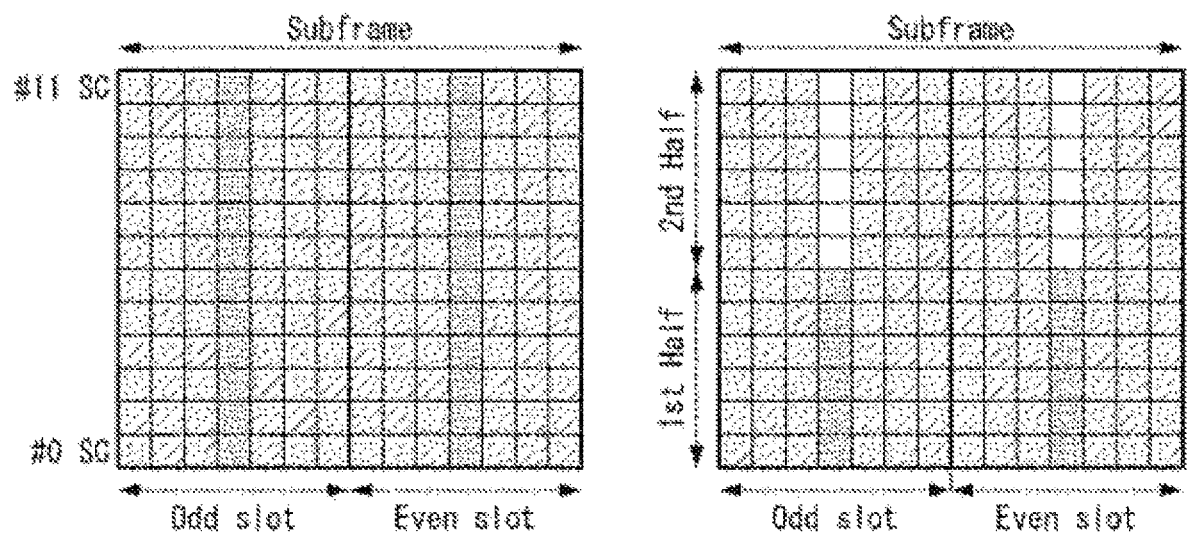
FIG. 30 is a diagram illustrating an example of an existing operation in which an NPUSCH and a DMRS sequence transmitted on 12 subcarriers occupy time/frequency resources, an example of using a DMRS of N/2 length when a terminal transmits uplink data, and a frequency hopping pattern between different half DMRSs.
Figure 30:
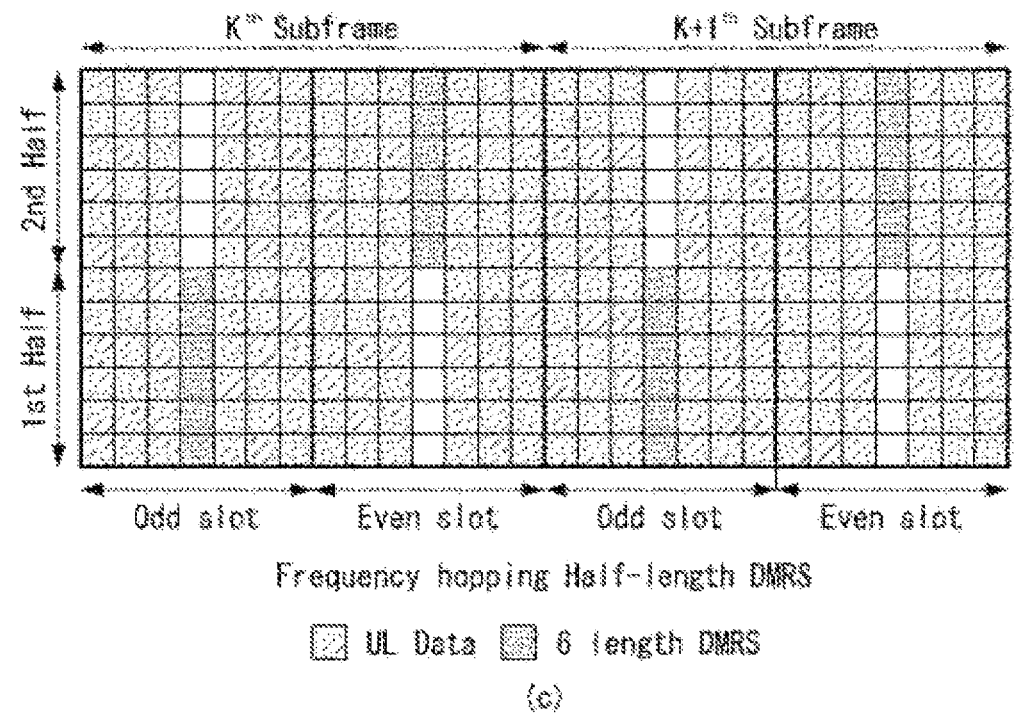

FIG. 30 is a diagram illustrating an example of an existing operation in which an NPUSCH and a DMRS sequence transmitted on 12 subcarriers occupy time/frequency resources, an example of using a DMRS of N/2 length when a terminal transmits uplink data, and a frequency hopping pattern between different half DMRSs.

In the case of FIG. 30(A), as a method to increase the UE multiplexing capability of the PUR operating in the idle mode, the base station may allocate a half DMRS occupying only half of the subcarriers occupied by the legacy DMRS sequence to the terminal. That is, a method of transmitting NPUSCH to a base station by a terminal that intends to transmit uplink data (NPUSCH) to N subcarriers using a DMRS of N/2 length may be considered.

The basic sequence of the DMRS sequence used for the NPUSCH transmission may be defined for six subcarriers and 3 subcarriers as shown in Tables 33 and 34, respectively.

TABLE 33

| u | $\phi(0), \ldots, \phi(5)$ | | | | | |
|---|---|---|---|---|---|---|
| 0 | 1 | 1 | 1 | 1 | 3 | -3 |
| 1 | 1 | 1 | 3 | 1 | -3 | 3 |
| 2 | 1 | -1 | -1 | -1 | 1 | -3 |
| 3 | 1 | -1 | 3 | -3 | -1 | -1 |
| 4 | 1 | 3 | 1 | -1 | -1 | 3 |
| 5 | 1 | -3 | -3 | 1 | 3 | 1 |
| 6 | -1 | -1 | 1 | -3 | -3 | -1 |
| 7 | -1 | -1 | -1 | 3 | -3 | -1 |
| 8 | 3 | -1 | 1 | -3 | -3 | 3 |
| 9 | 3 | -1 | 3 | -3 | -1 | 1 |
| 10 | 3 | -3 | 3 | -1 | 3 | 3 |
| 11 | -3 | 1 | 3 | 1 | -3 | -1 |
| 12 | -3 | 1 | -3 | 3 | -3 | -1 |
| 13 | -3 | 3 | -3 | 1 | 1 | -3 |

TABLE 34

| u | $\phi(0), \phi(1), \phi(2)$ | | |
|---|---|---|---|
| 0 | 1 | -3 | -3 |
| 1 | 1 | -3 | -1 |
| 2 | 1 | -3 | 3 |
| 3 | 1 | -1 | -1 |
| 4 | 1 | -1 | 1 |
| 5 | 1 | -1 | 3 |
| 6 | 1 | 1 | -3 |
| 7 | 1 | 1 | -1 |
| 8 | 1 | 1 | 3 |
| 9 | 1 | 3 | -1 |
| 10 | 1 | 3 | 1 |
| 11 | 1 | 3 | 3 |

That is, when the NPUSCH is transmitted to N subcarriers (for example, when N=12 or 6), the terminal may use a DMRS of N/2 length.

FIG. 30(B) illustrates an example of using a DMRS of N/2 length when the terminal transmits uplink data.

As illustrated in FIG. 30(B), the base station may instruct/configure the terminal to use the DMRS sequence based on the 6-length-based sequence of Table 34.

In this way, when the base station instructs/configures the terminal to use the DMRS of N/2 length, since the NB-IoT terminal is located in a place where the channel change is not large, the performance degradation is small when the channel estimation is performed using half DMRS. In addition, when the terminal uses the half DMRS as described above, the terminal has the advantage that the power of the RE that does not transmit the DMRS may be concentrated on the RE that transmits the DMRS. In addition, when the base station allocates resources to the terminal, it is possible to reuse an existing sequence without introducing a new sequence. In addition, compared to comb type DMRS, there is a benefit in terms of PAPR.

Here, the frequency hopping between the 1st half and the 2nd half of FIG. 30(B) may be performed.

Here, the base station may set the frequency hopping pattern to be cell-specific, CE level specific, or UE-specific.

In the case of FIG. 30C, the base station/terminal may use the frequency hopping pattern between different half DMRSs.

Figure 31:
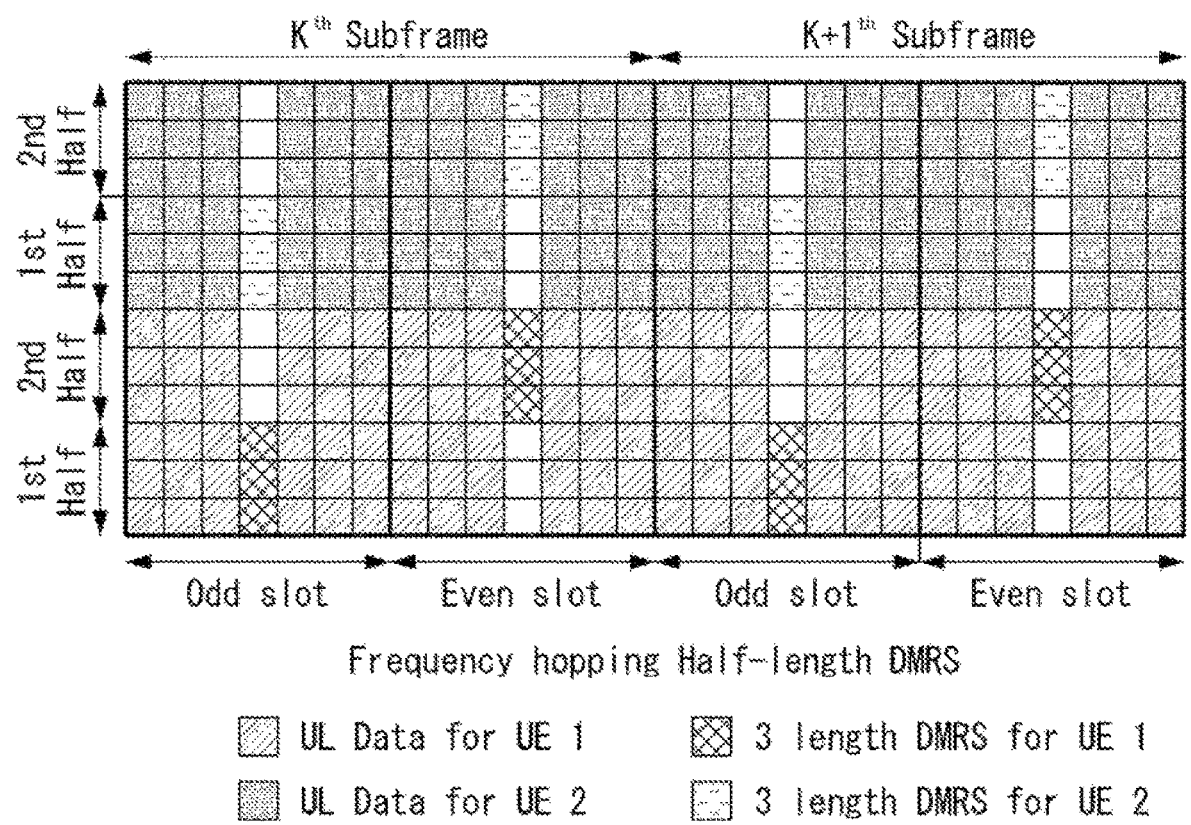
FIG. 31 is a diagram illustrating a scheduling example in which a base station performs frequency division multiplexing (FDM) on frequency resources for two UEs for scheduling when N=6.

FIG. 31 is a diagram illustrating a scheduling example in which a base station performs frequency division multiplexing (FDM) on frequency resources for two UEs for scheduling when N=6.

The base station may multiplex a plurality of terminals on the same uplink resource using a dedicated DMRS.

Figure 32:
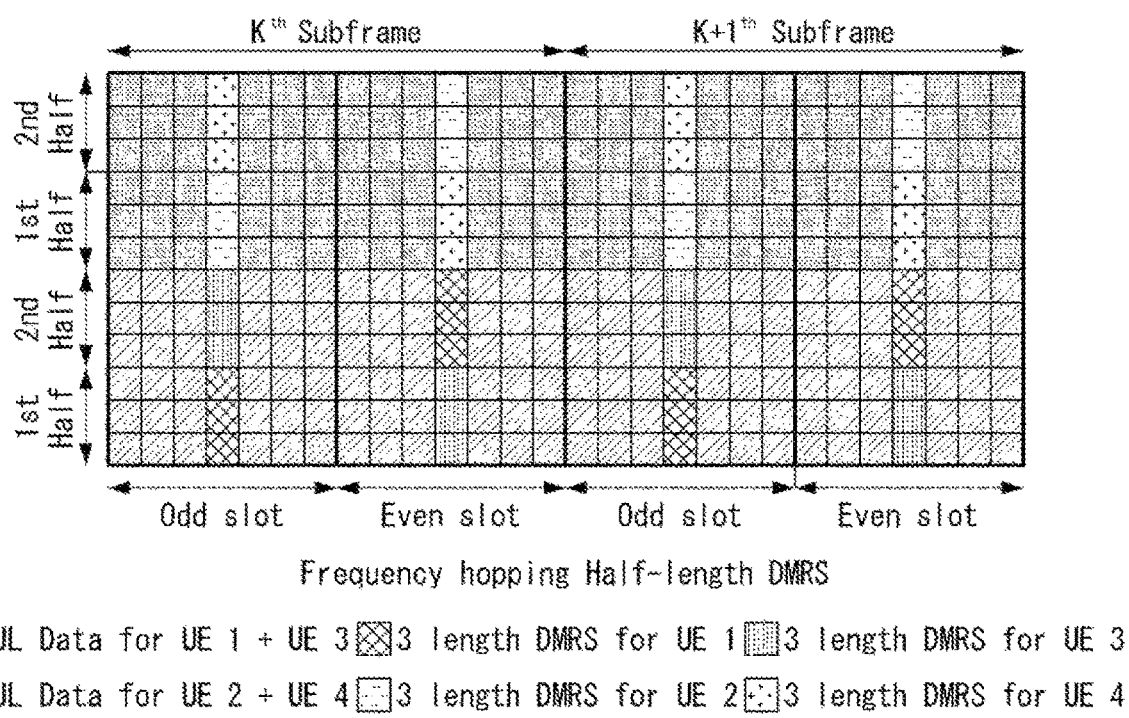
FIG. 32 is a diagram illustrating an example in which two UEs are multiplexed in FIG. 31.

FIG. 32 is a diagram illustrating an example in which two UEs are multiplexed in FIG. 31.

As illustrated in FIG. 32, the DMRS may be characteristically FDM.

Here, an example of a method of the base station to configure the frequency hopping pattern is as follows.

[Method 1 of First Embodiment]

The frequency hopping pattern is defined so that the base station is changed for every timing unit (e.g. slot, subframe, radio frame, repetition number, resource unit, etc.), and the base station may configure the terminal to indicate that the base station indicates a start frequency offset.

In detail, when the starting position of the subcarrier at which the terminal transmits the NPUSCH designated by the base station is SCNS, and the terminal is configured by the base station so that the terminal transmits the NPUSCH over N subcarriers, the frequency resource location of the half DMRS may be set from (SCNS) subcarrier to (SCNS+N/2−1) subcarrier. Here, the base station may additionally designate the start frequency offset of the half DMRS to the terminal.

Characteristically, the above information may be indicated to the terminal from the base station through SIB or dedicated RRC signaling in 1 bit. That is, when the start frequency offset indicator is 0, half DMRS is transmitted from the (SCNS) subcarrier to the (SCNS+N/2−1) subcarrier, and when the start frequency offset indicator is 1, the base station may configure the terminal to transmit half DMRS from the subcarrier to the (N/2+SCNS+N/2−1) subcarrier. The terminal may be configured to transmit the first slot and then switch locations from the next slot.

[Method 2 of First Embodiment]

Regardless of the location where the terminal actually transmits the NPUSCH, the base station may instruct the terminal to transmit the half DMRS from the (SCNS) subcarrier to the (SCNS+N/2−1) subcarrier, or from the (N/2+SCNS) subcarrier to the (N/2+SCNS+N/2−1) subcarrier at a specific timing. In this case, the specific timing may be an even-numbered or odd-numbered slot, a subframe, a radio frame, a repetition number, a resource unit, or the like.

For example, when the base station instructs the terminal to transmit the half DMRS from the (SCNS) subcarrier to the subcarrier (SCNS+N/2−1) in the odd-numbered slot through SIB or dedicated RRC signaling in 1 bit, in the even-numbered subframe, the terminal is configured to transmit the half DMRS from the (N/2+SCNS) subcarrier to the (N/2+SCNS+N/2−1) subcarrier. In this case, it may have the same shape as in FIG. 30(C) described above.

[Method 3 of First Embodiment]

Method 3 is a method in which the plurality of combinations of the frequency hopping pattern are preconfigured as a table according to the repetition number and the number of resource units, and the base station instructs a specific index to the terminal through SIB or dedicated RRC signaling.

In addition, when applying the 2 tone DMRS structure used in eMTC to the above proposed scheme (e.g., Method 1 and/or Method 2), the base station may instruct the terminal to transmit the NPUSCH to the four subcarriers. That is, N=4 and the half DMRS has a structure that becomes the 2 tone DMRS. Here, the proposed methods (e.g., Method 1 and/or Method 2) may be applied to this method (Method 3) as well.

In addition, the base station may apply the CDM to the DMRS-based sequence. In this case, the UE instructed by the base station to transmit the NPUSCH to the N subcarriers may select and transmit the N-length DMRS sequence, where the base station may configure the terminal so that the cover code is composed of 0 and 1.

Figure 33:
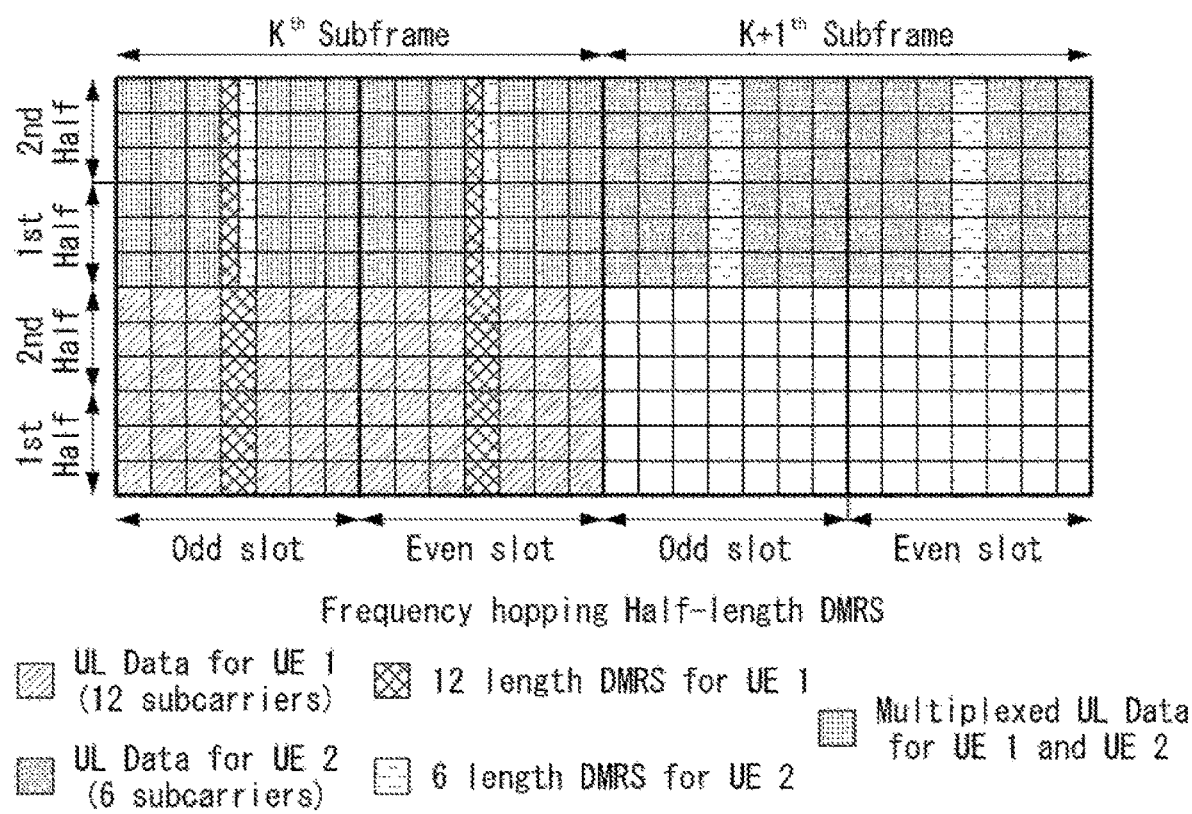
FIG. 33 is a diagram illustrating a case in which a plurality of UEs using different number of subcarriers share time/frequency resources.

For example, if N=12, when the DMRS cover code is set as {1, 1, 1, 1, 1, 1, 0, 0, 0, 0, 0, 0} in the order of low subcarrier to high subcarrier, the base station may set the terminal to be transmitted in a shape as illustrated in the drawings (e.g., FIG. 30, FIG. 31, FIG. 32, and/or FIG. 33). Even in this case, the base station may configure the terminal so that the power of the RE having a cover code of 0 may be concentrated on the RE having a cover code of 1.

If the previously proposed method was actually a method of using a DMRS sequence of length N/2, the method is set in the form of multiplying half of them by 0 by using a DMRS sequence of length N.

It has the same advantages as the previously proposed method, and since only the cover code needs to be additionally indicated by the base station, a more specific task can be simplified.

Second Embodiment

The second embodiment is a method in which the base station allocates resources to the terminal based on orthogonality between DMRSs.

Details to be described later may be applied to a U-Band system in combination with a wireless communication system supporting an unlicensed band and an uplink and downlink channel structure.

For example, the DMRS orthogonality to be described later may be defined for transmission and reception of signals in the L-cell and/or the U-cell.

As an example of a method of a plurality of terminals to share a time/frequency resource among preconfigured UL resources, there are a contention-free shared PUR and a contention-based shared PUR. Both of these methods may be viewed as similar in terms of transmitting UL resources by sharing a specific resource with a plurality of UEs.

However, assuming that the DMRS sequence is selected based on the prior art, when UE 1 and UE 2 are configured to transmit PUR using 12 subcarriers and six subcarriers, respectively, as illustrated in FIG. 33, the orthogonality of the DMRS sequences used by two UEs may not be maintained.

Accordingly, the following methods according to the second embodiment are proposed in order to solve the above problem. The proposed methods below have been described mainly for NB-IoT, but can be applied to other systems as well as the eMTC.

[Method 1 of Second Embodiment]

Method 1 of the second embodiment is a method in which the base station instructs the terminal to transmit the number of subcarriers that may be transmitted for each preconfigured uplink resource. In particular, the base station may configure the terminal to inform the terminal when the corresponding configuration is initially set up a preconfigured uplink resource, and the base station may instruct to the terminal by cell-specific and CE-level-specific, not resource-specific.

For example, in the case of the non-contention-free PUR (i.e. CFS PUR), the base station may initially configure a plurality of preconfigured uplink resources and inform the terminals through system information (e.g. SIB-NB). The PURs may be configured with a total of PURMAX from PUR index 0 to PUR index PURMAX−1.

In this case, the base station may inform the terminals of the number of subcarriers that may be transmitted for each preconfigured uplink resource through the above-described system information. Here, the UL carrier index to which each PUR is to be transmitted may be independently configured in the terminal by the base station.

Subsequently, the base station may indicate a PUR index among PURMAX PURs to the terminal that intends to perform PUR through UE-specific RRC signaling, and informs the DMRS sequence information (e.g. basic sequence index), RNTI information, repetition number, and the like. For example, in the case of the contention-free PUR (i.e. CFS PUR), the base station may initially configure a plurality of preconfigured uplink resources and inform the terminals through system information (e.g. SIB-NB).

In this case, the base station may inform the terminals of the number of subcarriers that can be transmitted for each preconfigured uplink resource, a DMRS sequence set, an RNTI set, and the like through the above-described system information.

Subsequently, the terminal may select a PUR to be transmitted by the terminal according to a predetermined rule or at random, transmit uplink data using the number of subcarriers that may be transmitted in the PUR, and selects one of the DMRS sequence according to a predetermined rule or at random and transmit UL data.

FIG. 33 is a diagram illustrating a case in which a plurality of UEs using different number of subcarriers share time/frequency resources.

However, when operating as described above, a situation in which a plurality of UEs share time/frequency resources as illustrated in FIG. 33 does not occur, and the orthogonality of the DMRS may be maintained while the terminal uses the legacy DMRS.

[Method 2 of Second Embodiment]

Unlike Method 1 in which the base station instructs to use the same number of subcarriers when a plurality of UEs share all or part of the UL time/frequency resources in order to maintain DMRS orthogonality, Method 2 is a method of allowing different number of subcarriers to be used even when a plurality of UEs shares all or part of UL time/frequency resources.

Figure 34:
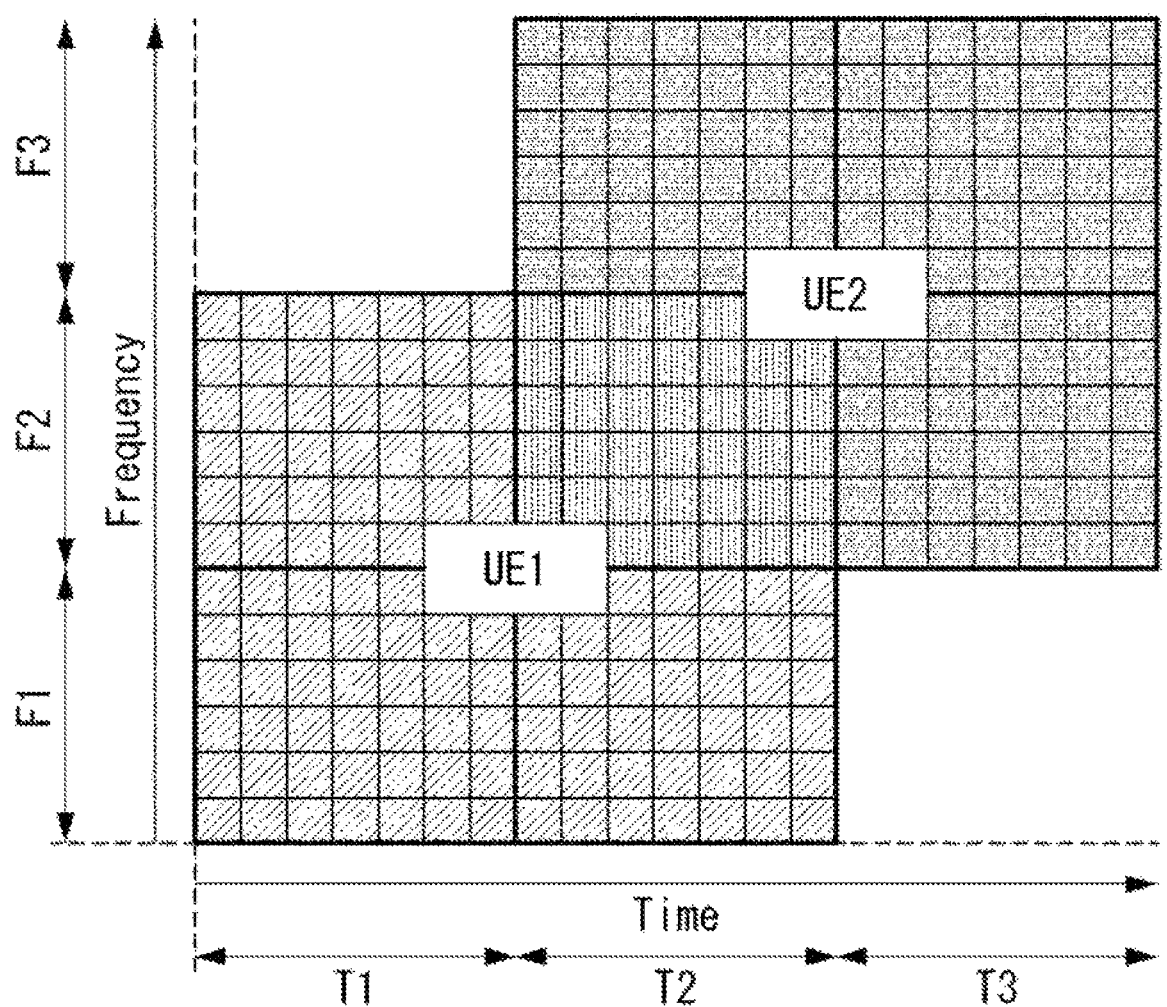
FIG. 34 is a diagram illustrating an example of a case in which two UEs share all or part of UL time/frequency resources.

FIG. 34 is a diagram illustrating an example of a case in which two UEs share all or part of UL time/frequency resources.

As illustrated in FIG. 34, terminal 1 uses time resources as much as T1+T2 and frequency resources as much as F1+F2, and UE 2 may use time resources as much as T2+T3 and frequency resources as much as F2+F3.

Accordingly, two UEs may share UL resources by T2 on the time axis and T2 on the frequency axis.

Here, in order to maintain the orthogonality of the DMRS sequence, the base station may set the length of the DMRS sequence to be used by each terminal to be changed according to the time axis (e.g. for each slot or for each subframe). That is, since the base station may know how the terminals to be scheduled are shared, it may be set to indicate the length of the DMRS sequence to be used for a time unit shared by a plurality of terminals (e.g. [T2] in FIG. 24).

There may be several ways for the base station to indicate the length of the DMRS sequence to the terminal, but for example, when the base station sets the DMRS sequence length for each subframe frame for 10 ms to the terminal as {12, 12, 6, 6, 6, 3, 3, 12, 12} (at this time, the corresponding number indicates the length of the DMRS sequence), the terminal may be set to refer to one of the different tables (e.g. 12 length table, 6 length table, and 3 length table) defined in the prior art according to the indicated DMRS sequence length, and to select the final DMRS sequence using the base sequence index indicated by the base station.

At this time, if the number of subcarriers for UL data transmission of a specific terminal is N and the length of the DMRS sequence indicated by the base station is M, the terminal may be configured to transmit the DMRS sequence of length M in the corresponding time unit (subframe or slot) onto the frequency domain repeatedly N/M times.

Characteristically, the base station may repeatedly transmit a DMRS sequence of length M used for the corresponding repetition transmission while the same DMRS sequence changes the cyclic shift value, and the terminal may be set to transmit in order from the k-th base sequence to the k+N/M−1-th base sequence when the indicated base sequence index is k.

In addition, the base station may set the terminal to determine the DMRS sequence length based on the UE occupying the smallest number of subcarriers in the corresponding time unit. That is, when UE 1 occupying 3 subcarriers, UE 2 occupying six subcarriers, and UE 3 occupying 12 subcarriers are multiplexed in a specific subframe (s), the base station may be configured to indicate to UE 1 as well as UE 2 and UE 3 to select a 3-length DMRS sequence.

Figure 35:
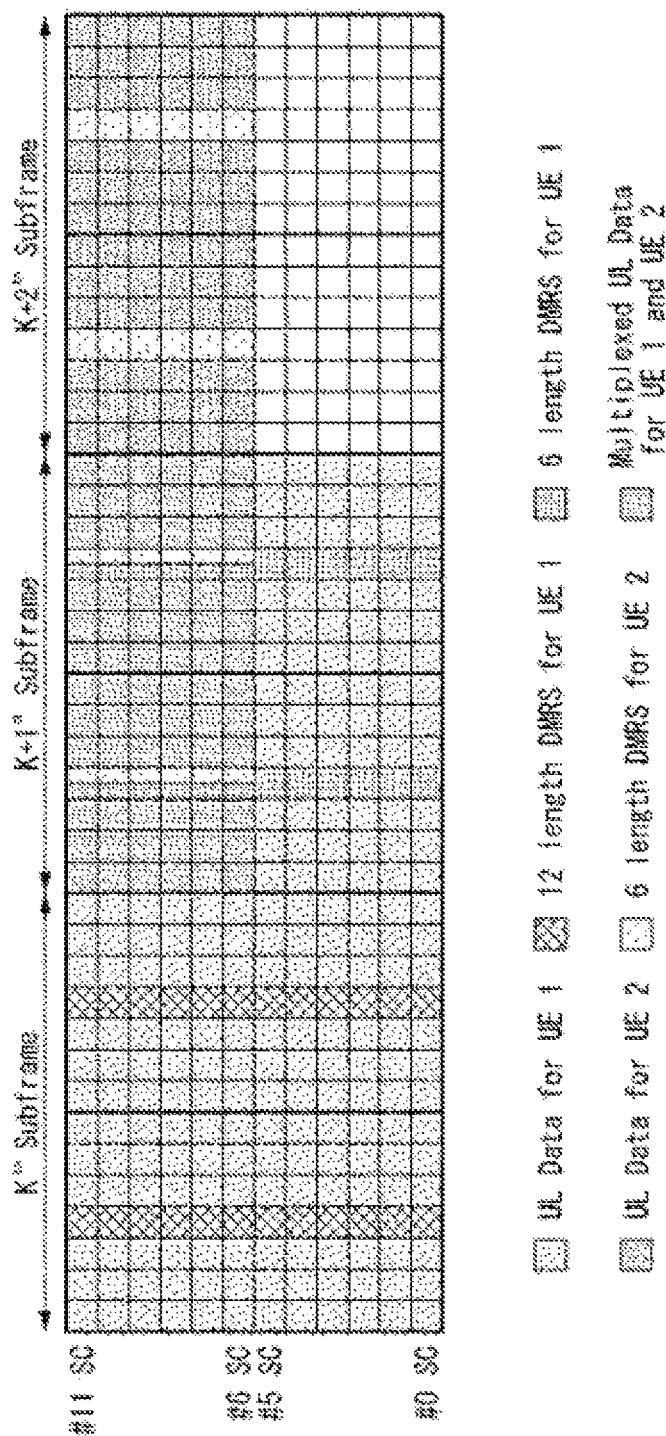
FIG. 35 is a diagram illustrating a form in which UE 1 repeatedly transmits a 6-length DMRS twice while changing a cyclic shift value.
Figure 36:
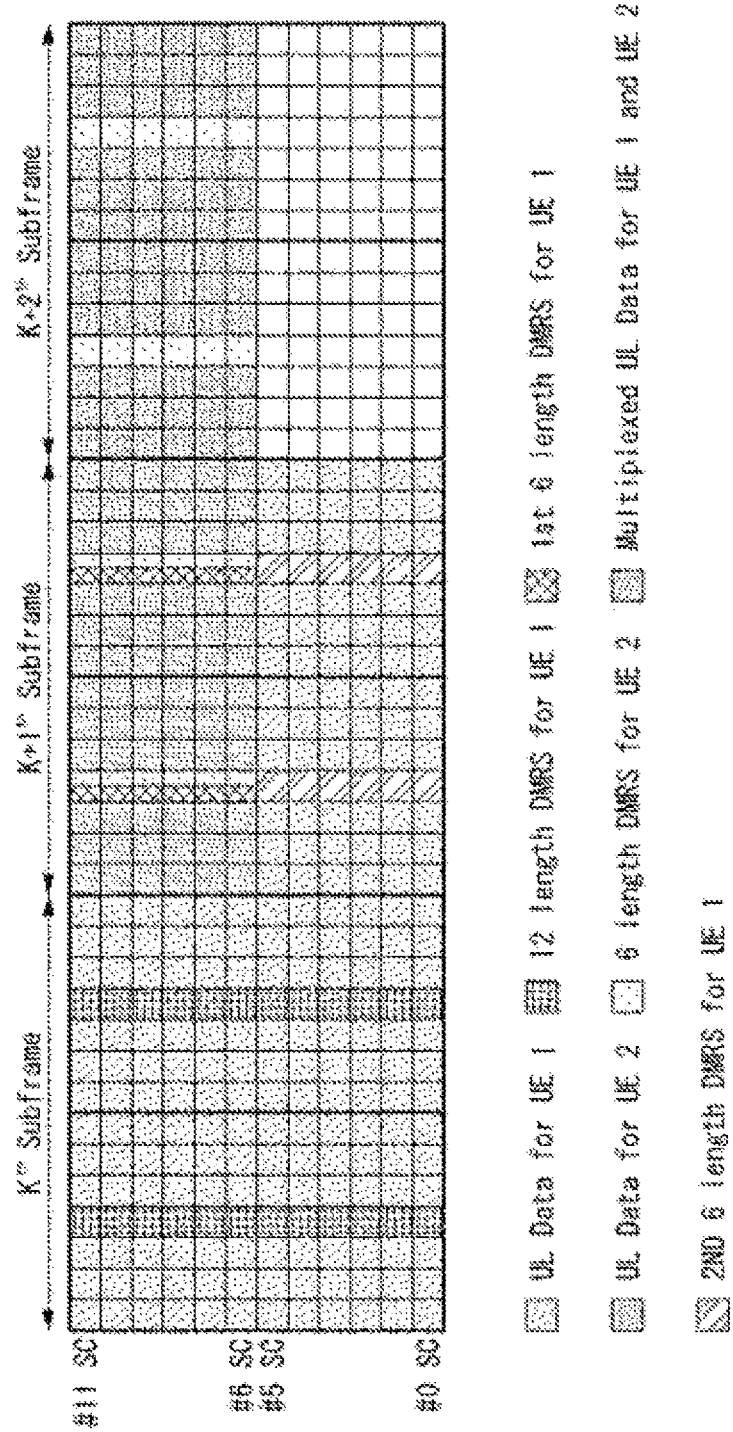
FIG. 36 is a diagram illustrating a form in which UE 1 continuously transmits two 6-length DMRSs according to a specific rule.

When a specific example is shown through a picture, it may be as shown in FIGS. 35 and 36. That is, UE 1 may transmit UL data to the base station using 12 subcarriers during the K subframe and the K+1 subframe. In addition, when UE 2 transmits UL data using six subcarriers in a K+1 subframe and a K+2 subframe, the base station may indicate the DMRS sequence length information to UE 1 as {12, 6}.

FIG. 35 is a diagram illustrating a form in which UE 1 repeatedly transmits a 6-length DMRS twice while changing a cyclic shift value.

FIG. 36 is a diagram illustrating a form in which UE 1 continuously transmits two 6-length DMRSs according to a specific rule.

In the above, the base sequence (e.g. root index) for generating each DMRS sequence transmitted contiguously may be set to a different value, and/or a cyclic shift may be set to a different value. Through this, the effect of lowering the PAPR may be obtained

[Method 3 of Second Embodiment]

Method 3 is a method of designing or combining a DMRS sequence having a new principle described below.

When the base station instructs the terminal an L-length DMRS sequence as a sequence that the terminal may always maintain DMRS orthogonality while being used for CFS PUR or CBS PUR, the terminal may generate a k*L long DMRS sequence by concatenating the corresponding DMRS sequence k times. For example, when L may be 3 and k is 2 or 4, the base station may generate a DMRS sequence of length 6 and length 12.

When the DMRS is designed in this way, even if the terminal selects and transmits one of the k*L length DMRS sequence for a specific PUR, it is possible to always maintain orthogonality with the k'*L length DMRS sequence of the other terminal that is shared with the k*L length DMRS sequence.

The case of using the legacy 3-length DMRS sequence as the simplest method is as follows. For example, it may be set in the terminal that the base station generates a 6 DMRS sequence of length as shown in Table 36 by a combination of a legacy 3 length DMRS sequence as shown in Table 35. This example is an example created by concatenating the base sequence index +1 after the base sequence index is even, and the base sequence index −1 when the base sequence index is odd.

It may also be set to the terminal that the base station instructs how to combine in this way. That is, it can be defined to determine the next base sequence index according to a specific rule from the base sequence index initially indicated by the base station. For example, if the base station instructs the terminal to set the interval between base sequence indexes as 6 and sets the terminal to wrap around when the total number is exceeded, the base sequence index may be 0 and the base sequence index may be 6, and the base sequence 10 and the base sequence index 4 (i.e. 10+6 mod 12) may be concatenated with each other. In addition, it is also possible to consider a method in which the terminal transmits the same DMRS sequence by concatenating the DMRS twice.

This configuration has the advantage of maintaining orthogonality with the length 3 DMRS sequence even if the terminal uses any of the length 6 DMRS sequences defined in Table 35, but has a disadvantage in that the PAPR performance deteriorates. In the above, the base sequence (e.g. root index) for generating each DMRS sequence transmitted contiguously may be set to a different value, and/or a cyclic shift may be set to a different value. Through this, the effect of lowering the PAPR may be obtained

TABLE 35

| u | $\phi(0), \phi(1), \phi(2)$ | | |
|---|---|---|---|
| 0 | 1 | −3 | −3 |
| 1 | 1 | −3 | −1 |
| 2 | 1 | −3 | 3 |
| 3 | 1 | −1 | −1 |
| 4 | 1 | −1 | 1 |
| 5 | 1 | −1 | 3 |
| 6 | 1 | 1 | −3 |
| 7 | 1 | 1 | −1 |
| 8 | 1 | 1 | 3 |
| 9 | 1 | 3 | −1 |
| 10 | 1 | 3 | 1 |
| 11 | 1 | 3 | 3 |

TABLE 36

| u | $\phi(0), \phi(1), \phi(2)$ | | | $\phi(3), \phi(4), \phi(5)$ | | |
|---|---|---|---|---|---|---|
| 0 | 1 | −3 | −3 | 1 | −3 | −1 |
| 1 | 1 | −3 | −1 | 1 | −3 | −3 |
| 2 | 1 | −3 | 3 | 1 | −1 | −1 |
| 3 | 1 | −1 | −1 | 1 | −3 | 3 |
| 4 | 1 | −1 | 1 | 1 | −1 | 3 |
| 5 | 1 | −1 | 3 | 1 | −1 | 1 |
| 6 | 1 | 1 | −3 | 1 | 1 | −1 |
| 7 | 1 | 1 | −1 | 1 | 1 | −3 |
| 8 | 1 | 1 | 3 | 1 | 3 | −1 |
| 9 | 1 | 3 | −1 | 1 | 1 | 3 |
| 10 | 1 | 3 | 1 | 1 | 3 | 3 |
| 11 | 1 | 3 | 3 | 1 | 3 | 1 |

Additionally describing Method 3, the base station may set the base sequence length of the DMRS sequence in the terminal differently from the number of frequency REs for data in the corresponding UL resource. That is, the base station may configure the terminal to select a base sequence length based on the minimum number of frequency REs overlapping with a plurality of terminals sharing time/frequency UL resources.

Subsequently, a method in which the terminal expands and uses the actual DMRS sequence as described above may be considered. Even in this case, the base sequence index of the extended DMRS sequence may be different, and the cyclic shift value may be set differently.

[Method 4 of Second Embodiment]

In Method 4, a method of using the short DMRS (e.g. Half DMRS) proposed in the first embodiment for DMRS orthogonality may be considered.

That is, the base station may be configured to be able to instruct to the terminal a time unit (e.g. slot, subframe, etc.) in which the short DRMS should be used, and the length of the corresponding short DMRS when the short DMRS should be used for each time unit, and the terminal instructed by the corresponding information may be configured to transmit by applying a DMRS sequence using one of the base sequence indexes corresponding to the indicated length to the corresponding subframe.

In this case, if the short DMRS is used, since the power to be used for the remaining REs may be used, if the short DRMS length is K and the number of frequency REs at which UL data may be transmitted is L, the base station may configure the terminal to transmit the power per RE of short DMRS by increasing the existing L/K times. For example, when the short DRMS length is 6 and the number of frequency REs that may transmit UL data is 12, the terminal may transmit the power per each RE of the short DMRS to the base station by increasing the existing 12/6=2 times.

In addition, when a specific time/frequency resource is shared by a plurality of terminals, the base station may indicate the short DMRS length to each terminal based on the terminal transmitting UL data to the smallest frequency RE(s) among the terminals. For example, when in the same subframe, UE 1 is configured to transmit UL data from #0 SC to #2 SC, and UE 2 is configured to transmit UL data from #0 SC to #6 SC, UE3 is configured to transmit UL data from #0 SC to #11 SC, the base station may be configured to instruct UE 2 and UE3 to use a 3-length DMRS sequence, UE 2 to boost 3 dB, and UE3 to boost 6 dB.

Figure 37:
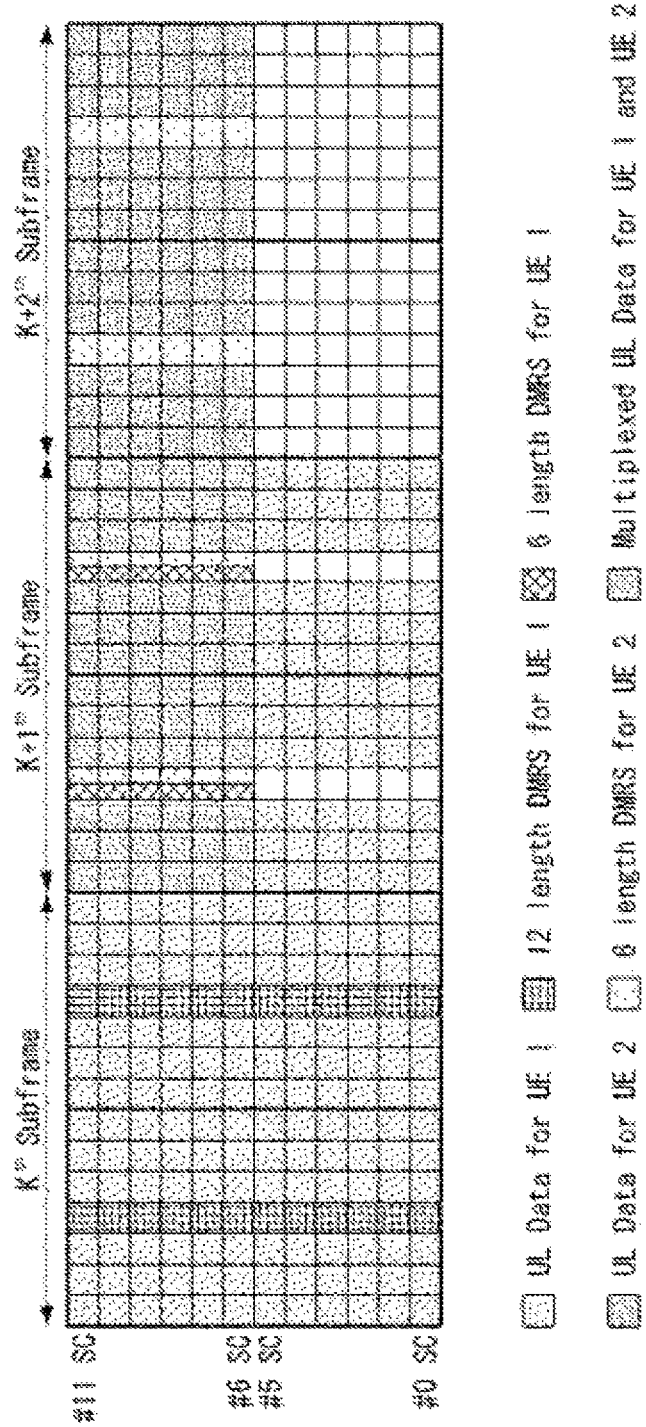
FIG. 37 is a diagram illustrating an example in which a base station sets different DMRS lengths to UE 1 and UE 2 in different frames.

FIG. 37 is a diagram illustrating an example in which a base station sets different DMRS lengths to terminal 1 and terminal 2 in different frames.

As illustrated in FIG. 37, when UE 1 transmits UL data using 12 subcarriers during K subframes and K+1 subframes, and UE 2 transmits UL data using 6 subframes in K+1 subframes and K+2 subframes, and the base station may indicate to UE 1 that subframe information that should use the short DMRS such as {0, 1} and the length of the short DMRS is 6.

The proposed method has the advantage of maintaining DMRS orthogonality by using only legacy DMRS sequences without repeated transmission.

Hereinafter, for the interlace structure related to the RE group for UL transmission, an NR-U (unlicensed band) (or U-Band) system is described as an example, but the details to be described later are the same for the above-described NB-IoT and MTC systems. In the NR-U (Unlicensed band) system, considering the regulation related to OCB (Occupied Channel Bandwidth) and PSD (Power Spectral Density), in the state that a unit RE group consisting of K consecutive REs is defined in frequency, it is possible to define a minimum resource for one UL channel transmission as a set of N unit RE groups that are discontinuous (with equal intervals). The set of N unit RE groups may be defined as a unit interlace, and based on this, one UL channel transmission resource may be configured/set with a single or a plurality of unit interlaces.

On the other hand, to configure/generate a DMRS sequence for a UL channel (e.g., PUCCH or PUSCH) based on this RE group interlace type in NR-U, a principle similar to the proposed method may be applied, which is described in detail as follows. In the following, PUCCH is described mainly for convenience, but is not limited thereto, and can be applied to a sequence (e.g., carrying DMRS or UCI) configuration/generation used for other UL channel/signal (e.g., PUCCH or PUSCH or SRS).

[Method 5 of Second Embodiment]

Even when PUCCH(s) configured with different unit interlace numbers (of different UEs) in NR-U overlap each other, orthogonality of DMRS sequences transmitted by terminals may be guaranteed.

Therefore, similar to the principle of [Method 3], in Method 5 of the second embodiment, the base station/terminal defines/sets the DMRS sequence length to unit RE group size K (e.g. subcarriers or 12 subcarriers, which is the (minimum) number of consecutive REs), and when the number of (minimum) unit RE groups that ma enter one unit interlace-based PUCCH is N, when configuring a DMRS sequence on the PUCCH based on the unit interlace, the terminal may discontinuously concatenate a DMRS sequence of the same length-K as the unit RE group size K N times (with equal intervals).

In addition, when M unit interlaces are configured as one PUCCH resource, the terminal may consider a form in which a DMRS sequence of length-K is concatenated N×M times. That is, in method 5, it may be configured to generate/map/transmit a DMRS sequence of an individual length-K for each unit RE group belonging to each of one or a plurality of unit interlaces configuring one PUCCH resource.

Figure 38:
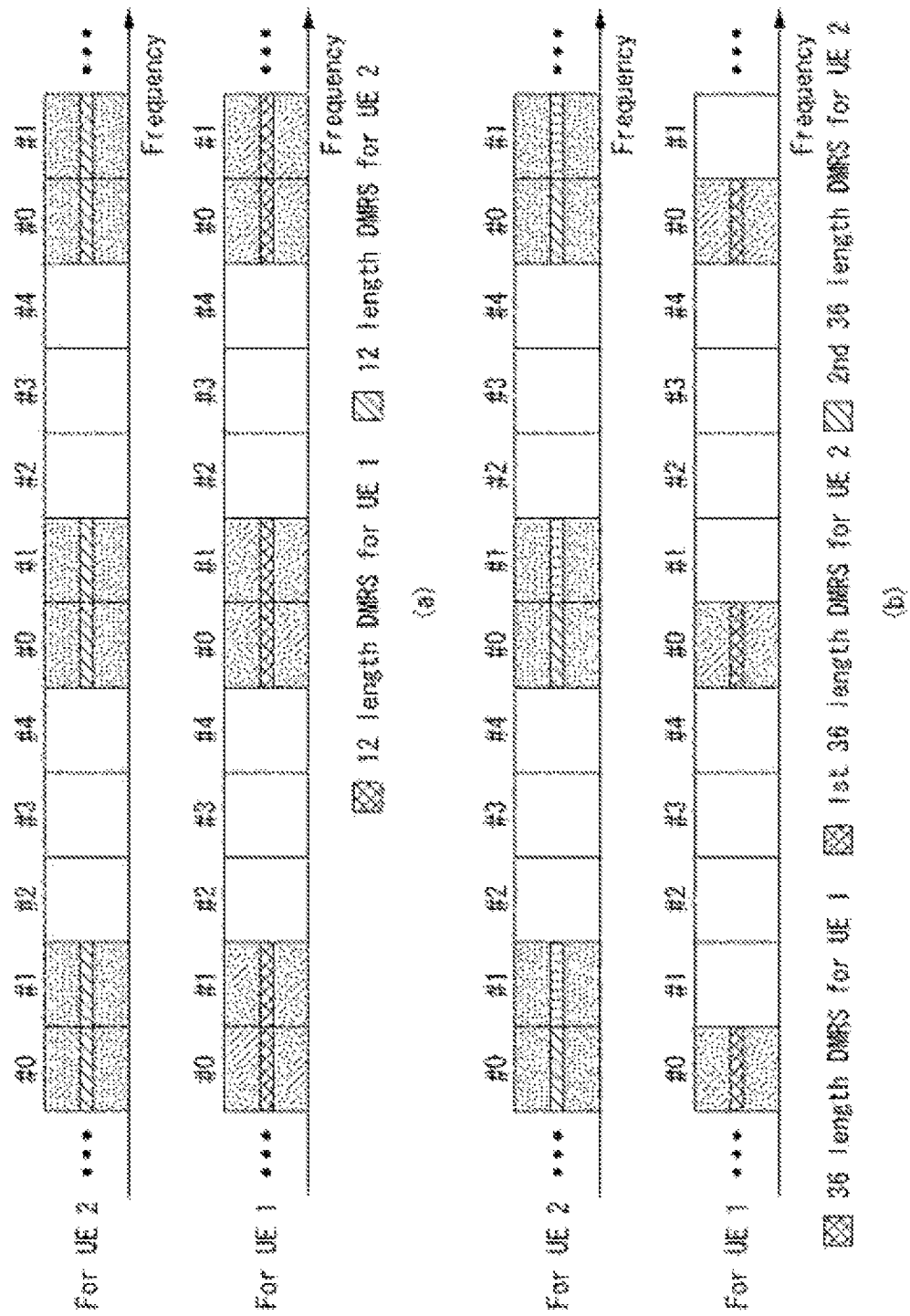
FIG. 38(A) is a diagram illustrating an example of a DMRS sequence length for a PUCCH according to method 5 of a second embodiment.
FIG. 38(B) is a diagram illustrating an example of a DMRS sequence length for a PUCCH according to method 6 of a second embodiment.

FIG. 38 is a diagram illustrating an example of a DMRS sequence length for a PUCCH according to method 5 of a second embodiment.

For example, as illustrated in FIG. 38, when considering the unit RE group size K as 12 subcarriers and the number of unit RE groups configuring one unit interlace as three, UE 1 is one unit interlace (index #0) is allocated as a single PUCCH resource, in a state in which UE 1 is allocated one unit interlace (index #0) as a single PUCCH resource, the base station may set to transmit by concatenating individually generated 12-length DMRS sequences 3 times (discontinuously).

On the other hand, in the case of UE 2, the base station may configure the UE2 by concatenating an individually generated 12-length DMRS sequence 3×2=6 times in a state in which two unit interlaces (index #0 and #1) are allocated as a single PUCCH resource.

In this case, since the lengths of the DMRS sequences of UE 1 and UE 2 are the same in the #0 interlaced PUCCH, orthogonality may be maintained. Characteristically, the DMRS sequences used at this time may be independently selected, and the cyclic shift or the like may be used to maintain the orthogonality between the same sequence indices. Meanwhile, in the DMRS sequences of length-K (configuring one PUCCH), a base sequence (e.g. root index) for generating the DMRS sequences for each unit RE group and/or for each unit interlace may be set to a different value, and/or the cyclic shift for each unit RE group and/or for each unit interlace may be set to a different value (through this, an effect of lowering PAPR may be obtained).

[Method 6 of Second Embodiment]

In Method 6, the base station may define a (K×N) value obtained by multiplying the unit RE group size K and the (minimum) number of RE groups configuring one unit interlace N as the DMRS sequence length and may generate a DMRS sequence based on this, and in the state that the corresponding length-(K×N) DMRS sequence is divided into N (length K) N DMRS sub-sequences, the base station may configure the terminal to sequentially map and transmit different DMRS sub-sequences for each unit RE group.

That is, in the case of Method 6, in a state in which the base station generates a DMRS sequence of an individual length-(K×N) for each unit interlace for one or a plurality of unit interlaces configuring one PUCCH resource, the base station may be configured to sequentially map/transmit N DMRS sub-sequences (length K) obtained by dividing the generated sequence into N segments to a plurality of unit RE groups belonging to a corresponding unit interlace.

FIG. 38 is a diagram illustrating an example of a DMRS sequence length for a PUCCH according to method 6 of a second embodiment.

In the case of FIG. 38, when unit RE group size K is 12 subcarriers and the number of unit RE groups configuring one unit interlace is considered as 3, in the state that UE 1 is allocated one unit interlace (index #0) as a single PUCCH resource, the base station may set the terminal to generate one 12×3=36-length DMRS sequence and map/transmit the sub-sequences divided into three to each of the three unit RE groups.

UE2 generates two 12×3=36-length DMRS sequences in a state where two unit interlaces (index #0 and #1) are allocated as a single PUCCH resource, and the base station may configure the terminal to map/transmit the sub-sequence obtained by dividing the first DMRS sequence into 3 unit RE groups belonging to the first unit interlace to 3 unit RE groups belonging to the second unit interlace, respectively.

In this case, since the lengths of the DMRS sequences of UE 1 and UE 2 are the same in the #0 interlaced PUCCH, orthogonality may be maintained. Additionally, since the length of the DMRS length is increased, there is an advantage that the number of candidates can be increased.

Additionally, if the base station sets the number of unit RE groups configuring one interlaced PUCCH to a specific UE as an integer (e.g. L) times N, the UE defines the (K×N) value as the DMRS sequence length according to the above method, and the base station may individually generate L DMRS sequences based on this, and may configure the UE to map/transmit L DMRS sequences by sequentially applying the method in units of N unit RE groups for all (N×L) unit RE groups.

In this case, the corresponding L DMRS sequences may be set independently of each other, or may be used by setting different cyclic shift values of the same DMRS sequence. In this configuration, even if the number of unit RE groups that may be included in one interlaced PUCCH is different, since the DMRS sequence length is set to be the same, the orthogonality of the DMRS sequence may be maintained.

Meanwhile, in the DMRS sequences of length-(K×N) (configuring one PUCCH) in the above, a base sequence (e.g. root index) for generating the DMRS sequences for each unit interlace may be set to a different value, and/or, the cyclic shift may be set to different values for each unit interlace (through this, an effect of lowering PAPR may be obtained).

K mentioned above may be the number of REs to which the DMRS is mapped in the unit RE group. For example, in a state in which the total number of REs in the unit RE group is 12, when the DMRS is mapped to 6 odd-numbered REs or 6 even-numbered REs (like comb type DMRS), K may be set to 6.

As described above, an interlace structure is considered for UL transmission in NR-U. At this time, the following alternatives (alt X) may be considered in defining the interlace structure.

For example, as Method 7 of the second embodiment, a method of defining an interlace based on a total component carrier (CC) bandwidth (BW) may be considered.

For example, as Method 8 of the second embodiment, a method of defining each interlace based on a listen before talk sub-band (LBT-SB) may be considered.

When the CC bandwidth is 80 MHz and the LBT-SB is 20 MHz, since the phenomenon and problems are different depending on whether the interlace is defined based on 80 MHz or 20 MHz, the present disclosure suggests a way to solve this.

The contents to be described later may also be applied to the NB-IoT system and the MTC system.

For example, the UL interlace structure, which will be described later, may be applied in combination with the contents related to the DMRS design in the NB-IoT system, for example.

[Method 7 of Second Embodiment]

Method 7 of the second embodiment is a method in which a base station/terminal defines an interlace index and an RB set configuring each interlace based on the total CC bandwidth.

For example, in a state where an interlace is defined based on the CC bandwidth of 80 MHz, a BWP (bandwidth part) of 40 MHz, which is smaller than the CC bandwidth, is set to the UE, in the total interlace across 80 MHz, only a part corresponding to 40 MHz becomes available to the UE.

In addition, based on the (plurality of) LBT-SBs of 20 MHz smaller than the BWP, actually, the UL transmission resource of the UE (among interlace across 80 MHz) may be allocated only a part corresponding to (all BWP or) a specific part (or one) of LBT-SB.

Assuming 30 kHz subcarrier spacing, if a total of 217 RBs exist at 80 MHz and the interlace between RBs is set to N (e.g. 5 RBs), X interlaces may be composed of (discontinuous) $\lfloor 217/N \rfloor + 1$ (e.g. 44) RBs and N-X interlaces may be composed of (discontinuous) $\lfloor 217/N \rfloor$ (e.g. 43) RBs.

When the SB smaller than the CC bandwidth is allocated to the UE, only a part corresponding to the bandwidth of the SB may be allocated to the UE, and only a part of the configured interlaces may be used.

In such a situation, how the DMRS sequence length is defined in the UL interlace structure, how the DMRS sequence length is generated, and how to divide into and map to the DMRS sequence length may be summarized as follows.

[Method 7-1 of Second Embodiment]

Method 7-1 of the second embodiment is a method in which the base station sets the DMRS sequence length to the terminal equal to one RB size (i.e. 12 REs).

In this case, for example, assuming that one interlace is composed of (discontinuous) N RBs based on the bandwidth of a single SB, the base station may configure the terminal to map a total of N length-12 sequences at equal intervals to form the DMRS. That is, assuming the same subcarrier spacing (e.g. 30 kHz) and interlace allocation (e.g. interlace RB interval is 5 PRB), when a bandwidth of a single SB is 20 MHz, since one interlace is composed of (discontinuous) 10 or 11 RBs, the base station may configure the terminal so that a total of 10 or 11 length-12 sequences configure the DMRS according to the interlace index.

Figure 39:
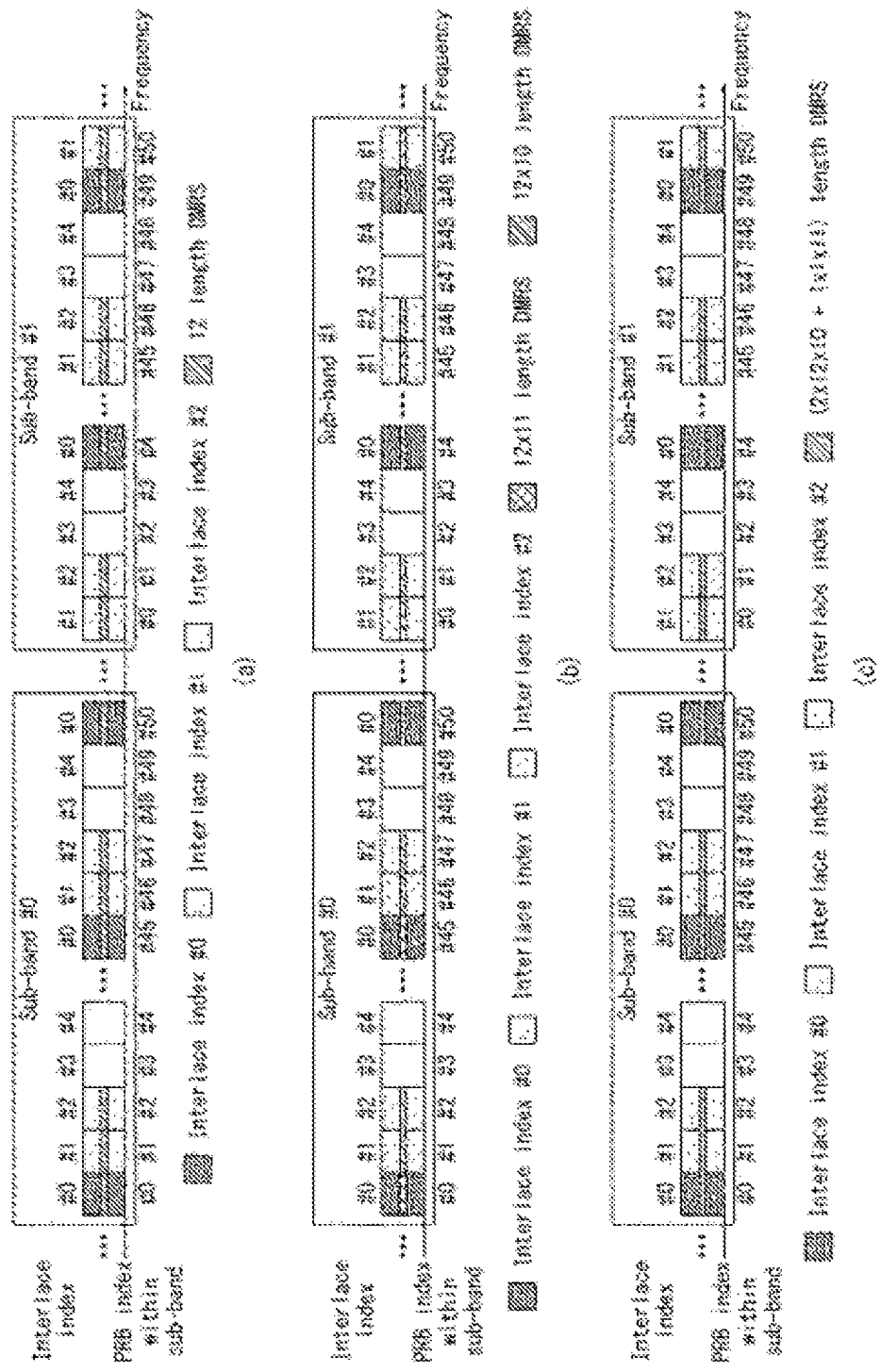
FIG. 39(A) is a diagram illustrating a method of allocating resources according to method 7-1 of the second embodiment.
FIG. 39(B) is a diagram illustrating a method of allocating resources according to method 7-2 of the second embodiment.
FIG. 39(C) is a diagram illustrating a method of allocating resources according to method 7-3 of the second embodiment.

FIG. 39(A) is a diagram illustrating a method of allocating resources according to method 7-1 of the second embodiment.

As illustrated in FIG. 39(A), in interlace index #0 of sub-band #0, a DMRS of 11 length-12 sequences configure the DMRS, and in interlace indexes #1 and #2, 10 length-12 sequences configure the DMRS.

In addition, in interlace index #1 of sub-band #1, length-12 sequences configure the DMRS, and in interlace indexes #0 and #2, 10 length-12 sequences configure the DMRS.

In FIG. 39(A), the number of guard bands may be 5, and the terminal may use 5 guard bands, so the first interlace index of sub-band #1 becomes #1.

[Method 7-2 of Second Embodiment]

Method 7-2 of the second embodiment is a method in which the base station sets the length of the DMRS sequence to the terminal equal to the size of one interlace in each SB.

In this case, for example, assuming that M SBs are allocated to the UE, K interlaces are allocated within each SB, and one interlace is composed of (discontinuous) N RBs based on the bandwidth of the single SB, the terminal may be configured so that (M×K) length-(12×N) sequences configure the DMRS. That is, assuming the same subcarrier spacing (e.g. 30 kHz) and interlace allocation (e.g. interlace RB interval is 5 PRB) as above, it is assumed that two SBs are allocated to the UE, and assuming that 3 interlaces are allocated since 5 interlaces may be allocated within each SB when the bandwidth of a single SB is 20 MHz and the interlace RB interval is 5 PRB, since one interlace is composed of (discontinuous) 10 or 11 RBs, the base station may configure the terminal so that a total of (2×3) length-(12×10) sequences or length-(12×11) sequences configure the DMRS according to the interlace index. For example, it may be a structure in which K sequences are mapped per SB.

FIG. 39(B) is a diagram illustrating a method of allocating resources according to method 7-2 of the second embodiment.

As illustrated in FIG. 39(B), the terminal configures the DMRS in a manner that the interlace index #0 of the sub-band #0 generates 1 length-(11×12) sequence, and the sequence is divided into 11 equal parts and mapped to each PRB (i.e. by 12 REs) in order to be divided into and mapped to 11 PRBs, and configures the DMRS in a manner that interlace indexes #1 and #2 generate 1 length-(10×12) sequence and the sequence is divided into 10 equal parts and is mapped to each PRB (i.e. by 12 REs) in order to be divided and put into 10 PRBS.

Meanwhile, the terminal configures the DMRS in a manner that the interlace index #1 of sub-band #1 generates 1 length-(11×12) sequence, and the sequence is divided into 11 equal parts and is mapped to each PRB (i.e. by 12 REs), and the interlace indexes #0 and #2 generate 1 length-(10×12) sequence and the sequence is divided into 10 equal parts and is mapped to each PRB (i.e., by 12 REs) in order to be divided and put into 10 PRBs. Characteristically, when the sequence is divided into and mapped to 12 REs, the sequence may be configured to be mapped in the lowest PRB order corresponding to the same interlace in each sub-band.

In FIG. 39(B), the number of guard bands may be 5, and the terminal may use 5 guard bands, so the first interlace index of sub-band #1 becomes #1.

[Method 7-3 of Second Embodiment]

Method 7-3 of the second embodiment is a method of configuring the DMRS sequence length to be equal to a (plurality of) interlace sizes allocated in each SB.

In this case, for example, assuming that M SBs are allocated to the UE, K interlaces are allocated within each SB, and one interlace is composed of (discontinuous) N RBs based on the bandwidth of the single SB, the terminal may be configured so that a total of M lengths–(K×12 K) sequences configure the DMRS.

In addition, when the number of RBs forming the interlace is set differently for each interlace (i.e., L interlaces are composed of N+1 RBs, and KL interlaces are composed of N RBs), the base station may configure the terminal so that a total of M lengths–{(KL)×12×N+L×12×(N+1)} sequences configure the DMRS. That is, assuming the same subcarrier spacing (e.g. 30 kHz) and interlace allocation (e.g. interlace RB interval is 5 PRB) as above, it is assumed that two SBs are allocated to the UE, and assuming that three interlaces are allocated since 5 interlaces may be allocated within each SB when the bandwidth of a single SB is 20 MHz and the interlace RB interval is 5 PRB (in this case, assume that there are 3 interlaces allocated to each sub-band, one interlace is composed of 11 (discontinuous) RBs, and two interlaces are composed of (discontinuous) 10 RBs.), the base station may configure the terminal so that a total of two lengths–(2×12×10+1×12×11) sequences configure the DMRS. That is, it may be a structure in which one sequence is mapped for each SB.

FIG. 39(C) is a diagram illustrating a method of allocating resources according to method 7-3 of the second embodiment.

As illustrated in FIG. 39(C), since interlace #0 composed of 11 RBs and interlaces #1 and #2 composed of 10 RBs are allocated to sub-band #0, a total of 1 length-(2×12×10+1×12×11) sequences are generated, and the DMRS is configured in a manner that the sequences are divided into (2×10+1×11) equal parts and are mapped to each PRB (i.e., by 12 REs) in order to be divided into and mapped to (2×10+1×11) PRBs.

Meanwhile, since interlace #1 composed of 11 RBs and interlaces #0 and #2 composed of 10 RBs are allocated to the sub-band #1, a total of 1 length-(2×12×10+1×12×11) sequences are generated, and the DMRS is configured in a manner that the sequences are divided into (2×10+1×11) equal parts and are mapped to each PRB (i.e., by 12 REs) in order to be divided into and mapped to (2×10+1×11) PRBs.

In addition, when dividing and mapping the sequence by 12 REs, the base station may configure the terminal to map in the lowest PRB order corresponding to the allocated interlace for each sub-band.

In FIG. 39(C), the number of guard bands may be 5, and the terminal may use 5 guard bands, so the first interlace index of sub-band #1 becomes #1.

[Method 7-4 of Second Embodiment]

Method 7-4 of the second embodiment is a method of configuring the DMRS sequence length to be equal to the size of one interlace in the allocated SB (group).

In this case, for example, assuming that M SBs are allocated to the UE, K interlaces are allocated within each SB, and one interlace is composed of (discontinuous) N RBs based on the bandwidth of the single SB, the terminal may be configured so that a total of K lengths–(M×12×N) sequences configure the DMRS.

In addition, when the number of RBs forming interlace for each sub-band is set differently for each interlace index (i.e., when L interlaces are composed of a total of M×(N+1) RBs in the M SBs allocated to the UE, P interlaces are composed of a total of M×N RBs in the M SBs allocated to the UE, K–(L+P) interlaces are N+ in each of the Z SBs among the M SBs allocated to the UE, and each of the M–Z SBs is composed of N RBs), the base station may configure the terminal so that L interlaces configures a DMRS across M SBs using a length-{M×12×(N+1)} sequence, the base station may configure so that P interlaces constitute a DMRS across M SBs using a length–{M×12×N} sequence, and the base station may configure so that K–(L+P) interlaces constitute a DMRS across M SBs using a length–[{Z×12×(N+1)}+{(M–Z)×12×N}] sequence.

That is, assuming the same subcarrier spacing (e.g. 30 kHz) and interlace allocation (e.g. interlace RB interval is 5 PRB) as above, it is assumed that two SBs are allocated to the UE, and assuming that 3 interlaces are allocated since 5 interlaces may be allocated within each SB when the bandwidth of a single SB is 20 MHz and the interlace RB interval is 5 PRB, since one interlace is composed of 10 or 11 RBs, the base station may configure the terminal so that length-(2×12×10) sequences, length-(2×12×11) sequences, or length-(1×12×10+1×12×11) sequences configure the DMRS according to the interlace index. That is, one sequence may be mapped per single interlace across M SBs.

Figure 40:
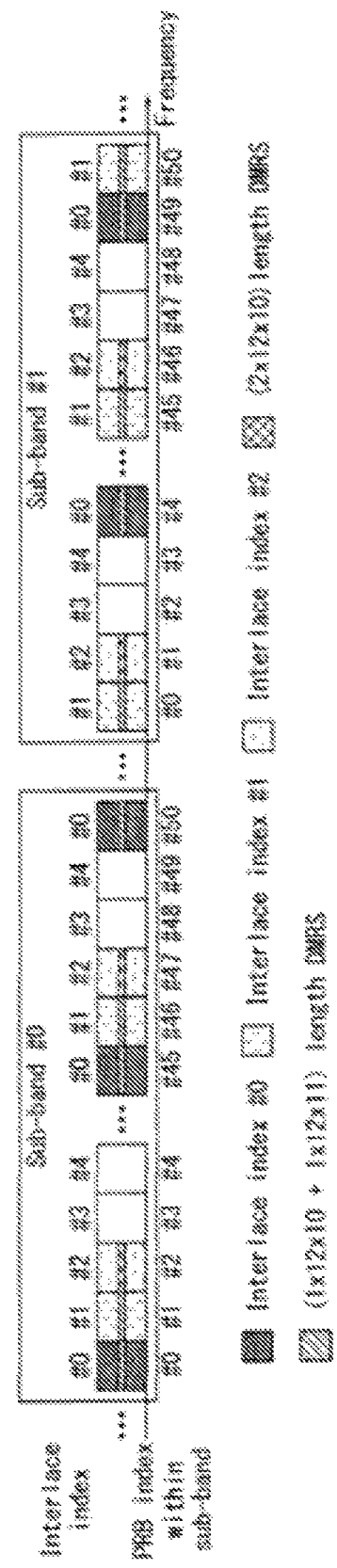
FIG. 40 is a diagram illustrating a method of allocating resources according to method 7-4 of the second embodiment.

FIG. 40 is a diagram illustrating a method of allocating resources according to method 7-4 of the second embodiment.

As illustrated in FIG. 40, since a total of three interlaces are allocated over two sub-bands, and interlace indexes #0 and #1 of the three interlaces are composed of (1×10+1) RBs over two sub-bands, the terminal configures the DMRS in a manner that a total of 1 length-(1×12×10+1×12×11) sequences are generated, and the sequence is divided into (1×10+1×11) equal parts and mapped to each PRB (i.e. by 12 REs) in order to be divided into and mapped to (1×10+1×11) PRBs.

Here, since the interlace index #2 is composed of a total of (2×10) RBs over two sub-bands, the terminal configures the DMRS in a manner that a total of 1 length-(2×12×10) sequences are generated, and the sequence is divided into (2×10) equal parts and mapped to each PRB (i.e. by 12 REs) in order to be divided into and mapped to (2×10) PRBs.

In addition, when dividing and mapping the sequence by 12 REs, the base station may configure the terminal to map in the lowest PRB order corresponding to the same interlace across two sub-bands.

In FIG. 40(C), the number of guard bands may be 5, and the terminal may use 5 guard bands, so the first interlace index of sub-band #1 becomes #1.

[Method 7-5 of Second Embodiment]

Method 7-5 of the second embodiment is a method in which the base station configures the terminal to set the DMRS sequence length to be equal to the allocated (plurality of) interlace size in the allocated SB (group).

Here, the guard band (a band between sub-band #0 and sub-band #1) may be 5 PRB. In this case, for example, assuming that M SBs are allocated to the UE, K interlaces are allocated within each SB, and one interlace is composed of (discontinuous) N RBs based on the bandwidth of the single SB, one length-(K×M×12×N) sequences across the entire SB allocated to the UE may be set to configure the DMRS.

Here, when the number of RBs forming interlace for each sub-band is set differently for each interlace index (i.e., when L interlaces are composed of a total of M×(N+1) RBs in the M SBs allocated to the UE, P interlaces are composed of a total of M×N RBs in the M SBs allocated to the UE, K–(L+P) interlaces are N+ in each of the Z SBs among the M SBs allocated to the UE, and each of the M–Z SBs is composed of N RBs), the DMRS may be configured in all the interfaces allocated across M SBs using 1 length–[L×M×12×(N+1)+P×M×12×N+{K–(L+P)}×{Z×12×(N+1)+(M–Z)×12×N}] sequences.

That is, assuming the same subcarrier spacing (e.g. 30 kHz) and interlace allocation (e.g. interlace RB interval is 5 PRB) as above, it is assumed that two SBs are allocated to the UE, and assuming that 3 interlaces are allocated since 5 interlaces may be allocated when the bandwidth of a single SB is 20 MHz and the interlace RB interval is 5 PRB, since one interlace is composed of 10 or 11 RBs, 1 length-(3×2×12×10) sequences, length-(3×2×12×11) sequences, length-(2×1×12×11+1×1×12×10) sequences, or length-(1×1×12×11+2×1×12×10) sequences may be set to configure the DMRS on the whole. That is, it may be a structure in which a total of one sequence is mapped across M SBs.

Figure 41:
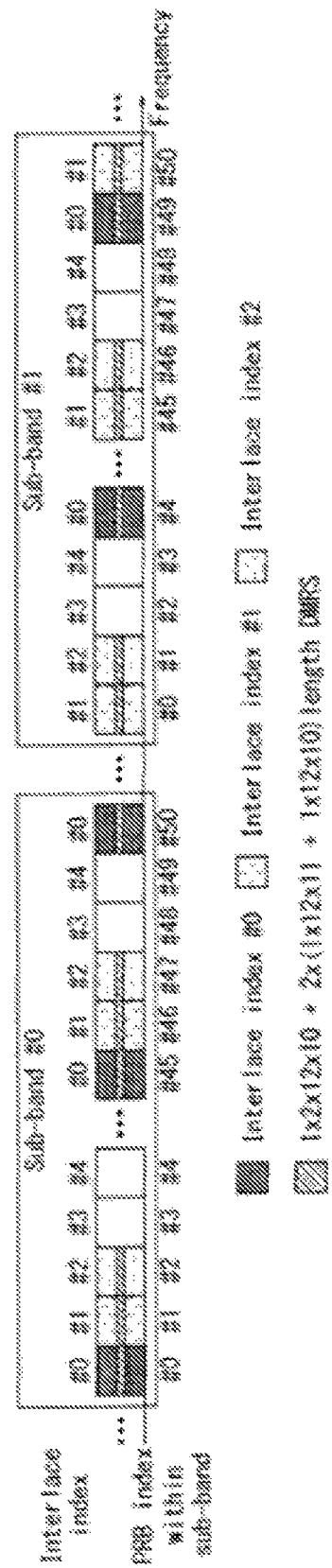
FIG. 41 is a diagram illustrating a method of allocating resources according to method 7-5 of the second embodiment.

FIG. 41 is a diagram illustrating a method of allocating resources according to method 7-5 of the second embodiment.

As illustrated in FIG. 41, since three interlaces are allocated across two sub-bands, interlace indexes #0 and #1 are composed of a total of (1×10+1×11) RBs across two sub-bands among three interlaces, and the interlace index #2 is composed of a total of (2×10) RBs across two sub-bands, the terminal configures the DMRS in a manner that a total of one {1×2×12×10+2×(1×12×11+1×12×10)} sequence is generated and the sequence is divided into {2×(1×11+1×10)+1×2×10} equal parts and mapped to each PRB (i.e. by 12 REs) in order to be divided into and mapped to {2×(1×11+1×10)+1×2×10}.

Here, when dividing and mapping the sequence by 12 REs, the base station may configure the terminal to map in the lowest PRB order configuring all the interlaces across two sub-bands.

In the proposed methods 7-1 to 7-5, the DMRS based on different options may be applied between different UL channels (e.g. PUSCH/PUCCH/SRS). For example, the method 7-1 or 7-2 is applied to the PUCCH/SRS, which is a channel based on multiplexing such as CDM/FDM, and the method 7-3, 7-4 or 7-5 is applied to the PUSCH. In addition, a dynamic switching operation (between long vs. short sequences) may be supported by operating in a configurable RRC between the plurality of options or through DCI.

In addition, in the proposed methods 7-1 to 7-5, for example, the terminal may select whether to use a guard band. For example, if the terminal chooses to use the guard band, the terminal may report information that the HALF PRB may be used to the base station. Here, the base station may transmit configuration information (e.g. a flag) to use the guard band to the terminal based on information that the terminal may use the guard band. Then, the terminal may use the guard band for DMRS allocation based on the configuration information received from the base station.

In FIG. 41(C), the number of guard bands may be 5, and the terminal may use 5 guard bands, so the first interlace index of sub-band #1 becomes #1.

Assuming that the DMRS is generated according to the proposed method, the following DMRS randomization method may be required to reduce inter-cell interference.

As Method 8-1 of the second embodiment, a method of applying DMRS sequence hopping (e.g. root/cyclic shift, scrambling ID/seed) based on the RB index within the entire CC bandwidth may be proposed.

As Method 8-2 of the second embodiment, a method of applying DMRS sequence hopping based on an interlace index within the entire CC bandwidth may be proposed.

As Method 8-3 of the second embodiment, a method of applying DMRS sequence hopping based on an SB index within the entire CC bandwidth may be proposed.

As method 8-4 of the second embodiment, a method of applying DMRS sequence hopping based on the RB index in the BWP may be proposed.

As method 8-5 of the second embodiment, a method of applying DMRS sequence hopping based on the interface index in the BWP may be proposed.

As method 8-6 of the second embodiment, a method of applying DMRS sequence hopping based on the SB index in the BWP may be proposed.

As method 8-7 of the second embodiment, a method of applying DMRS sequence hopping based on the RB index in the SB may be proposed.

As method 8-8 of the second embodiment, a method of applying DMRS sequence hopping based on the interface index in the SB may be proposed.

Here, when a single sequence is mapped across a plurality of RBs, DMRS sequence hopping may be applied based on the lowest RB index (and/or the lowest sub-band index) to which the corresponding sequence is mapped.

In Methods 8-1 to 8-8 of the second embodiment proposed above, the interlace index within each sub-band may vary according to the size of the guard band at the edge of each sub-band. That is, if the size of the guard band between sub-band #0 and sub-band #1 of the proposed options is K PRB, and the last interlace index value in sub-band #0 is X, then the first interlace index in sub-band #1 may be (X+K+1) mod M. In this case, M is the total number of interlaces present according to the subcarrier spacing value, and may be 10 for 15 kHz SCS and 5 for 30 kHz SCS.

For example, in a 30 kHz SCS situation, if K is 5 and X is 0, the first interlace index in sub-band #1 may be (0+5+1) mod 5=1. As another example, in a 30 kHz SCS situation, if K is 3 and X is 0, the first interlace index in sub-band #1 may be (0+3+1) mod 5=4.

FIG. 42(A) is a diagram illustrating a method of allocating resources according to methods 8-1 to 8-5 of the second embodiment.

Figure 42:
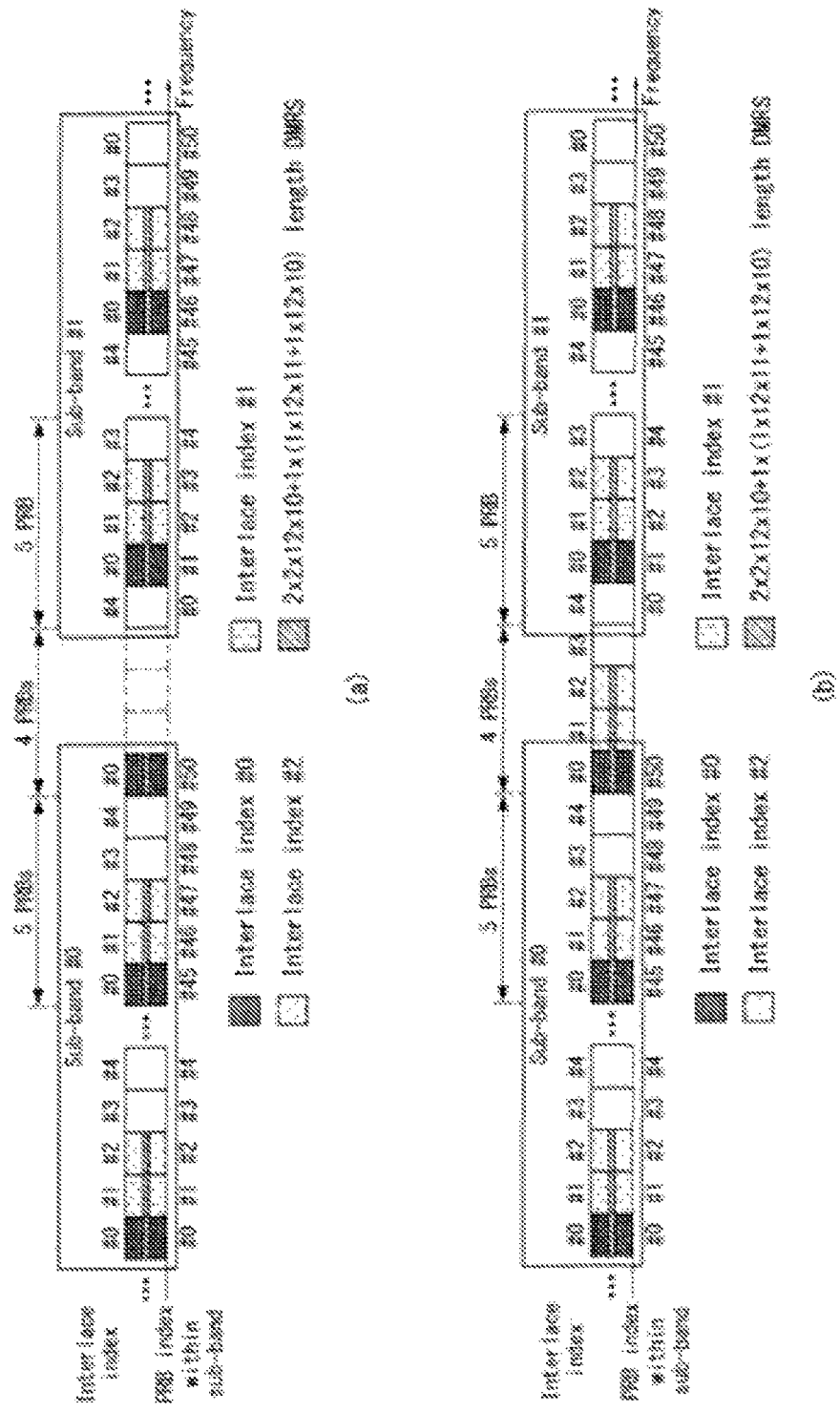
FIG. 42(A) is a diagram illustrating a method of allocating resources according to methods 8-1 to 8-5 of the second embodiment.
FIG. 42(B) is a diagram illustrating an example of using PRBs existing in a guard band in the method 7-5 having an interlace index of FIG. 42(A).

As illustrated in FIG. 42, since three interlaces are allocated across two sub-bands, interlace indexes #0 and #1 are composed of a total of (1×10+1×11) RBs across two sub-bands among three interlaces, and the interlace index #2 is composed of a total of (2×10) RBs across two sub-bands, the terminal configures the DMRS in a manner that a total of one {2×2×12×10+1×(1×12×11+1×12×10)} sequence is generated and the sequence is divided into {1×(1×11+1×10)+2×2×10} equal parts and mapped to each PRB (i.e. by 12 REs) in order to be divided into and mapped to {1×(1×11+1×10)+2×2×10}.

Here, when the corresponding sequence is divided and mapped by 12 RE, it may be set to map in the lowest PRB order of PRBs configuring all interlaces allocated to the UE across two sub-bands.

In addition, in the above options, when one terminal is instructed to transmit UL using a plurality of sub-bands, the terminal may perform the UL transmission using PRBs existing in the guard band existing between the plurality of sub-bands when the plurality of sub-bands are contiguously arranged (including one guard band based on a sub-band index or based on a frequency band).

Therefore, when some or all of the PRBs included in the guard band are included in the interlace index allocated from the base station, the base station may configure the terminal so that the DMRS length is also generated and mapped by including the number of PRBs in the PRBs configuring the interlace in the sub-band.

FIG. 42(B) is a diagram illustrating an example of using PRBs existing in a guard band in the method 7-5 having an interlace index of FIG. 42(A).

As illustrated in FIG. 42(B), since three interlaces are allocated across two (continuous) sub-bands and guard bands, and all three interlace indexes #0, #1, and #2 are two (continuous) and all three interlace indices #0, #1, #2 are composed of a total of (1×10+1×11) RBs across two (contiguous) sub-bands and guard bands, the DMRS is configured in a manner that a total of one {3×(1×12×11+1×12× 10)} sequence is generated and the sequence is divided into {3×(1×11+1×10)} equal parts and mapped to each PRB (i.e. by 12 REs) in order to be divided into or mapped to {3×(1×11+1×10)} PRBs.

Here, when the corresponding sequence is divided and mapped by 12 RE, it may be set to map in the lowest PRB order of PRBs configuring all interlaces allocated to the UE across two sub-bands and the guard band.

[Method 9 of Second Embodiment]

Method 9 of the second embodiment is a method of defining an interlace index and an RB set configuring each interlace in the SB for each LBT-SB.

For example, if an interlace is defined only with RBs belonging to the corresponding SB for each LBT-SB of 20 MHz, and a BWP larger than the SB (e.g. 40 MHz) is set to the UE, two SBs with individual interlace indexing are available to the corresponding UE. In addition, the UL transmission resource of the UE may be allocated to interlaces included in a plurality of (e.g. 2) SBs corresponding to the entire BWP, or may be allocated only the interlaces included in the SB of a specific part (e.g. 1).

Assuming 30 kHz subcarrier spacing, if a total of 51 RBs exist at 20 MHz and the interlace between RBs is set to N (e.g. 5 RBs), X interlaces may be composed of (discontinuous) $\lfloor 51/N \rfloor+1$ (e.g. 11) RBs and N-X interlaces may be composed of (discontinuous) $\lfloor 51/N \rfloor$ (e.g. 10) RBs.

In such a situation, how the DMRS sequence length is defined in the UL interlace structure, how the DMRS sequence length is generated, and how to divide into and map to the DMRS sequence length may be summarized as follows.

[Method 9-1 of Second Embodiment]

In Method 9-1 of the second embodiment, a method of configuring the DMRS sequence length to be equal to one RB size (i.e. 12 REs) may be proposed.

The proposed method 7-1 may also be applied to the method 9-1.

Figure 43:
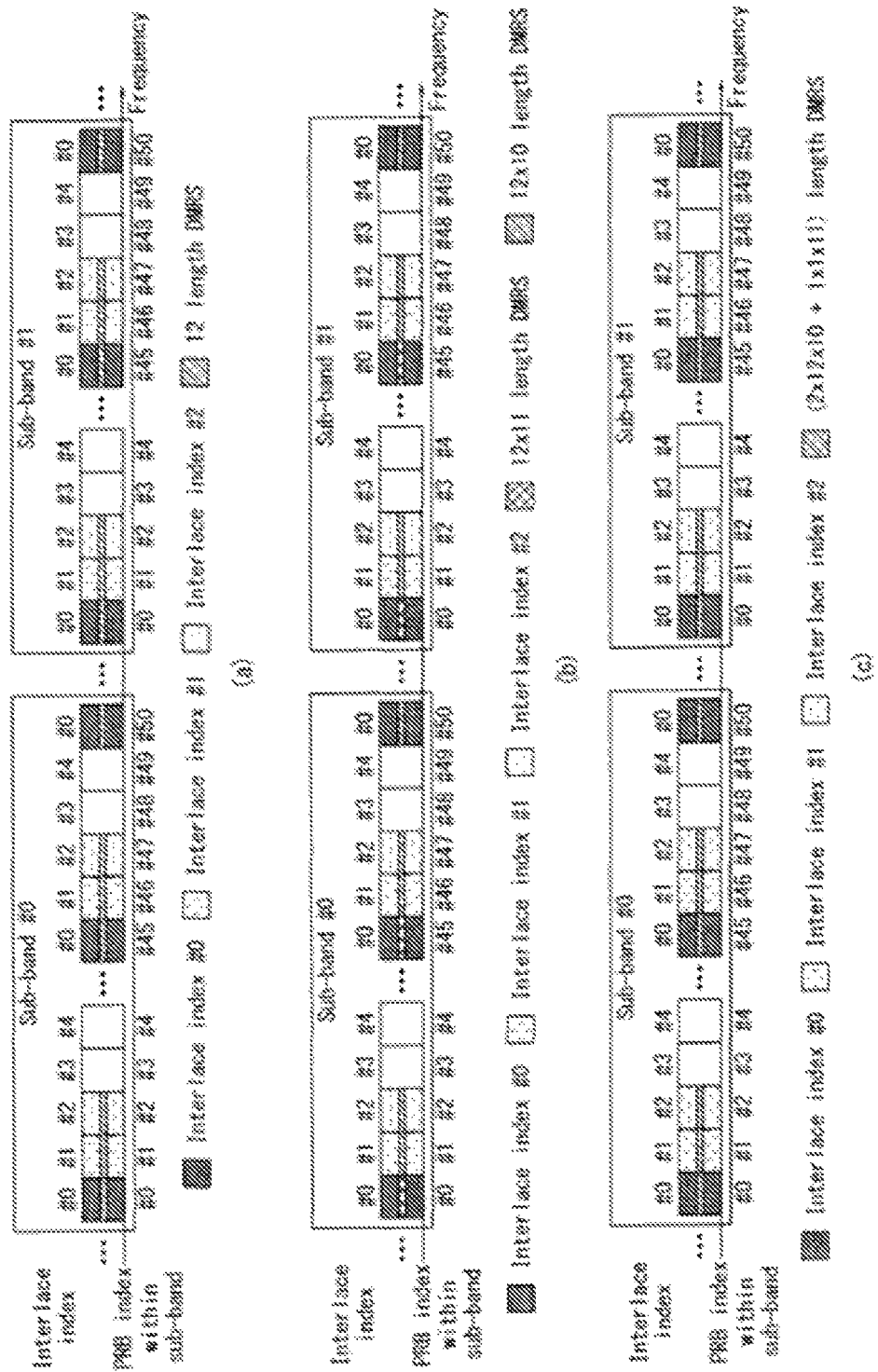
FIG. 43(a) is a diagram illustrating a method of allocating resources according to method 9-1 of the second embodiment.
FIG. 43(b) is a diagram illustrating a method of allocating resources according to method 9-2 of the second embodiment.
FIG. 43(c) is a diagram illustrating a method of allocating resources according to method 9-3 of the second embodiment.

FIG. 43(a) is a diagram illustrating a method of allocating resources according to method 9-1 of the second embodiment.

Compared with Method 7-1, in the case of FIG. 43(a) in which resources are allocated according to Method 9-1, since the interlace is defined in the SB, the first interlace index of each SB may be 0.

[Method 9-2 of Second Embodiment]

In 9-2 of the second embodiment, a method of configuring the DMRS sequence length to be equal to one interlace size in each SB may be proposed.

The proposed method 7-2 may also be applied to the method 9-2.

FIG. 43(b) is a diagram illustrating a method of allocating resources according to method 9-2 of the second embodiment.

Compared with Method 7-2, in the case of an example in which resources are allocated according to Method 9-2, since the interlace is defined in the SB, the first interlace index of each SB may be 0.

[Method 9-3 of Second Embodiment]

In 9-3 of the second embodiment, a method of configuring the DMRS sequence length to be equal to (a plurality of) interlace sizes allocated in each SB may be proposed.

The proposed method 7-3 may also be applied to the method 9-3.

FIG. 43(c) is a diagram illustrating a method of allocating resources according to method 9-3 of the second embodiment.

Compared with Method 7-3, in the case of FIG. 43(c) in which resources are allocated according to Method 9-3, since the interlace is defined in the SB, the first interlace index of each SB may be 0.

[Method 9-4 of Second Embodiment]

In 9-4 of the second embodiment, a method of configuring the DMRS sequence length to be equal to the RB size corresponding to the same interlace index in the allocated SB (group) may be proposed.

The proposed method 7-4 may also be applied to the method 9-4.

Figure 44:
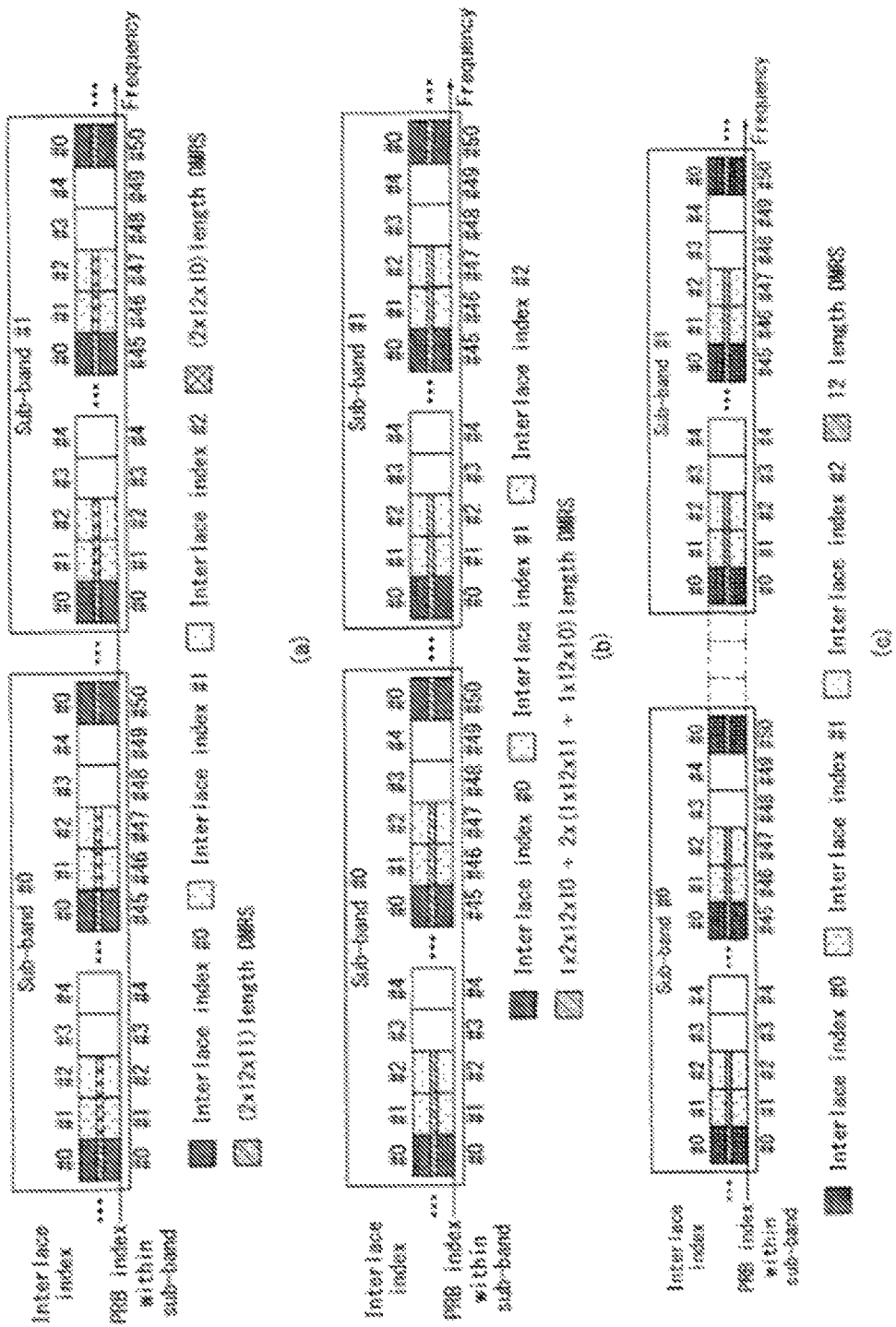
FIG. 44(a) is a diagram illustrating a method of allocating resources according to method 9-4 of the second embodiment.
FIG. 44(b) is a diagram illustrating a method of allocating resources according to method 9-5 of the second embodiment.
FIG. 44(c) illustrates a method of allocating resources so that PRBs in an interlace across a plurality of SBs are not spaced apart.

FIG. 44(a) is a diagram illustrating a method of allocating resources according to method 9-4 of the second embodiment.

Compared with Method 7-4, in the case of FIG. 44(a) in which resources are allocated according to Method 9-4, since the interlace is defined in the SB, the first interlace index of each SB may be 0.

[Method 9-5 of Second Embodiment]

In 9-5 of the second embodiment, a method of configuring the DMRS sequence length to be equal to (a plurality of) interlace sizes allocated in the allocated SB may be proposed.

The proposed method 7-5 may also be applied to the method 9-5.

FIG. 44(b) is a diagram illustrating a method of allocating resources according to method 9-5 of the second embodiment.

Compared with Method 7-5, in the case of FIG. 44(b) in which resources are allocated according to Method 9-5, since the interlace is defined in the SB, the first interlace index of each SB may be 0.

In the proposed methods 9-1 to 9-5, the DMRS based on different options may be applied between different UL channels (e.g. PUSCH/PUCCH/SRS). For example, the method 9-1 or 9-2 may be applied to the PUCCH/SRS, which is a channel based on multiplexing such as CDM/FDM, the method 9-1 or 9-2 may be applied to the PUSCH, and the method 9-3 may be applied to the PUSCH. In addition, a dynamic switching operation (between long vs. short sequences) may be supported by operating in a configurable RRC between the plurality of options or through DCI.

Assuming that the DMRS is generated according to the proposed method, the following DMRS randomization method may be required to reduce inter-cell interference.

[Method 10-1 of Second Embodiment]

As Method 10-1 of the second embodiment, a method of applying DMRS sequence hopping (e.g. root/cyclic shift, scrambling ID/seed) based on the RB index within the entire CC bandwidth may be proposed.

[Method 10-2 of Second Embodiment]

In Method 10-2 of the second embodiment, a method of applying DMRS sequence hopping based on the RB index (and/or SB index) in the SB is proposed.

[Method 10-3 of Second Embodiment]

In Method 10-3 of the second embodiment, a method of applying DMRS sequence hopping based on the interlace index (and/or SB index) in the SB is proposed.

Here, when a single sequence is mapped across a plurality of RBs, the terminal may apply the DMRS sequence hopping based on the lowest RB index (and/or the lowest sub-band index) to which the corresponding sequence is mapped.

In addition, in a situation in which the interlace is defined within the sub-band as described above, when the base station commonly indicates an interlace index to a plurality of SBs, the terminal may be configured so that the PRBs in the interlace across the plurality of SBs are not equally spaced. For example, in sub-band index #0 and sub-band index #1, even though interlaces are each configured with N PRB intervals, the interval between the last PRB configuring the interlace index indicated by the base station allocated to sub-band index #0 and the first PRB configuring the interlace index indicated by the base station allocated to the sub-band index #1 may not be N.

FIG. 44(c) illustrates a method of allocating resources so that PRBs in an interlace across a plurality of SBs are not spaced apart.

As illustrated in FIG. 44(C), as an example of the problem, in a situation where the first set interlace interval is 5 PRB, the interlace interval between sub-bands represents 4 PRB which is smaller than the previously set interlace interval.

On the other hand, in a situation in which resources are allocated as illustrated in FIG. 44(C), if interlace index #0 of sub-band #0 and interlace index #0 of sub-band #1 are allocated for transmission of the same UL resource, there is a problem that the interval between PRBs configuring the interlace is not constant. On the other hand, to solve this problem, the base station may instruct the index terminal the interlace index #0 in each sub-band #0 and the interlace index #1 in the sub-band #1, but the signaling overhead of the base station increases.

Therefore, the following method can be considered to solve this problem. If the base station indicates the interlace index only for SBs with the lowest index among the plurality of SBs, the terminal may determine that the indicated interlace index is allocated to the terminal from the corresponding lowest index SB, and determine that for the remaining SBs except for the lowest index SB, the interlace index corresponding to the PRB set at equal intervals with the interlace indicated in the corresponding lowest index SB is allocated to the terminal.

That is, in FIG. 44(c), the base station indicates only interlace index #0 of sub-band #0 for a specific UL DATA, and may determine that interlace index #1 of sub-band #1 which is an interlace index having equal intervals from interlace index #0 of the corresponding sub-band #0 is allocated to the terminal. After that, even if there are more SBs, the same method may be applied. When configured in this way, when the terminal transmits UL data, it can always transmit at an equal interval even in different sub-bands, and there is an advantage that PAPR can be lowered compared to non-uniform transmission from the terminal side.

Additionally, even when the proposed uniform-distance interlace structure is used, all options for generating/mapping the DMRS sequence may be applied.

The proposed "sequence hopping or sequence randomization for each SB in CC/BWP" may be applied to not only UL RS (e.g., DMRS, etc.) but also DL RS (e.g., PDCCH/PDSCH DM-RS, CSI-RS, etc.).

Next, for the unified solution for CFS and CBS PUR, the NB-IoT system will be described as an example, but the details to be described later can be applied equally to the aforementioned NR-U (or U-Band) system.

For example, the contents to be described later may be defined for transmission and reception of signals in the L-cell and/or the U-cell.

Third Exemplary Embodiment

In the third embodiment, a method in which the base station indicates a specific time/frequency resource to the terminal, and the DMRS and scrambling sequence required for (N)PUSCH transmission in the corresponding T/F resource is configured as SIB (cell or CE level specific) or UE specific RRC is proposed.

The base station may be configured to preconfigure a combination of K (in this case, K is a positive integer greater than or equal to 2) orthogonal DMRSs and scrambling sequences For example, a combination consisting of a DMRS and a scrambling sequence (e.g. an RNTI value), characteristically, a DMRS and a scrambling sequence may be set differently between orthogonal combinations. Also, even if only one of the DMRS or scrambling sequences is different, it can be considered as an orthogonal resource) for two or more UEs sharing a specific T/F resource.

At this time, if the base station may determine that it is possible to allocate the corresponding T/F resource to the number of terminals less than K at a specific point in time, the base station may instruct a plurality (for example, a number less than K) of UEs sharing the corresponding T/F resource with different orthogonal DMRS and scrambling sequences (i.e. RNTI value), respectively, through UE-specific RRC signaling. The UE performs PUR transmission using the DMRS and scrambling sequence instructed by the base station in the corresponding T/F resource based on the value indicated by the base station. If the base station is set in this way, as a result, contention-free operation (i.e. CFS PUR operation) may be performed.

Figure 45:
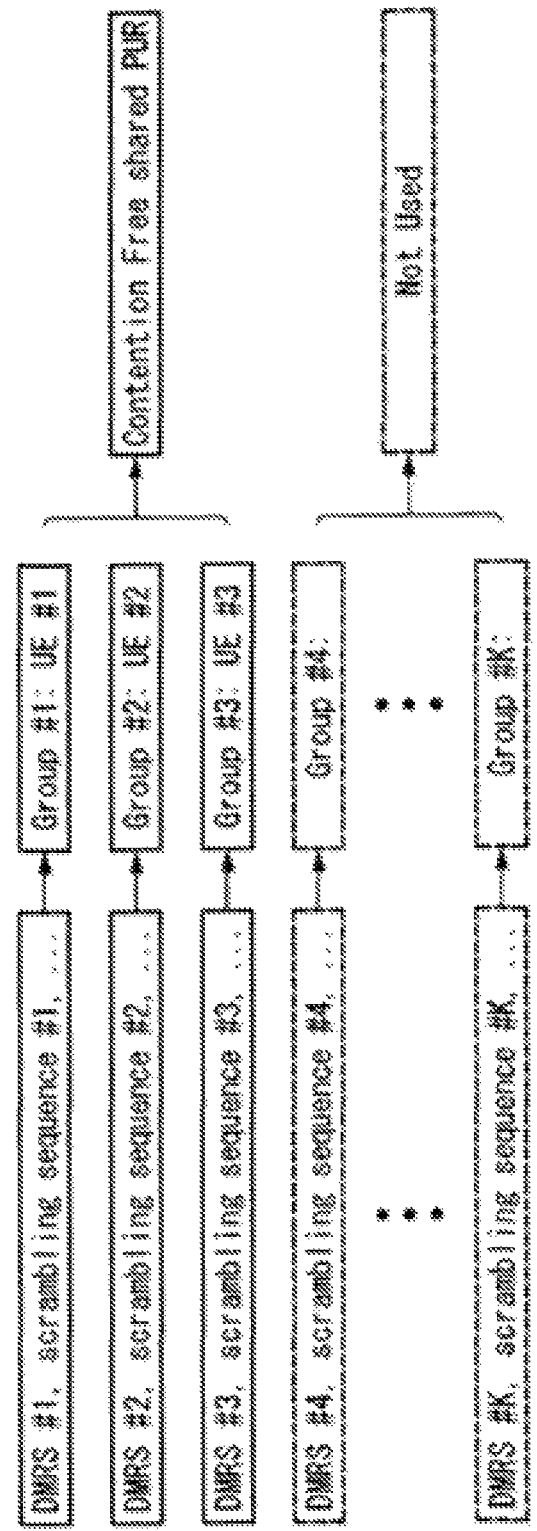
FIG. 45 is a diagram illustrating an example in which a base station configures a combination of K mutually orthogonal DMRSs, scrambling sequences, and the like, and then attempts to allocate N UEs to specific time/frequency resources.

FIG. 45 is a diagram illustrating an example in which a base station configures a combination of K mutually orthogonal DMRSs, scrambling sequences, and the like, and then attempts to allocate N UEs to specific time/frequency resources.

Since the number of UEs to be allocated to a specific time/frequency (T/F) resource is less than the number of combinations composed of the initially prepared DMRS and scrambling sequences, etc., the base station allocates one UE for each group to perform a contention-free PUR operation. In this case, the DMRS and scrambling sequence corresponding to the group to which the UE is not allocated may not be used when transmitting the PUR to the corresponding T/F resource. In addition, in this case, since the base station may distinguish all N terminals, there is no need to request the terminal to transmit additional UE-specific information.

On the other hand, if the base station may determine that it is sufficient to allocate the corresponding T/F resource to a number of UEs greater than K at a specific point in time, the base station may classifies a plurality (e.g., a number greater than K) of UEs sharing the corresponding T/F resource into K groups so as not to overlap, and then indicate to K different UE groups a combination composed of K orthogonal DMRSs and scrambling sequences previously configured by UE-specific RRC signaling.

Here, even though transmitting through UE-specific RRC signaling, UEs belonging to the same UE group may receive the same DMRS and scrambling sequence. In addition, it may be set to deliver corresponding information through UE group signaling rather than UE-specific RRC signaling.

Thereafter, the base station may be configured to instruct a plurality of UEs (i.e., a plurality of UEs belonging to the same UE group) instructed to use the same DMRS and scrambling sequence to transmit UE-specific preset UE ID information together when the UE transmits (N)PUSCH. At this time, when instructing a DMRS, a scrambling sequence, etc., the base station may set to transmit a 1-bit field instructing to transmit UE-specific ID information when additionally (N) PUSCH is transmitted to the terminal.

Here, the UE ID information may be configured to be transmitted by the base station to each terminal when PUR configuration is instructed, and may be configured to receive instructions from the base station when the terminal is switched from connected mode to idle mode or from EDT procedure to idle mode, or through a paging procedure. In addition, as another example, the UE ID information may be a unique ID of a terminal.

As described above, when the base station allocates resources to the terminal, the base station performs the contention-free transmission since K different UE groups use orthogonal DMRS and scrambling sequences with each other, but the contention occurs between terminals using the same DMRS and scrambling sequence (i.e. terminal belonging to the same group), and the base station needs to decode the unique ID of the UE transmitted by the terminal and transmit the feedback information including the (N)PUSCH of which terminal has been received to the terminal.

The terminal receiving the feedback information may determine whether the (N) PUSCH transmission transmitted by itself has been properly received, and if the contention fails, it may be set to transmit to the PUR T/F resource that exists later, and then may be set to perform a RACH procedure or an EDT procedure.

Figure 46:
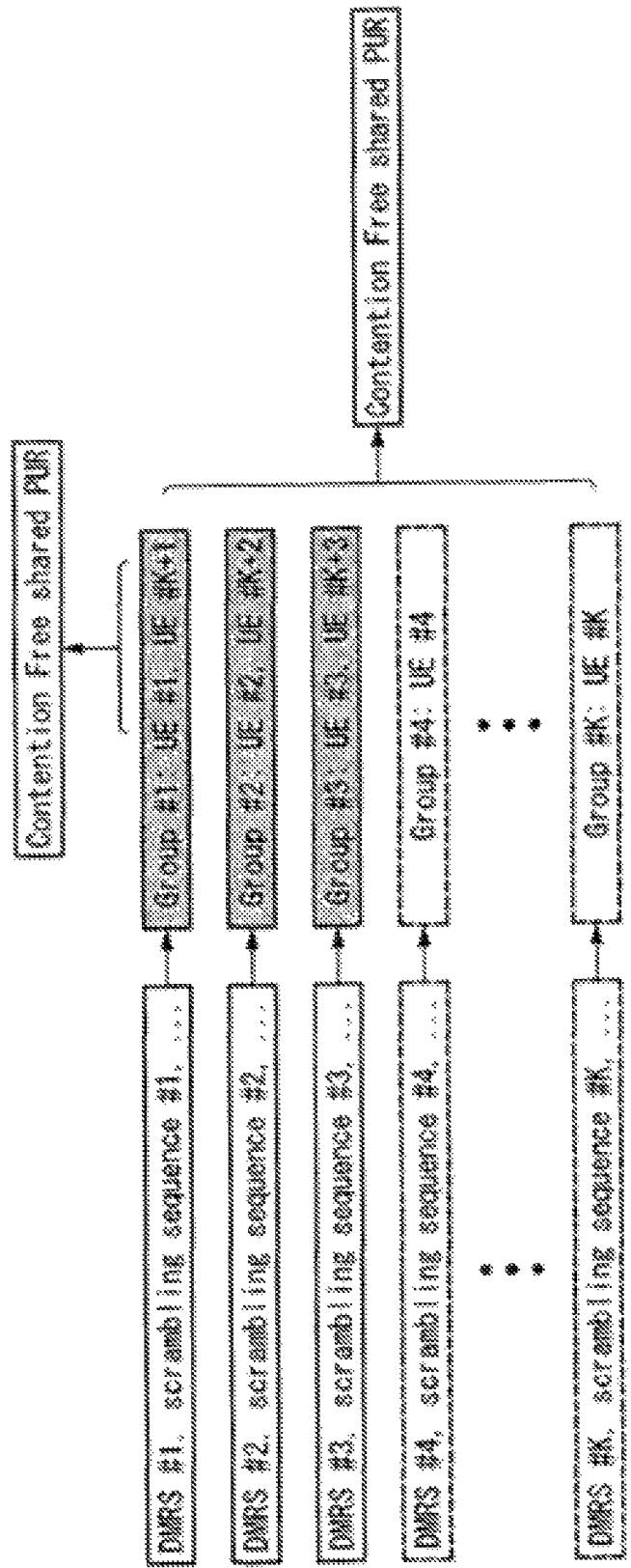
FIG. 46 is a diagram illustrating an example in which a base station configures a combination of K mutually orthogonal DMRSs, scrambling sequences, and the like, and then attempts to allocate M UEs to specific time/frequency resources.

FIG. 46 is a diagram illustrating an example in which a base station configures a combination of K mutually orthogonal DMRSs, scrambling sequences, and the like, and then attempts to allocate M UEs to specific time/frequency resources.

Since the number of UEs to be allocated to a specific T/F resource is greater than the number of combinations composed of the initially prepared DMRS and scrambling sequences, etc., at least one UE is allocated for each group in order to set as little contention as possible, and UEs exceeding K may be additionally allocated to a group to which UEs are already allocated according to the determination of the base station.

Here, in order to achieve the best performance of the CBS PUR operation, it may be desirable to set the number of UEs allocated to each group to be equal to each other or to differ by only one maximum.

Referring to FIG. 46, among a total of M (=K+3) UEs, M−6 UEs perform a contention-free PUR operation, and UE #1 and #K+1 corresponding to groups #1, #2, and #3, and UE #2 and #K+2, and UE #3 and #K+3 each perform a contention-based PUR operation.

Here, it can be determined that contention does not occur between UEs having different group numbers because the orthogonality of the DMRS or the scrambling sequence is maintained. However, since contention occurs within a group containing two or more UEs, the corresponding UEs may perform a contention-based PUR operation.

In addition, as another example, the base station needs to request additional UE-specific information to be transmitted to terminals performing contention-based PUR operation.

On the other hand, the base station may determine and allocate UL data intended to be transmitted by the UE according to priority. In the case of a UE having high priority, the base station may configure the UE to occupy one of the UE groups (i.e. orthogonal DMRS and scrambling sequence to be used by the UE alone) so that the contention does not occur, and in the case of the terminal having low priority, the base station may configure the plurality of terminals into one group so that the contention between the terminals is performed.

Here, the priority of the UL data of the corresponding PUR that the terminal intends to transmit may be set to report to the base station at the same time when reporting the capability of the terminal.

Figure 47:
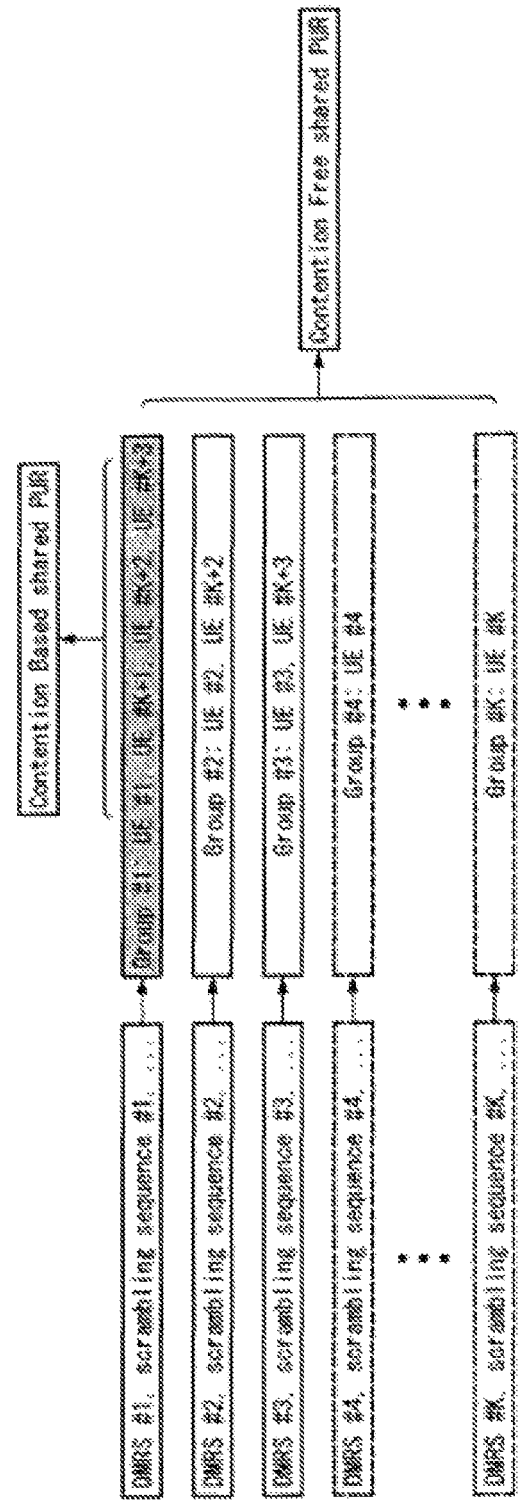
FIG. 47 is a diagram illustrating an example in which a base station allocates a UE in consideration of priority of UL data.

FIG. 47 is a diagram illustrating an example in which a base station allocates a UE in consideration of priority of UL data.

As illustrated in FIG. 47, similar to FIG. 45, the base station may configure a combination composed of K mutually orthogonal DMRSs and scrambling sequences, etc., and then allocate M UEs to a specific T/F resource (e.g., M=K+3, M>K).

The base station should allocate two or more UEs to a specific group because the number of UEs to be allocated to a specific T/F resource is greater than the number of combinations composed of the initially prepared mutually orthogonal DMRSs, the scrambling sequences, and the like.

That is, in FIG. 47, a total of four UEs are allocated to group #1, and one UE is allocated from group #2 to group #K. That is, it may correspond to a case in which the priority of UL data transmitted by UEs belonging to group #1 is lower than the priority of UL data transmitted by UEs belonging to group #2 to #K.

That is, the contention-based shared PUR operation is performed between terminals belonging to group #1, and a UE surviving group #1 and UEs belonging to other groups perform a contention-free shared PUR operation. In addition, the base station needs to request to transmit additional UE-specific information to UEs corresponding to group #1 (i.e. to terminals performing contention-based PUR operation).

That is, in the proposed method, the same T/F resource may operate as CFS PUR or CBS PUR through a 1-bit field indicated by the base station.

In addition, the aforementioned CBS PUR operation has an advantage that the collision probability is very low compared to contention-based transmission in which all UEs randomly select and select using the same probability among resources included in the DMRS pool and the scrambling sequence pool. In addition, from the point of view of the UE, when the 1 bit field instructing to embedding and transmitting UE ID information upon transmitting (N)PUSCH indicates 0 (e.g., indicating that there is no need to transmit UE ID information), it can be seen that the corresponding PUR setting is non-contention, and when a 1-bit field instructing to transmit UE ID information upon transmitting (N) PUSCH indicates 1 (e.g., instructing that UE ID information should be transmitted), it may be seen that the PUR configuration is contention-based transmission.

Therefore, when performing CFS PUR transmission, the UE may be configured to expect ACK or NACK through feedback information, when performing CBS PUR transmission, the UE may be configured to expect the base station to transmit whether the contention success/failure of the PUR transmitted by the corresponding UE is transmitted through feedback information, and furthermore, the UE may also expect ACK or NACK information.

Additionally, in the case of CBS PUR operation, a field instructing the base station to embedding and transmit UE ID information when transmitting (N)PUSCH may be indicated as "ON", and when the decoding of UL data is NACK while the UE ID is recognized (assuming that UE-specific UE ID information is encoded separated from UL data), the base station may be configured to indicate retransmission to the RNTI (e.g. UE specific C-RNTI)-based (N)PDCCH corresponding to the UE ID.

In addition, in the case of the CFS PUR operation, a field instructing the base station to embedding and transmit UE ID information when transmitting (N)PUSCH can be indicated as "OFF", and when the decoding of UL data is NACK, the base station may be simply configured to indicate retransmission to the UE-specific C-RNTI-based (N)PDCCH using the corresponding DMRS, but the base station may be configured to indicate retransmission through a (N)PDCCH specific to the corresponding CFS PUR resource (e.g., DMRS, scrambling sequence). For example, in RNTI-based (N)PDCCH corresponding to T/F resources for CFS PUR (not C-RNTI), ACK/NACK information is mapped/transmitted for each DMRS (or a form in which a scrambling sequence is combined with a DMRS), and the UE may perform a retransmission operation by reading ACK/NACK information corresponding to the DMRS used by the UE. In this configuration, there is an advantage in that retransmission DCI overhead may be reduced compared to transmitting ACK/NACK information using a C-RNTI-based (N)PDCCH for each UE.

The proposed method is a method in which the base station determines whether to perform CFS PUR operation or CBS PUR operation to a specific terminal at a specific time.

This will be described in detail below.

If the base station reserves K orthogonal resources (e.g. DMRS, scrambling sequence, etc.) to perform a CFS PUR operation on a specific T/F resource, instructs the terminals requesting the PUR through UE-specific RRC signaling (at this time, when transmitting (N)PUSCH, it is preferable that the field indicating that the UE ID information is embedding and transmitted is set to "OFF"), and then tries to allocate the corresponding T/F resource to more terminals at some point, when the base station want to allocate the T/F resource to more terminals at a certain point, similar to the above-described method, a situation in which orthogonal resources that have already been allocated to a specific UE may be used for other UEs may occur.

In this case, the newly allocated UEs may be configured to instruct the base station to configure the field instructing to embedding and transmit UE ID information to "ON" when transmitting (N)PUSCH through UE-specific RRC signaling, and the base station may be configured to instruct the UEs previously allocated to perform CFS PUR operation to set a field instructing to embedding and transmitting UE ID information to "ON" when transmitting (N)PUSCH through a UE-specific channel/signal that can be received even in the idle mode, such as an ACK/NACK feedback channel.

That is, the operation received from the base station through the initially UE specific RRC signaling is the CFS PUR operation but the terminal instructs the base station to perform a CBS PUR operation through a path such as an ACK/NACK feedback channel Through a similar method, the base station may instruct the terminal, which initially performs the CBS PUR operation, to perform the CFS PUR operation.

Additionally, when the base station gives UE-specific RRC signaling to the UE, the following scheme may be considered. The first base station may instruct the terminal the number of sets of orthogonal resources (e.g., DMRS, scrambling sequence, etc.) that may be used for CFS PUR operation in the same T/F resource (K value in the above example), and in addition to this, the base station may inform information on which orthogonal resource the corresponding terminal should use among K orthogonal resource configured for the CFS PUR operation.

Thereafter, the terminal may be configured to find out the actual DMRS and the scrambling sequence index according to a predetermined method or a result of an equation.

In addition, when group ACK/NACK is supported and when a corresponding orthogonal resource is used, the base station may indicate to the terminal at what position of the group ACK/NACK the ACK/NACK of the corresponding UE exists. The advantage of this configuration method is that RRC signaling overhead may be reduced compared to instructing each terminal with a specific DMRS and scrambling sequence index.

In addition, after indicating the number of sets of orthogonal resources that may be used for the CFS PUR operation (e.g., DMRS, scrambling sequence, etc.) to the terminal (the K value in the example above), a value larger than the corresponding K value is given to the actual terminal (e.g., L), the terminal may select an orthogonal resource according to a predetermined method or result of an equation (for example, selecting an orthogonal resource for a value corresponding to K'=L mod K, K'), and the corresponding terminal may determine that the CBS PUR operation is performed, and may be configured to embed and transmit a UE specific ID when transmitting (N)PUSCH. That is, the base station implicitly instructs the terminal to perform the CBS PUR operation by indicating to the terminal a value greater than the number of orthogonal resource sets that may be used for the CFS PUR operation, and has the advantage of not needing to use a field instructing to embedding and transmitting the UE ID information when transmitting the aforementioned (N)PUSCH.

In addition, the following method may be considered in relation to ACK/NACK feedback of CBS PUR. There may be two cases when the terminal that has performed the CBS PUR operation receives an ACK indication. (1) When the corresponding UE ID is ACK for a resource transmitted by the corresponding UE, and (2) there may be a case in which a UE ID other than the corresponding UE ID is ACK for the resource transmitted by the corresponding UE. If another UE ID is ACKed for the resource transmitted by the corresponding UE as in (2), (A) a method of waiting until the next CBS PUR transmission time and then retransmitting may be considered, and (B) it may also be set to fallback to EDT procedure or RA procedure.

That is, when the base station fails to decode the CBS PUR transmission transmitted by the terminal, the number of cases the terminal may expect may be (1) explicit NACK, or (2) NACK for other UEs, or (3) no feedback. In the case of (3), power ramping up may be performed at the time of retransmission, and in the case of (1) and/or (2), power ramping up may not be allowed. Of course, if there is special signaling for TPC in (1) and/or (2), this may be followed.

Base Station/Terminal Operation of the Present Disclosure

Figure 48:
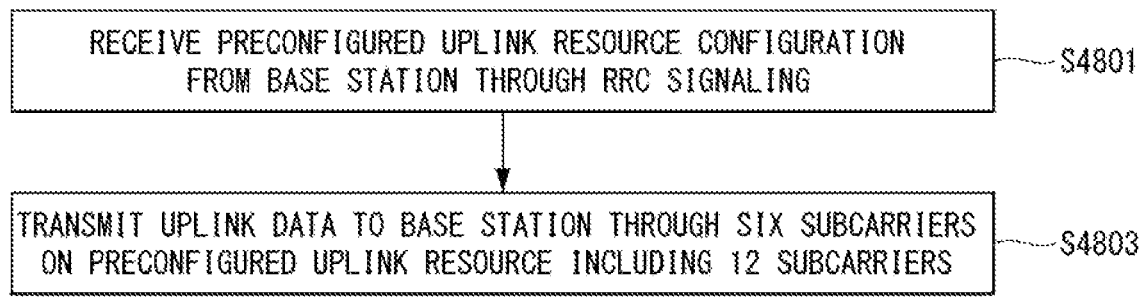
FIG. 48 is a diagram illustrating an example of an operation flowchart of a terminal transmitting and receiving signals and/or channels in a narrowband wireless communication system coexisting with another wireless communication system to which the method proposed in the present disclosure may be applied.

FIG. 48 is a diagram illustrating an example of an operation flowchart of a terminal transmitting and receiving signals and/or channels in a narrowband wireless communication system coexisting with another wireless communication system to which the method proposed in the present disclosure may be applied.

FIG. 48 is merely for convenience of explanation, and does not limit the scope of the present disclosure.

Referring to FIG. 48, it is assumed that a wireless communication system using a narrow band, such as the above-described methods (the methods described in the first to third embodiments), coexists in a system band of another wireless communication system (e.g. NR system). That is, the method described in FIG. 48 may be operated, set, defined, and/or indicated based on the above-described methods.

First, the terminal may receive a preset uplink resource configuration from the base station through RRC signaling (S4801).

Subsequently, the terminal may transmit uplink data to the base station using six subcarriers on a preset uplink resource including 12 subcarriers (S4803).

Figure 49:
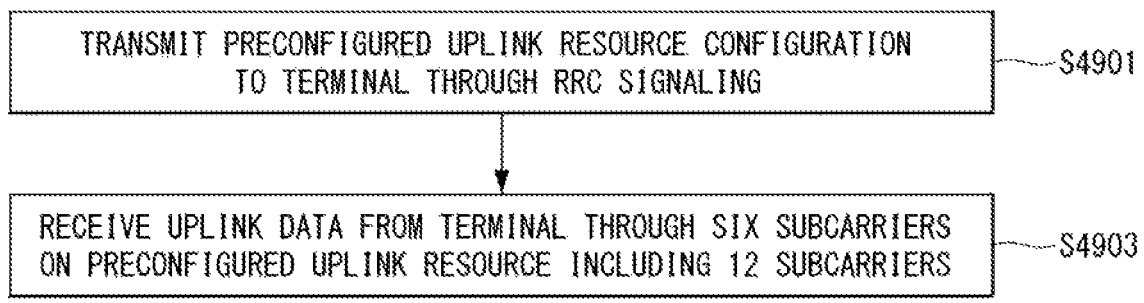
FIG. 49 is a diagram illustrating an example of an operation flowchart of a base station transmitting and receiving signals and/or channels in a narrowband wireless communication system coexisting with another wireless communication system to which the method proposed in the present disclosure may be applied.

FIG. 49 is a diagram illustrating an example of an operation flowchart of a base station transmitting and receiving signals and/or channels in a narrowband wireless communication system coexisting with another wireless communication system to which the method proposed in the present disclosure may be applied.

FIG. 49 is merely for convenience of explanation, and does not limit the scope of the present disclosure.

First, the base station may transmit a preset uplink resource configuration from the terminal through RRC signaling (S4901).

Subsequently, the base station may receive uplink data from the terminal through six subcarriers on a preset uplink resource including 12 subcarriers (S4903).

Figure 50:
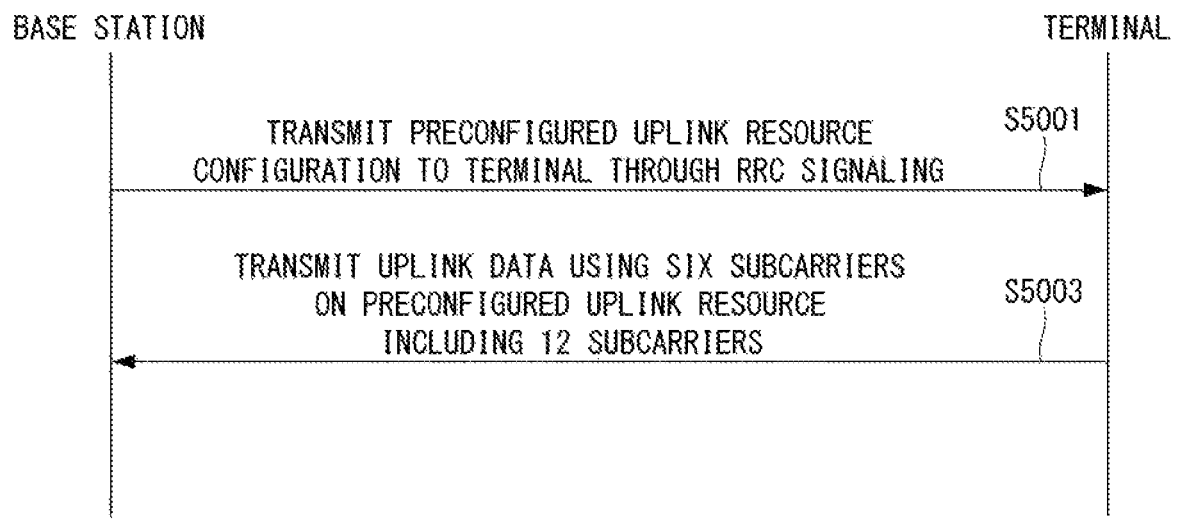
FIG. 50 is a diagram illustrating a data exchange sequence between an operation flowchart of a base station/terminal transmitting and receiving signals and/or channels in a narrowband wireless communication system coexisting with another wireless communication system to which the method proposed in the present disclosure may be applied.

FIG. 50 is a diagram illustrating a data exchange sequence between an operation flowchart of a base station/terminal transmitting and receiving signals and/or channels in a narrowband wireless communication system coexisting with another wireless communication system to which the method proposed in the present disclosure may be applied.

FIG. 50 is merely for convenience of explanation, and does not limit the scope of the present disclosure.

As illustrated in FIG. 50, the base station transmits a preset uplink resource configuration to the terminal through RRC signaling (S5001).

Subsequently, the terminal transmits uplink data to the base station through six subcarriers on a preset uplink resource including 12 subcarriers (S5003).

General Devices to which the Present Disclosure May be Applied

Figure 51:
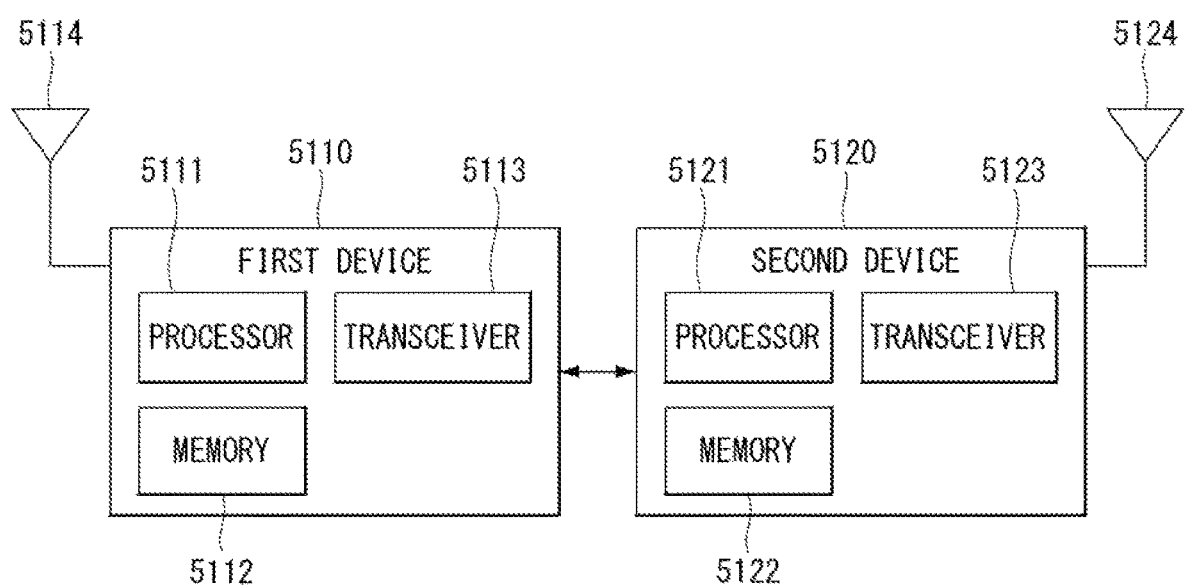
FIG. 51 is a block configuration diagram of a wireless communication apparatus to which the methods proposed in the present specification may be applied.

FIG. 51 is a block configuration diagram of a wireless communication apparatus to which the methods proposed in the present specification may be applied.

Referring to FIG. 51, a wireless communication system may include a first device 5110 and a second device 5120.

The first device 5110 may be a base station, a network node, a transmission terminal, a reception terminal, a transmission device, a reception device, a wireless device, a wireless communication device, a vehicle, a vehicle equipped with an autonomous driving function, a connected car, a drone (Unmanned Aerial Vehicle, UAV), an artificial intelligence (AI) module, a robot, an augmented reality (AR) device, a virtual reality (VR) device, a mixed reality (MR) device, a hologram device, a public safety device, an MTC device, an IoT device, a medical device, a fintech device (or a financial device), a security device, a climate/environment device, a device related to 5G service, or a device related to the fourth industrial revolution field.

The second device 5120 may be a base station, a network node, a transmission terminal, a reception terminal, a transmission device, a reception device, a wireless device, a wireless communication device, a vehicle, a vehicle equipped with an autonomous driving function, a connected car, a drone (Unmanned Aerial Vehicle, UAV), an artificial intelligence (AI) module, a robot, an augmented reality (AR) device, a virtual reality (VR) device, a mixed reality (MR) device, a hologram device, a public safety device, an MTC device, an IoT device, a medical device, a fintech device (or a financial device), a security device, a climate/environment device, a device related to 5G service, or a device related to the fourth industrial revolution field.

For example, the terminal may include a mobile phone, a smart phone, a laptop computer, a terminal for digital broadcasting, a personal digital assistants (PDA), a portable multimedia player (PMP), a navigation system, a slate PC, a tablet PC, an ultrabook, a wearable device (for example, a watch type terminal (smartwatch), a glass type terminal (smart glass), head mounted display (HMD)), etc. For example, the HMD may be a display device worn on the head. For example, the HMD can be used to implement VR, AR or MR.

For example, a drone may be a vehicle that does not ride with humans and is flying by a radio control signal. For example, the VR device may include a device that implements an object or a background of a virtual world. For example, the AR device may include a device that connects and implements an object or background of a virtual world, such as an object or background of the real world. For example, the MR device may include a device that fuses and implements an object or background of a virtual world, such as an object or background of the real world. For example, the hologram device may include a device that implements a 360° stereoscopic image by recording and reproducing stereoscopic information by utilizing an interference phenomenon of light generated by the encounter of two laser lights called holography. For example, the public safety device may include an image relay device or an image device that can be worn on a user's human body. For example, the MTC device and the IoT device may be devices that do not require direct human intervention or manipulation. For example, the MTC device and the IoT device may include a smart meter, a bending machine, a thermometer, a smart light bulb, a door lock, or various sensors. For example, the medical device may be a device used for the purpose of diagnosing, treating, alleviating, treating or preventing a disease. For example, the medical device may be a device used for the purpose of diagnosing, treating, alleviating or correcting an injury or disorder. For example, a medical device may be a device used for the purpose of examining, replacing or modifying a structure or function. For example, the medical device may be a device used for the purpose of controlling pregnancy. For example, the medical device may include a device for treatment, a device for surgery, a device for diagnosis (extra-corporeal), a device for hearing aids, a device for treatment, or the like. For example, the security device may be a device installed to prevent a risk that may occur and maintain safety. For example, the security device may be a camera, CCTV, recorder, or black box. For example, the fintech device may be a device capable of providing financial services such as mobile payment. For example, the fintech device may include a payment device or a point of sales (POS). For example, the climate/environmental device may mean a device for monitoring and predicting the climate/environment.

The first device 5110 may include at least one or more processors such as the processor 5111, at least one or more memories such as the memory 5112, and at least one or more transceivers such as the transceiver 5113. The processor 5111 may perform the functions, procedures, and/or methods described above. The processor 5111 may perform one or more protocols. For example, the processor 5111 may perform one or more layers of an air interface protocol. The memory 5112 is connected to the processor 5111 and may store various types of information and/or commands. The transceiver 5113 may be connected to the processor 5111 and controlled to transmit and receive radio signals.

The second device 5120 may include at least one processor such as the processor 5121, at least one memory device such as the memory 5122, and at least one transceiver such as the transceiver 5123. The processor 5121 may perform the functions, procedures, and/or methods described above. The processor 5121 may perform one or more protocols. For example, the processor 5121 may perform one or more layers of an air interface protocol. The memory 5122 is connected to the processor 5121 and may store various types of information and/or commands. The transceiver 5123 may be connected to the processor 5121 and controlled to transmit and receive radio signals.

Figure 52:
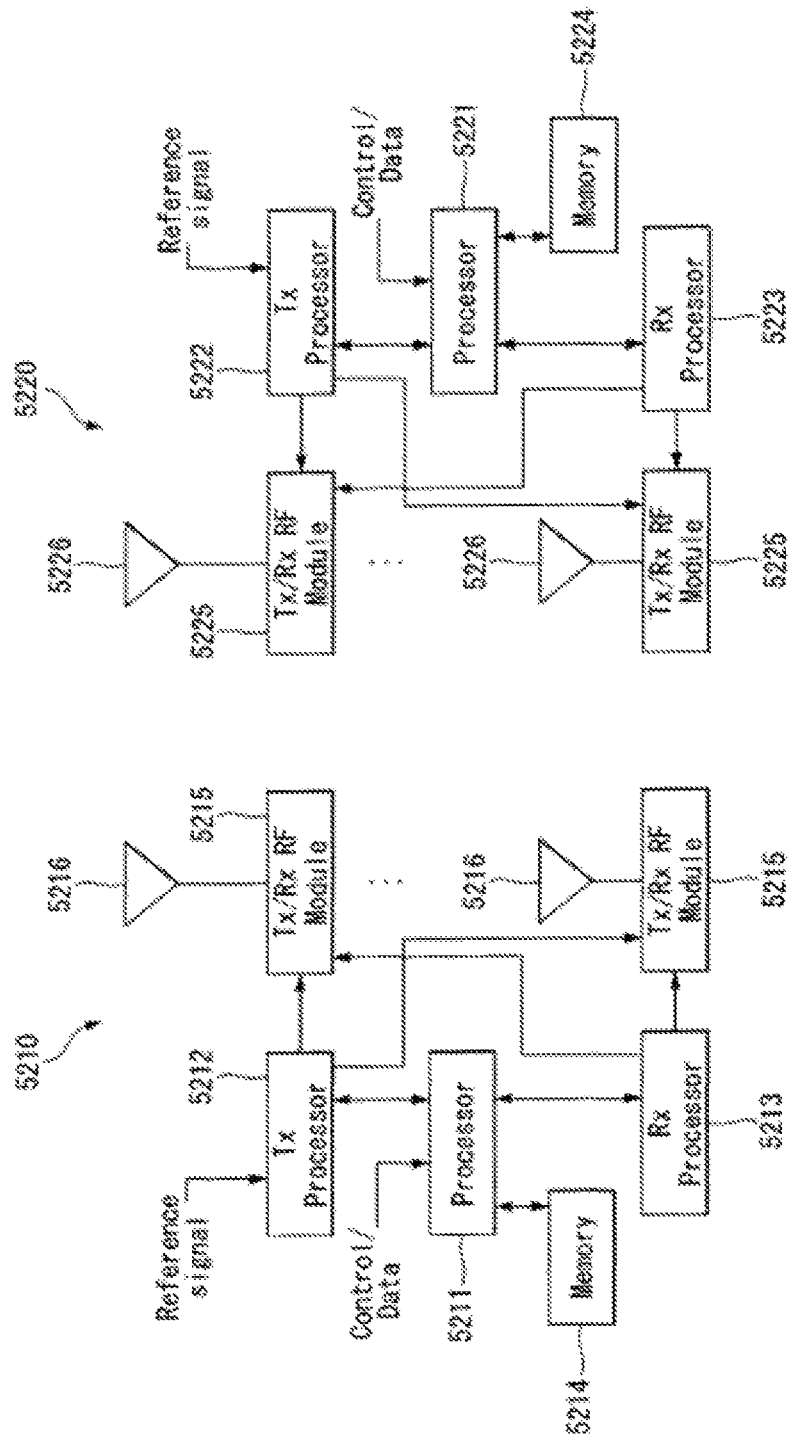
FIG. 52 is another block configuration diagram of the wireless communication apparatus to which the methods proposed in the present specification may be applied.

FIG. 52 is another block configuration diagram of the wireless communication apparatus to which the methods proposed in the present specification may be applied.

Referring to FIG. 52, a wireless communication system includes a base station 5210 and a plurality of terminals 5220 located within the base station area. A base station may be represented as a transmitting device, a terminal as a receiving device, and vice versa. The base station and the terminal are a processor (processors 5211 and 5221), a memory (memories 5214 and 5224), one or more Tx/Rx RF modules (radio frequency modules 5215 and 5225), a Tx processor 5212 and 5222, a Rx processor 5213 and 5223, and antennas 5216 and 5226. The processor 110 implements the suggested functions, processes and/or methods. More specifically, in DL (base station to terminal communication), higher layer packets from the core network are provided to the processor 5211. The processor implements the functions of the L2 layer. In the DL, the processor provides multiplexing (multiplexing) and radio resource allocation between logical channels and transport channels to the terminal 5220, and is responsible for signaling to the terminal. The transmit (TX) processor 5212 implements various signal processing functions for the L1 layer (i.e., the physical layer). The signal processing function facilitates forward error correction (FEC) in the terminal, and includes coding and interleaving. The coded and modulated symbols are divided into parallel streams, and each stream is mapped to an OFDM subcarrier, multiplexed with a reference signal (RS) in the time and/or frequency domain, and uses Inverse Fast Fourier Transform (IFFT). These are combined together to create a physical channel carrying the time domain OFDMA symbol stream. Each spatial stream may be provided to a different antenna 5216 via a separate Tx/Rx module (or transceiver, 5215). Each Tx/Rx module may modulate an RF carrier with each spatial stream for transmission. In the terminal, each Tx/Rx module (or transceiver, 5225) receives a signal through each antenna 5226 of each Tx/Rx module. Each Tx/Rx module restores information modulated by an RF carrier and provides the information to the reception (RX) processor 5223. The RX processor implements a variety of layer 1 signal processing functions. The RX processor can perform spatial processing on the information to recover any spatial stream destined for the terminal. If a plurality of spatial streams are directed to the terminal, they can be combined into a single OFDMA symbol stream by multiple RX processors. The RX processor transforms the OFDMA symbol stream from time domain to frequency domain using Fast Fourier Transform (FFT). The frequency domain signal includes a separate OFDMA symbol stream for each subcarrier of the OFDM signal. The symbols and reference signal on each subcarrier are recovered and de-modulated by determining the most probable signal placement points transmitted by the base station These soft decisions may be based on channel estimate values. The soft decisions are decoded and deinterleaved to recover the data and control signal originally transmitted by the base station on the physical channel. Corresponding data and control signals are provided to the processor 5221.

UL (terminal to base station communication) is handled at base station 5210 in a manner similar to that described with respect to receiver functions at terminal 5220. Each Tx/Rx module 5225 receives a signal through a respective antenna 5226. Each Tx/Rx module provides an RF carrier and information to the RX processor 5223. The processor 5221 may be associated with a memory 5224 that stores program codes and data. The memory may be referred to as a computer-readable medium.

In the embodiments described hereinabove, components and features of the present disclosure were combined with each other in a predetermined form. It is to be considered that the respective components or features are selective unless separately explicitly mentioned. The respective components or features may be implemented in a form in which they are not combined with other components or features. In addition, some components and/or features may be combined with each other to configure the embodiment of the present disclosure. The order of operations described in the embodiments of the present disclosure may be changed. Some components or features of any embodiment may be included in another embodiment or be replaced by corresponding components or features of another embodiment. It is obvious that claims that do not have an explicitly referred relationship in the claims may be combined with each other to configure an embodiment or be included in new claims by amendment after application.

Embodiments of the present disclosure may be implemented by various means, for example, hardware, firmware, software, or a combination thereof, and the like. In the case in which an embodiment of the present disclosure is implemented by the hardware, it may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case in which one embodiment of the present disclosure is implemented by the firmware or the software, it may be implemented in a form of a module, a procedure, a function, or the like, performing the capabilities or the operations described above. A software code may be stored in a memory and be driven by a processor. The memory unit may be positioned inside or outside the processor and transmit and receive data to and from the processor by various well-known means.

It will be apparent to those skilled in the art that the present disclosure may be embodied in other specific forms without departing from the spirit and essential characteristics of the present disclosure. Therefore, the above-mentioned detailed description is to be interpreted as being illustrative rather than being restrictive in all aspects. The scope of the present disclosure should be determined by reasonable interpretation of the appended claims, and all changes within the equivalent scope of the present disclosure are included in the scope of the present disclosure.

INDUSTRIAL APPLICABILITY

The present disclosure has been described focusing on examples applied to 3GPP LTE/LTE-A/NR systems, but can be applied to various wireless communication systems other than 3GPP LTE/LTE-A/NR systems.

The invention claimed is:

1. A method of a terminal to receive a preset uplink resource from a base station in a wireless communication system, comprising:
    receiving a preconfigured uplink (UL) resource (PUR) configuration from the base station through RRC signaling; and
    transmitting uplink data on the preconfigured uplink resource to the base station when the terminal is in an idle mode,
        wherein the preconfigured uplink resource includes 12 subcarriers,
        wherein the uplink data includes a de-modulated reference signal (DMRS) sequence having a first length including six subcarriers, and
        wherein for the transmitting of the uplink data to the base station, the DMRS sequence is transmitted using the six subcarriers among the 12 subcarriers, and
        wherein the preconfigured uplink resource includes a plurality of slots, and
        wherein the transmitting of the uplink data to the base station includes:
    transmitting a first DMRS sequence having the first length using first six subcarriers on a first slot on the plurality of slots; and
    transmitting a second DMRS sequence having a second length using second six subcarriers on a second slot among the plurality of slots.

2. The method of claim 1, wherein for the transmitting of the uplink data to the base station, frequency hopping is performed between the first six subcarriers and the second six subcarriers of the first slot and the second slot.

3. The method of claim 1, wherein the uplink data is the DMRS sequence having the second length including three subcarriers.

4. A terminal receiving data from a base station in a wireless communication system, comprising:
    a communication unit configured to transmit and receive a wireless signal;
    a processor; and
    at least one computer memory configured to be connected to the processor and store instructions for performing operations when executed by the at least one processor,
    wherein the operations include:
    receiving a preconfigured uplink (UL) resource (PUR) configuration from the base station through RRC signaling; and
    transmitting uplink data on the preconfigured uplink resource to the base station when the terminal is in an idle mode, and
        wherein the preconfigured uplink resource includes 12 subcarriers,
        wherein the uplink data includes a de-modulated reference signal (DMRS) sequence having a first length including six subcarriers, and
        wherein for the transmitting of the uplink data to the base station, the DMRS sequence is transmitted using six subcarriers among the 12 subcarriers, and
        wherein the preconfigured uplink resource includes a plurality of slots, and
        wherein the transmitting of the uplink data to the base station includes:
    transmitting a first DMRS sequence having the first length using first six subcarriers on a first slot on the plurality of slots; and
    transmitting a second DMRS sequence having a second length using second six subcarriers on a second slot among the plurality of slots.

5. The terminal of claim 4, wherein for the transmitting of the uplink data to the base station,
    frequency hopping is performed between the first six subcarriers and the second six subcarriers of the first slot and the second slot.

6. The terminal of claim 4, wherein the uplink data is the DMRS sequence having the second length including three subcarriers.

* * * * *